(12) United States Patent
Lee et al.

(10) Patent No.: US 10,564,404 B2
(45) Date of Patent: Feb. 18, 2020

(54) OPTICAL LENS ASSEMBLY AND ELECTRONIC APPARATUS INCLUDING THE SAME

(71) Applicant: Samsung Electronics Co., Ltd., Gyeonggi-do (KR)

(72) Inventors: Tae-kun Lee, Seoul (KR); Min Heu, Seoul (KR); Yun-jeong Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 189 days.

(21) Appl. No.: 15/657,781

(22) Filed: Jul. 24, 2017

(65) Prior Publication Data

US 2018/0039049 A1 Feb. 8, 2018

(30) Foreign Application Priority Data

Aug. 3, 2016 (KR) .......................... 10-2016-0099063

(51) Int. Cl.
*G02B 3/02* (2006.01)
*G02B 13/00* (2006.01)
*G02B 13/06* (2006.01)

(52) U.S. Cl.
CPC ..... *G02B 13/0065* (2013.01); *G02B 13/0045* (2013.01); *G02B 13/06* (2013.01)

(58) Field of Classification Search
CPC ................................................. G02B 13/0065

USPC .......................................................... 359/717
See application file for complete search history.

(56) References Cited

U.S. PATENT DOCUMENTS

| 7,595,938 B2 | 9/2009 | Yamakawa et al. |
| 8,582,218 B2 * | 11/2013 | Takasugi ............ A61B 1/00177 359/754 |
| 9,223,116 B2 | 12/2015 | Kwon |
| 2012/0206822 A1 | 8/2012 | Hsieh et al. |
| 2014/0132709 A1 | 5/2014 | Satoh et al. |

FOREIGN PATENT DOCUMENTS

| JP | 4947700 B2 | 6/2012 |
| JP | 5558058 B2 | 7/2014 |
| JP | 5884857 B2 | 3/2016 |

* cited by examiner

*Primary Examiner* — James C. Jones
(74) *Attorney, Agent, or Firm* — Cha & Reiter, LLC.

(57) ABSTRACT

Provided are an optical lens assembly and an electronic apparatus including the same according to various embodiments. The optical lens assembly includes: a first lens group having a positive refractive power; a second lens group having a positive refractive power; and a bending unit located between the first lens group and the second lens group and configured to bend an optical path, wherein the first lens group, the second lens group, and the bending unit are sequentially arranged from an object side to an image side, and the optical lens assembly has a maximum viewing angle of 130° or more. Other embodiments may be implemented.

11 Claims, 29 Drawing Sheets

OPTICAL LENS ASSEMBLY AND ELECTRONIC APPARATUS INCLUDING THE SAME

CLAIM OF PRIORITY

This application claims the benefit of Korean Patent Application No. 10-2016-0099063, filed on Aug. 3, 2016, in the Korean Intellectual Property Office, the disclosure of which is incorporated herein in its entirety by reference.

BACKGROUND

1. Field

The present disclosure generally relates to optical lens assemblies and electronic apparatuses including the same, and more particularly, to optical lens assemblies having super-wide-angle maximum viewing angles and electronic apparatuses including such optical lens assemblies.

2. Description of the Related Art

Camera technology has greatly advanced in recent years so that cameras are no longer stand-alone cameras, but rather components of a variety of ubiquitous electronic devices (apparatuses) such as mobile devices, home appliances, or other user devices. As the use of these electronic apparatuses containing cameras has increased, the use of cameras functionally connected to the electronic apparatuses has also increased. Accordingly, in response to user demand, camera performances and/or resolutions in electronic apparatuses have been improved. Cameras in electronic apparatuses may be used to take various types of pictures such as landscapes, portraits, including selfies. In addition, network connectivity of the electronic apparatuses allows multimedia files such as pictures or videos to be shared on social network sites or other media.

With the development of semiconductor and display technologies, camera lenses of mobile devices have also been improved from having low resolution to having high resolution, from having small sensors to having larger sensors (e.g., from ⅛" sensors to ½" sensors), and from being telephoto lenses to being super-wide-angle lenses.

In the case of super-wide-angle lenses or fish-eye lenses, degradation of image quality in the periphery of captured images may be high when the maximum viewing angle is less than 130° or even when the maximum viewing angle is 130° or more. Also, it is difficult to perform aberration control when the camera lens has a large aperture and has a maximum viewing angle of 130° or more.

As the use of electronic apparatuses containing cameras has increased, there is an increasing demand for miniaturization of the camera or the imaging device, so that the image device can be mounted in the space allotted within the electronic apparatus. However, in the case of a super-wide-angle lens or a fish-eye lens, since the configuration of lenses in front of the iris diaphragm may not be optimized, it may be difficult to perform aberration control while at the same time designing the camera to have super-wide angles, large apertures, and be compact. Also, when the electronic device includes a plurality of lens optical systems, the plurality of lens optical systems need to be compact so that the designer of the electronic apparatus can place the lens optical systems according to various design configurations within the electronic apparatus. Likewise, compactness of the lens optical systems may allow the heat generated from the image sensors to be more readily dissipated.

SUMMARY

Provided are super-wide-angle optical lens assemblies for use in electronic apparatuses (e.g., portable terminals or mobile devices).

Provided are electronic apparatuses including the disclosed super-wide-angle optical lens assemblies.

Provided are electronic apparatuses including a plurality of super-wide-angle optical lens assemblies and are capable of capturing omnidirectional images.

Additional aspects will be set forth at least in part in the following description, will be apparent from the description, or may be learned by practicing the presented embodiments.

According to an aspect of an embodiment, an optical lens assembly includes: a first lens group having a positive refractive power; a second lens group having a positive refractive power; and a bending unit located between the first lens group and the second lens group and configured to bend an optical path, wherein the first lens group, the second lens group, and the bending unit are sequentially arranged from an object side to an image side, and the optical lens assembly has a maximum viewing angle of 130° or more.

According to an aspect of another embodiment, an optical lens assembly includes: a first lens group having a positive refractive power or a negative refractive power; a second lens group having a positive refractive power; and a bending unit located between the first lens group and the second lens group and configured to bend an optical axis, wherein the first lens group, the second lens group, and the bending unit are sequentially arranged from an object side to an image side, and the first lens group includes a plurality of lenses having negative refractive powers sequentially arranged from the object side to the image side and at least one lens having a positive refractive power.

According to an aspect of another embodiment, an optical lens assembly includes: a first lens group having a positive refractive power or a negative refractive power; a second lens group having a positive refractive power; and a bending unit located between the first lens group and the second lens group and configured to bend an optical axis, wherein the first lens group, the second lens group, and the bending unit are arranged from an object side to an image side, and the optical lens assembly satisfies the following formula:

$$L_{FR}/F<15$$

$$CA_{1ST}/F<20$$

where F denotes a total focal length of the optical lens assembly, $L_{FR}$ denotes a distance between an object side surface of a lens of the first lens group that is located closest to the object side and a position where light is bent by the bending unit, and $CA_{1ST}$ denotes an effective diameter of the lens of the first lens group that is located closest to the object side based on a viewing angle of 180°.

According to an aspect of another embodiment, an electronic apparatus includes: at least one optical lens assembly; and at least one image sensor configured to receive light formed by the at least one optical lens assembly, wherein the at least one optical lens assembly includes: a first lens group having a positive refractive power; a second lens group having a positive refractive power; and a bending unit located between the first lens group and the second lens group and configured to bend an optical path, wherein the first lens group, the second lens group, and the bending unit are sequentially arranged from an object side to an image side, and the at least one optical lens assembly has a maximum viewing angle of 130° or more.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
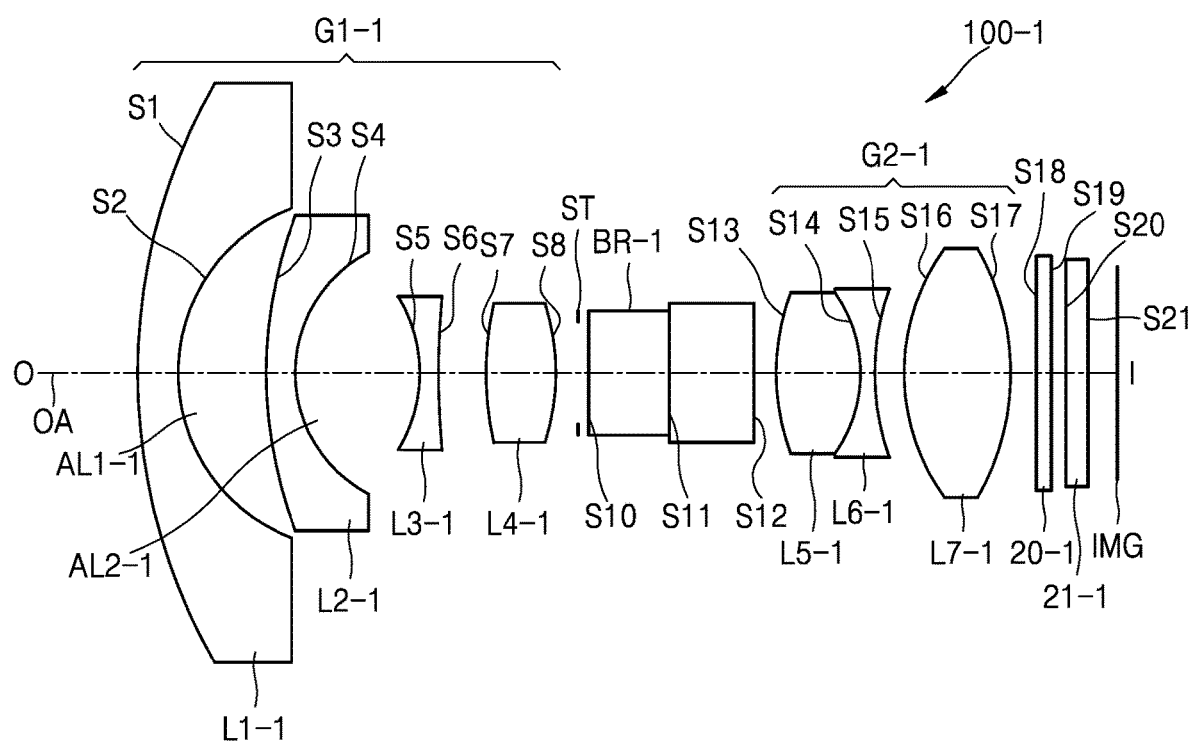
FIG. 1 illustrates an optical lens assembly according to a first embodiment.

Hereinafter, various embodiments of the present disclosure will be described with reference to the accompanying drawings. However, it should be understood that the present disclosure is not limited to these particular embodiments but also includes various modifications, equivalents, and/or alternatives thereof. Throughout the specification and drawings, like reference numerals may be used to denote like elements or components.

When used herein, terms such as "comprise," "include," and "have" specify the presence of stated features (e.g., values, functions, operations, parts, elements, and components) but do not preclude the presence or addition of one or more other features.

As used herein, expressions such as "A or B," "at least one of A and/or B," and "one or more of A and/or B" may include any and all combinations of one or more of the associated listed items. For example, "A or B," "at least one of A and B," or "at least one of A or B" may denote all of the cases of (1) including at least one A, (2) including at least one B, and (3) including at least one A and at least one B.

Terms such as "first" and "second" used herein may modify various elements or components regardless of their order and/or importance. These terms may be used only to distinguish one element or component from another element or component, and these elements or components should not be limited by these terms. For example, a first user device and a second user device may refer to different user devices regardless of their order or importance. For example, without departing from the scope of the present disclosure, a first component may be referred to as a second component, and vice versa.

It will be understood that when a component (e.g., a first component) is referred to as being "(operatively or communicatively) coupled to/with" or "connected to/with" another component (e.g., a second component), it may be coupled to/with or connected to/with the other component directly or indirectly through one or more other components (e.g., third components). On the other hand, when a component (e.g., a first component) is referred to as being "directly coupled to/with" or "directly connected to/with" another component (e.g., a second component), no other components (e.g., third components) exist therebetween.

The expression "configured to (or set to)" used herein may be replaced with, for example, "suitable for," "having the capacity to," "designed to," "adapted to," "made to," or "capable of" depending on the context of the disclosure. The expression "configured to (or set to)" may not necessarily mean "specifically designed to" in a hardware level. Instead, in some case, the expression "apparatus configured to . . . " may mean that the apparatus is "capable of . . . " along with other devices or parts. For example, "a processor configured to (or set to) perform A, B, and C" may refer to a dedicated processor (e.g., an embedded processor) for performing a corresponding operation, or a general-purpose processor (e.g., a central processing unit (CPU) or an application processor (AP)) capable of performing a corresponding operation by executing one or more software programs stored in a memory device.

The terms used herein are just for the purpose of describing particular embodiments and are not intended to limit the scope of the present disclosure. As used herein, the singular forms "a," "an," and "the" may include the plural forms as well, unless the context clearly indicates otherwise. All terms (including technical or scientific terms) used herein may have the same meanings as commonly understood by one of ordinary skill in the art of the present disclosure. The terms defined in commonly used dictionaries may be interpreted as having the same meanings as the contextual meanings of the related art and will not be interpreted in an overly formal sense unless expressly so defined herein. In some cases, even the terms defined herein may not be interpreted to exclude the embodiments of the present disclosure.

An electronic apparatus according to various embodiments of the present disclosure may include, for example, at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), a Motion Picture Expert Group (MPEG) audio layer 3 (MP3) player, a mobile medical device, a camera, and a wearable device. According to various embodiments, the wearable device may include at least one of accessory-type devices (e.g., watches, rings, wristlets, anklets, necklaces, spectacles, contact lenses, or head-mounted devices (HMDs)), textile or clothing-integrated devices (e.g., electronic clothing), body-attachable devices (e.g., skin pads or tattoos), and bio-implantable devices (e.g., implantable circuits).

In some embodiments, the electronic apparatus may be a home appliance. The home appliance may include, for example, at least one of a television (TV), a digital video disk (DVD) player, an audio device, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Goggle TV™), a game console (e.g., Xbox™ or PlayStation™), an electronic dictionary, an electronic key, a camcorder, and an electronic picture frame.

In other embodiments, the electronic apparatus may include at least one of any type of medical device (e.g., any type of portable medical meter (such as a blood sugar meter, a heart rate meter, a blood pressure meter, or a body temperature meter), a magnetic resonance angiography (MRA) device, a magnetic resonance imaging (MRI) device, a computerized tomography (CT) device, a tomograph, or an ultrasound machine), a navigation device, a global navigation satellite system (GNSS), an event data recorder (EDR), a flight data recorder (FDR), an automotive infotainment device, an electronic ship equipment (e.g., a ship navigation device or a gyrocompass), an avionic device, a security device, a vehicle head unit, an industrial or home robot, an automatic teller machine (ATM) of a financial institution, a point-of-sale (POS) device of a store, and an Internet-of-Things (IoT) device (e.g., an electric bulb, any type of sensor, an electricity or gas meter, a sprinkler, a fire alarm, a thermostat, a street lamp, a toaster, exercise equipment, a hot-water tank, a heater, or a boiler).

According to some embodiments, the electronic apparatus may include at least one of a part of furniture or building/structure, an electronic board, an electronic signature receiving device, a projector, and any type of meter (e.g., a water meter, an electricity meter, a gas meter, or a radio wave meter). In various embodiments, the electronic apparatus may be any one or any combination of the above-described various devices. The electronic apparatus according to some embodiments may be a flexible electronic apparatus. Also, the electronic apparatus according to the embodiments of the present disclosure is not limited to the above-described devices and may include new electronic apparatuses resulting from technology development.

Hereinafter, electronic apparatuses according to various embodiments will be described with reference to the accompanying drawings. As used herein, the term "user" may refer to a person using an electronic apparatus, or an apparatus (e.g., an artificial intelligence (AI) electronic apparatus) using an electronic apparatus.

Hereinafter, optical lens assemblies and apparatuses including the same according to various embodiments will be described in detail with reference to the accompanying drawings.

FIG. 1 illustrates an optical lens assembly 100-1 according to a first embodiment.

The optical lens assembly 100-1 according to the first embodiment may include a first lens group G1-1 and a second lens group G2-1 arranged from an object side O to an image side I. A bending unit BR-1 for bending an optical path may be located between the first lens group G1-1 and the second lens group G2-1. The first lens group G1-1 may have, for example, positive refractive power. The second lens group G2-1 may have, for example, positive refractive power.

Hereinafter, for describing configurations of the lenses, for example, the image side I may refer to the side facing the image plane IMG on which the image is formed, and the object side O may refer to the side facing the object whose image is to be captured. Also, for example, an "object side surface" of a lens may refer to the lens surface facing the object (i.e., the left side surface in the drawings), and an "image side surface" thereof may refer to the lens surface facing the image plane IMG (i.e., the right side surface in the drawings). The image plane IMG may be, for example, an imaging device surface or an image sensor surface. An image sensor may be, for example, a sensor such as a complementary metal oxide semiconductor (CMOS) image sensor or a charge-coupled device (CCD) image sensor. The image sensor is not limited thereto and may be, for example, any device that converts an image of the object into an electrical image signal.

The first lens group G1-1 may include a plurality of lenses arranged from the object side O to the image side I and may include a plurality of air lenses between the plurality of lenses. Herein, an air lens may refer to an air gap between adjacent lenses and may refer to the space between lenses that has optical properties such as an optical refractive power.

According to the first embodiment, the first lens group G1-1 may include a first lens L1-1, a second lens L2-1, a third lens L3-1, and a fourth lens L4-1 that are arranged from the object side O to the image side I. A first air lens AL1-1 may be provided between the first lens L1-1 and the second lens L2-1, and a second air lens AL2-1 may be provided between the second lens L2-1 and the third lens L3-1.

The first air lens AL1-1 may have negative refractive power and may have a convex surface S2 facing the object side O. The second air lens AL2-1 may have negative refractive power and may have two convex surfaces S4 and S5.

The first lens L1-1 may have negative refractive power. The first lens L1-1 may have, for example, a convex object side surface S1. The first lens L1-1 may be a meniscus lens that is convex toward the object side O. The second lens L2-1 may have negative refractive power. The second lens L2-1 may have, for example, a convex object side surface S3. The second lens L2-1 may be a meniscus lens that is convex toward the object side O. The third lens L3-1 may have negative refractive power. The third lens L3-1 may include, for example, a concave image side surface S6. At least one of the first lens L1-1, the second lens L2-1, and the third lens L3-1 may be an aspherical lens. For example, the second lens L2-1 may be a double-sided aspherical lens.

The fourth lens L4-1 having positive refractive power may be provided next to the second air lens AL2-1 on the image side I. The fourth lens L4-1 may be an aspherical lens.

The second lens group G2-1 may include, for example, a fifth lens L5-1 having positive refractive power, a sixth lens L6-1 having negative refractive power, and a seventh lens L7-1 having positive refractive power. The fifth lens L5-1 and the sixth lens L6-1 may be cemented together. The seventh lens L7-1 located closest to the image side I in the second lens group G2-1 may include an aspherical surface and may have a convex surface facing the image side I. The seventh lens L7-1 may be a double-sided aspherical lens. The seventh lens L7-1 may be a single lens rather than a cemented lens.

Figure 3:
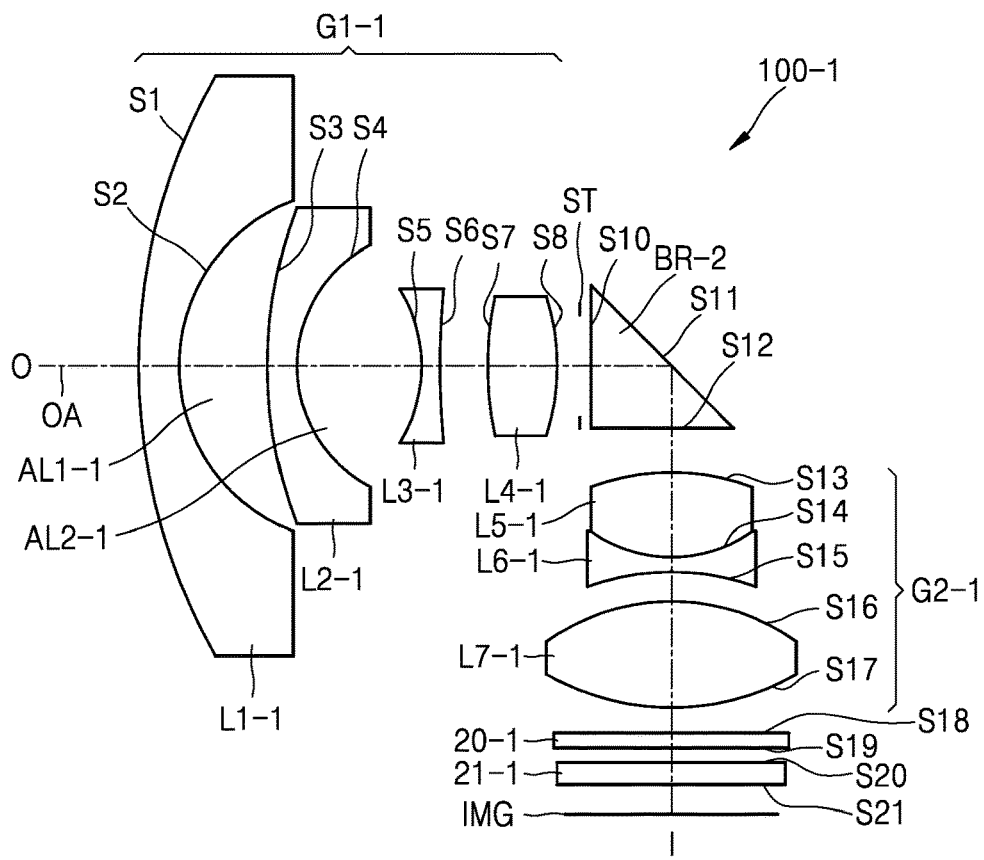
FIG. 3 illustrates an optical path of the optical lens assembly of FIG. 1 according to the first embodiment, when the optical lens assembly further includes a prism.

The bending unit BR-1 for bending an optical path of light that passed through the first lens group G1-1 may include, for example, a reflector or a prism. The bending unit BR-1 may be made of a material having a relatively high refractive index in order to extend the optical path. The optical lens assembly 100-1 according to the first embodiment may be used to obtain various omnidirectional images, and may be configured to have an appropriate viewing angle for the capture of omnidirectional images. Also, when a plurality of optical lens assemblies according to various embodiments are assembled together, an optical path difference between the optical lens assemblies may be adjusted by using the bending unit BR-1. Hence, the designer of the electronic apparatus may have freedom to arrange the plurality of optical lens in various configurations. FIG. 1 illustrates when the optical path is straight. FIG. 3 illustrates when the bending unit BR-1 includes a prism and the optical path is bent by 90° by the bending unit BR-1.

According to one embodiment, all lenses included in the first lens group G1-1 and the second lens group G2-1 may be glass lenses.

According to one embodiment, an iris diaphragm ST may be provided between the first lens group G1-1 and the second lens group G2-1. The iris diaphragm ST may adjust the diameter of the incoming light ray and may include, for example, an aperture diaphragm, a variable aperture stop, and a mask-type stop. According to one embodiment, one or more optical devices 20-1 and 21-1 may be provided between the seventh lens L7-1 and the image plane IMG. The optical devices 20-1 and 21-1 may be, for example, low-pass filters, infrared (IR)-cut filters, cover glasses, etc. For example, when the optical device 20-1 is an IR-cut filter, visible rays may pass through the optical device 20-1 while IR rays may be blocked so that IR rays are not transmitted to the image plane IMG. However, in another embodiment, the optical lens assembly 100-1 may not include optical devices 20-1 and 21-1.

Figure 4:
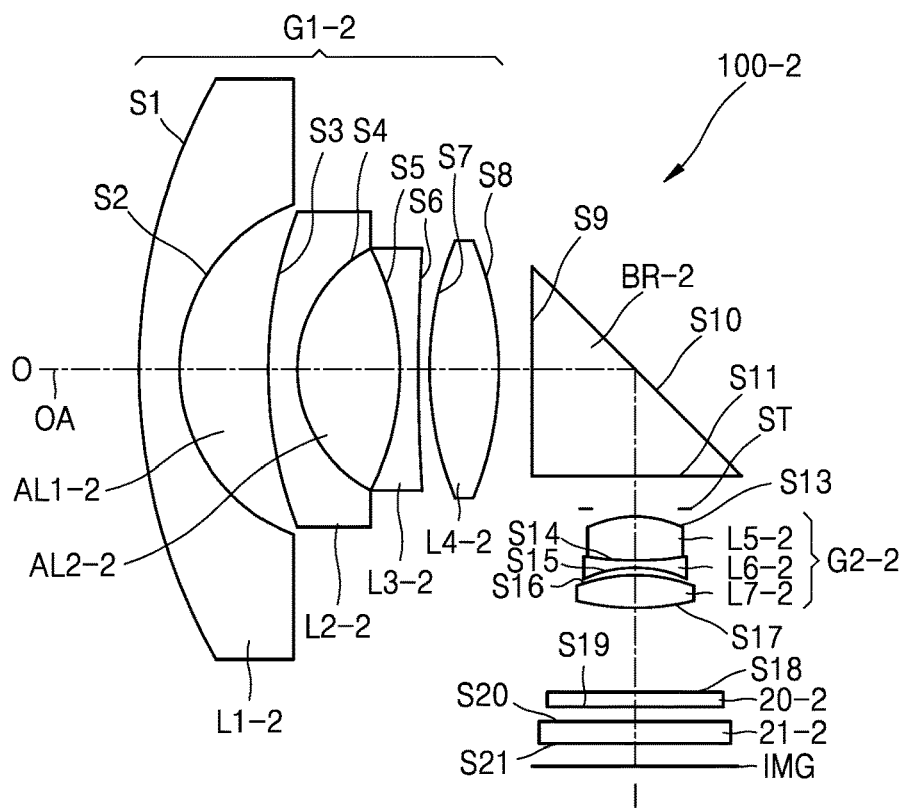
FIG. 4 illustrates an optical lens assembly according to a second embodiment.

FIG. 4 illustrates an optical lens assembly 100-2 according to a second embodiment.

According to the second embodiment, the optical lens assembly 100-2 may include a first lens group G1-2 and a second lens group G2-2 arranged from the object side O to the image side I. A bending unit BR-2 may be located between the first lens group G1-2 and the second lens group G2-2. The first lens group G1-2 may have, for example, positive refractive power. The second lens group G2-2 may have, for example, positive refractive power.

According to the second embodiment, the first lens group G1-2 may include a first lens L1-2, a second lens L2-2, a third lens L3-2, and a fourth lens L4-2 that are arranged from the object side O to the image side I. A first air lens AL1-2 may be provided between the first lens L1-2 and the second lens L2-2, and a second air lens AL2-2 may be provided between the second lens L2-2 and the third lens L3-2.

The first air lens AL1-2 may have negative refractive power and may have a convex surface S2 facing the object side O. The second air lens AL2-2 may have negative refractive power and may have two convex surfaces S4 and S5.

The first lens L1-2 may have negative refractive power. The first lens L1-2 may have, for example, a convex object side surface S1. The second lens L2-2 may have negative refractive power. The second lens L2-2 may have, for example, a convex object side surface S3. The third lens L3-2 may have negative refractive power. The third lens L3-2 may have, for example, a concave image side surface S6. The third lens L3-2 may be, for example, a biconcave lens. The fourth lens L4-2 having positive refractive power may be provided next to the second air lens AL2-2 on the image side I. The fourth lens L4-2 may be an aspherical lens.

The second lens group G2-2 may include, for example, a fifth lens L5-2 having positive refractive power, a sixth lens L6-2 having negative refractive power, and a seventh lens L7-2 having positive refractive power. The fifth lens L5-2 and the sixth lens L6-2 may be cemented together. The seventh lens L7-2 located closest to the image side I in the second lens group G2-2 may include at least one aspherical surface and may have a convex surface facing the image side I. For example, the seventh lens L7-2 may be a biconvex lens. The iris diaphragm ST may be provided between the bending unit BR-2 and the second lens group G2-2.

According to the second embodiment, one or more optical devices 20-2 and 21-2 may be provided between the seventh lens L7-2 and the image plane IMG.

Figure 6:
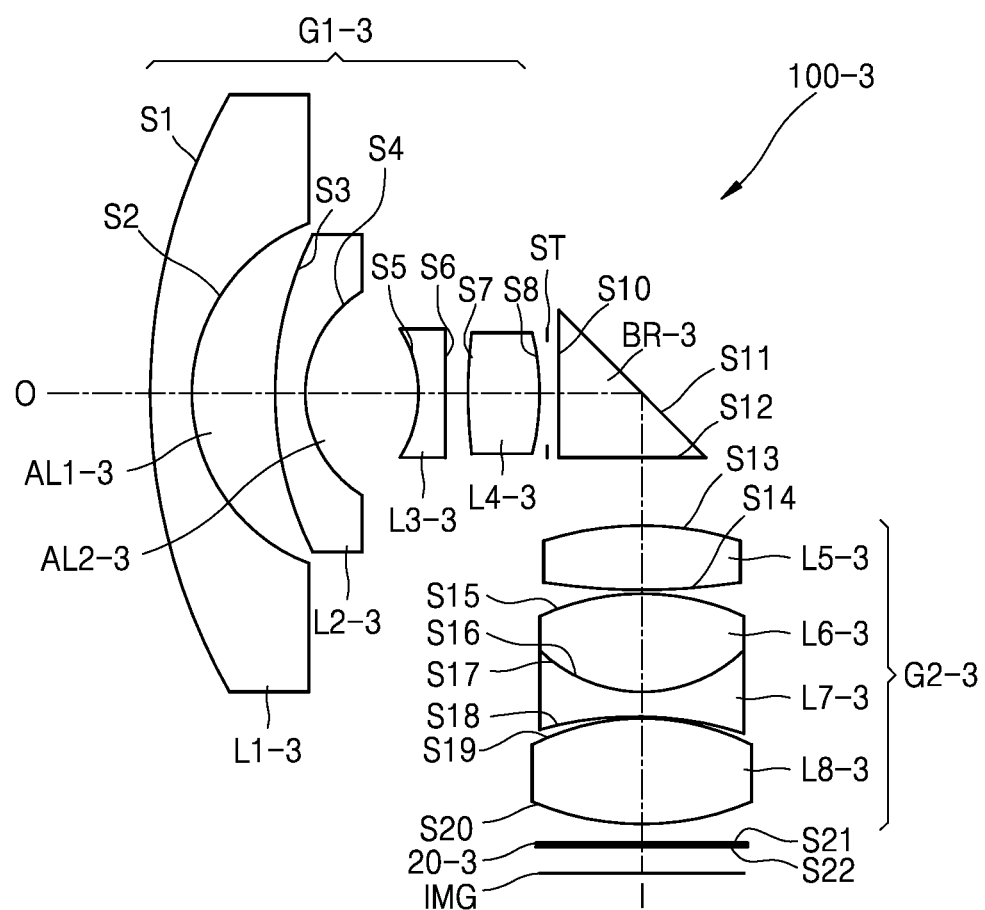
FIG. 6 illustrates an optical lens assembly according to a third embodiment.

FIG. 6 illustrates an optical lens assembly 100-3 according to a third embodiment.

According to the third embodiment, the optical lens assembly 100-3 may include a first lens group G1-3 and a second lens group G2-3 arranged from the object side O to the image side I. A bending unit BR-3 may be located between the first lens group G1-3 and the second lens group G2-3. The first lens group G1-3 may have, for example, positive refractive power. The second lens group G2-3 may have, for example, positive refractive power.

According to the third embodiment, the first lens group G1-3 may include a first lens L1-3, a second lens L2-3, a third lens L3-3, and a fourth lens L4-3 that are arranged from the object side O to the image side I. A first air lens AL1-3 may be provided between the first lens L1-3 and the second lens L2-3 and a second air lens AL2-3 may be provided between the second lens L2-3 and the third lens L3-3.

The first air lens AL1-3 may have negative refractive power and may have a convex surface S2 facing the object side O. The second air lens AL2-3 may have negative refractive power and may have a convex surface S4 facing the object side O. The second air lens AL2-3 may have two convex surfaces S4 and S5.

The first lens L1-3 may have negative refractive power. The first lens L1-3 may have, for example, a convex object side surface S1. The second lens L2-3 may have negative refractive power. The second lens L2-3 may have, for example, a convex object side surface S3. The second lens L2-3 may be an aspherical lens. The third lens L3-3 may have negative refractive power. The third lens L3-3 may have, for example, a flat object side surface S5. The fourth lens L4-3 may have positive refractive power. The fourth lens L4-3 may be, for example, a biconvex lens. The fourth lens L4-3 may also be an aspherical lens. The iris diaphragm ST may be located between the fourth lens L4-3 and the bending unit BR-4.

The second lens group G2-3 may include, for example, a fifth lens L5-3 having positive refractive power, a sixth lens L6-3 having positive refractive power, a seventh lens L7-3 having negative refractive power, and an eighth lens L8-3 having positive refractive power. The eighth lens L8-3 located closest to the image side I in the second lens group G2-3 may include at least one aspherical surface and may have a convex surface facing the image side I. For example, the eighth lens L8-3 may be a biconvex lens.

According to the third embodiment, at least one optical device 20-3 may be provided between the eighth lens L8-3 and the image plane IMG.

Figure 8:
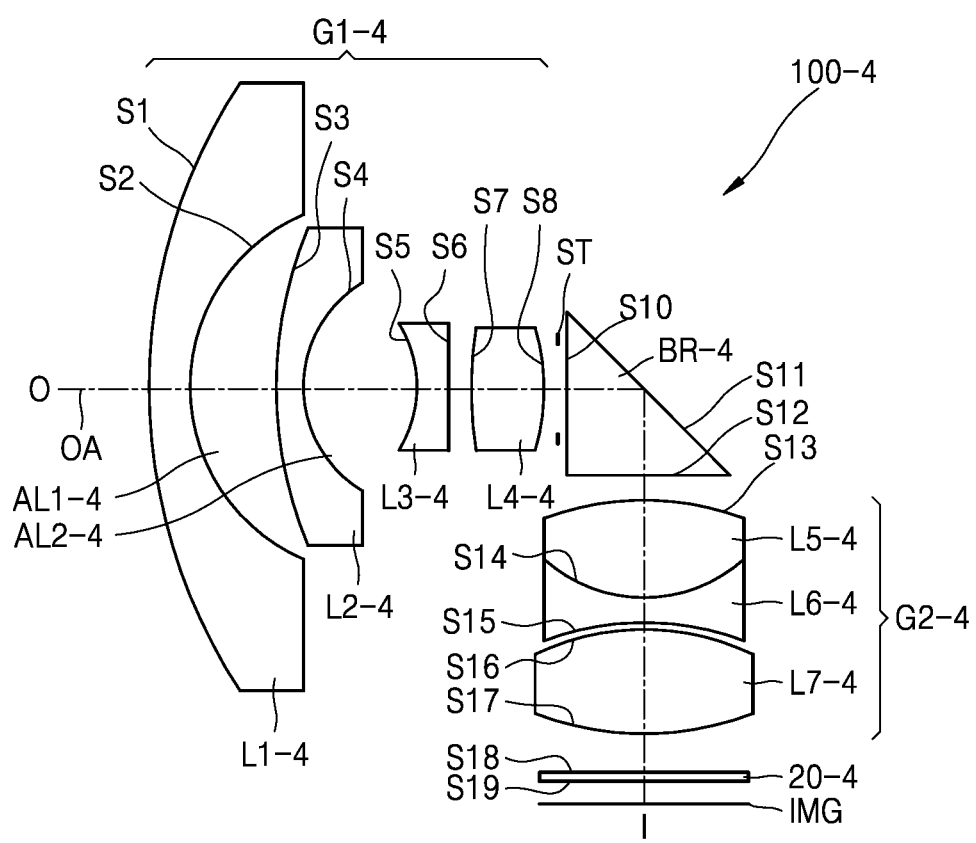
FIG. 8 illustrates an optical lens assembly according to a fourth embodiment.

FIG. 8 illustrates an optical lens assembly 100-4 according to a fourth embodiment.

According to the fourth embodiment, the optical lens assembly 100-4 may include a first lens group G1-4 and a second lens group G2-4 arranged from the object side O to the image side I. A bending unit BR-4 may be located between the first lens group G1-4 and the second lens group G2-4. The first lens group G1-4 may have, for example, positive refractive power. The second lens group G2-4 may have, for example, positive refractive power.

According to the third embodiment, the first lens group G1-4 may include a first lens L1-4, a second lens L2-4, a third lens L3-4, and a fourth lens L4-4 that are arranged from the object side O to the image side I. A first air lens AL1-4 may be provided between the first lens L1-4 and the second lens L2-4, and a second air lens AL2-4 may be provided between the second lens L2-4 and the third lens L3-4.

The first air lens AL1-4 may have negative refractive power and may have a convex surface S2 facing the object side O. The second air lens AL2-4 may have negative refractive power and may have two convex surfaces S4 and S5.

The first lens L1-4 may have negative refractive power. The first lens L1-4 may have, for example, a convex object side surface S1. The second lens L2-4 may have negative refractive power. The second lens L2-4 may have, for example, a convex object side surface S3. The third lens L3-4 may have negative refractive power. The third lens L3-4 may have, for example, a convex image side surface S6. The fourth lens L4-4 may have positive refractive power. The fourth lens L4-4 may be, for example, a biconvex lens.

The second lens group G2-4 may include, for example, a fifth lens L5-4 having positive refractive power, a sixth lens L6-4 having negative refractive power, and a seventh lens L7-4 having positive refractive power. The seventh lens L7-4 located closest to the image side I in the second lens group G2-4 may include at least one aspherical surface and may have a convex surface facing the image side I.

According to the fourth embodiment, at least one optical device 20-4 may be provided between the seventh lens L7-4 and the image plane IMG.

Figure 10:
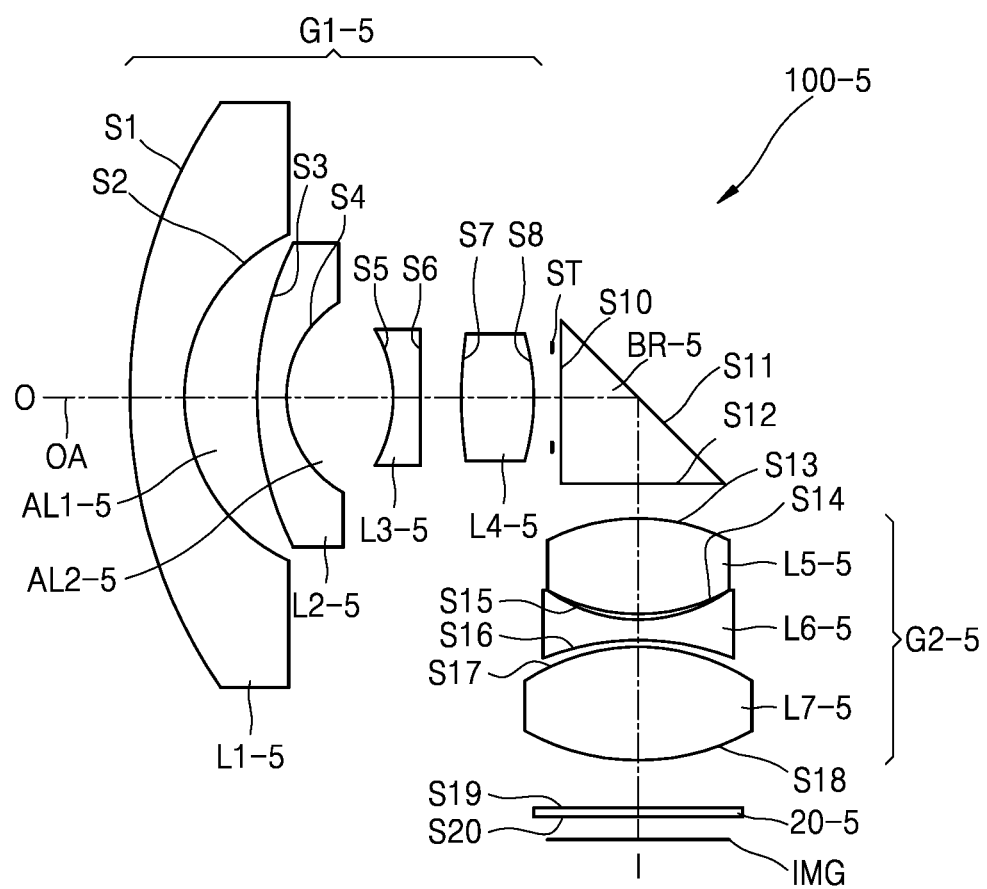
FIG. 10 illustrates an optical lens assembly according to a fifth embodiment.

FIG. 10 illustrates an optical lens assembly 100-5 according to a fifth embodiment.

According to the fifth embodiment, the optical lens assembly 100-5 may include a first lens group G1-5 and a second lens group G2-5 arranged from the object side O to the image side I. A bending unit BR-5 may be located between the first lens group G1-5 and the second lens group G2-5. The first lens group G1-5 may have, for example, positive refractive power. The second lens group G2-5 may have, for example, positive refractive power.

According to the fifth embodiment, the first lens group G1-5 may include a first lens L1-5, a second lens L2-5, a third lens L3-5, and a fourth lens L4-5 that are arranged from the object side O to the image side I. A first air lens AL1-5 may be provided between the first lens L1-5 and the second lens L2-5 and a second air lens AL2-5 may be provided between the second lens L2-5 and the third lens L3-5.

The first air lens AL1-5 may have negative refractive power and may have a convex surface S2 facing the object side O. The second air lens AL2-5 may have negative refractive power and may have a convex surface S4 facing the object side O.

The first lens L1-5 may have negative refractive power. The first lens L1-5 may have, for example, a convex object side surface S1. The second lens L2-5 may have negative refractive power. The second lens L2-5 may have, for example, a convex object side surface S3. The third lens L3-5 may have negative refractive power. The third lens L3-5 may have, for example, a convex object side surface S6. The fourth lens L4-5 may have positive refractive power. The fourth lens L4-5 may be, for example, a biconvex lens. The fourth lens L4-5 may also be an aspherical lens.

The second lens group G2-5 may include, for example, a fifth lens L5-5 having positive refractive power, a sixth lens L6-5 having negative refractive power, and a seventh lens L7-5 having positive refractive power. The fifth lens L5-5 and the sixth lens L6-5 may be cemented together. The seventh lens L7-5 located closest to the image side I in the second lens group G2-5 may include at least one aspherical surface and may have a convex surface facing the image side I. For example, the seventh lens L7-5 may be a biconvex lens.

According to the fifth embodiment, the iris diaphragm ST may be provided between the fourth lens L4-5 and the bending unit BR-5, and at least one optical device 20-5 may be provided between the seventh lens L7-5 and the image plane IMG.

Figure 12:
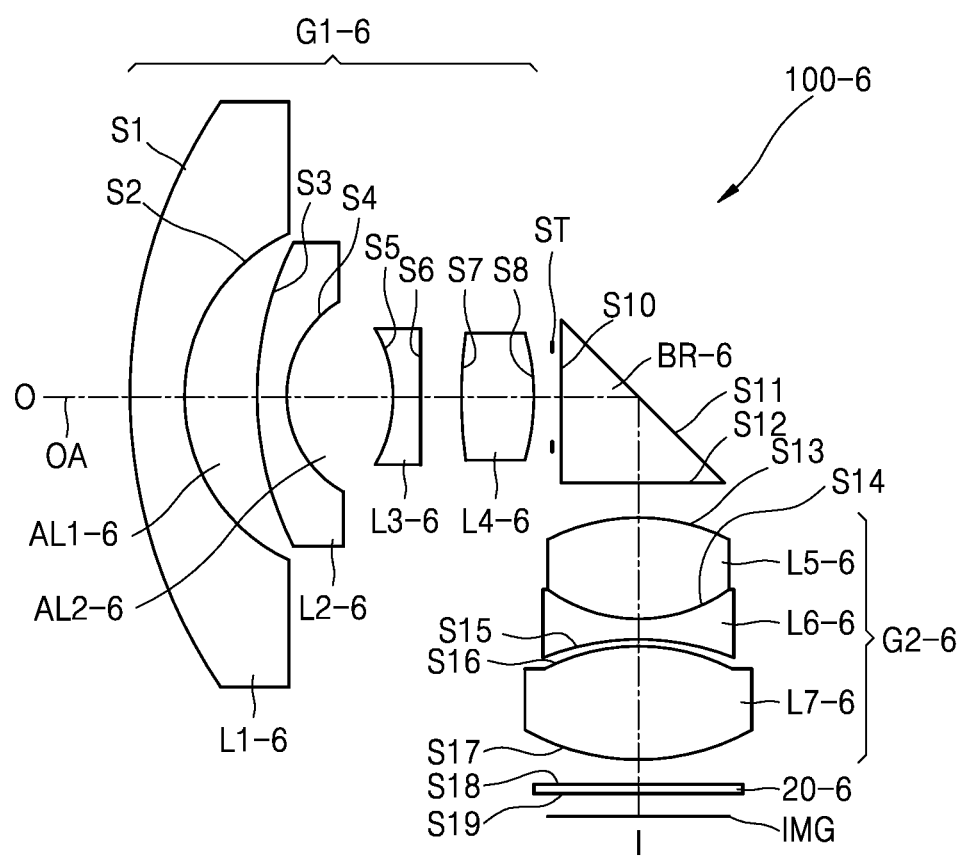
FIG. 12 illustrates an optical lens assembly according to a sixth embodiment.

FIG. 12 illustrates an optical lens assembly 100-6 according to a sixth embodiment.

According to the sixth embodiment, the optical lens assembly 100-6 may include a first lens group G1-6 and a second lens group G2-6 arranged from the object side O to the image side I. A bending unit BR-6 may be located between the first lens group G1-6 and the second lens group G2-6. The first lens group G1-6 may have, for example, positive refractive power. The second lens group G2-6 may have, for example, positive refractive power.

According to the sixth embodiment, the first lens group G1-6 may include a first lens L1-6, a second lens L2-6, a third lens L3-6, and a fourth lens L4-6 that are arranged from the object side O to the image side I. A first air lens AL1-6 may be provided between the first lens L1-6 and the second lens L2-6, and a second air lens AL2-6 may be provided between the second lens L2-6 and the third lens L3-6.

The first air lens AL1-6 may have negative refractive power and may have a convex object side surface S2 facing the object side O. The second air lens AL2-6 may have negative refractive power and may have two convex surfaces S4 and S5.

The first lens L1-6 may have negative refractive power. The first lens L1-6 may be a meniscus lens that is convex toward the object side O. The second lens L2-6 may have negative refractive power. The second lens L2-6 may be a meniscus lens that is convex toward the object side O. The third lens L3-6 may have negative refractive power. The third lens L3-6 may be a meniscus lens that is convex toward the object side O. The fourth lens L4-6 may have positive refractive power. The fourth lens L4-6 may be, for example, a biconvex lens. The fourth lens L4-6 may also be an aspherical lens.

The second lens group G2-6 may include, for example, a fifth lens L5-6 having positive refractive power, a sixth lens L6-6 having negative refractive power, and a seventh lens L7-6 having positive refractive power. The fifth lens L5-6 and the sixth lens L6-6 may be cemented together. The seventh lens L7-6 located closest to the image side I in the second lens group G2-6 may include at least one aspherical surface and may have a convex surface facing the image side I. For example, the seventh lens L7-6 may be a biconvex lens.

According to the sixth embodiment, the iris diaphragm ST may be provided between the fourth lens L4-6 and the bending unit BR-6, and at least one optical device 20-6 may be provided between the seventh lens L7-6 and the image plane IMG.

Figure 14:
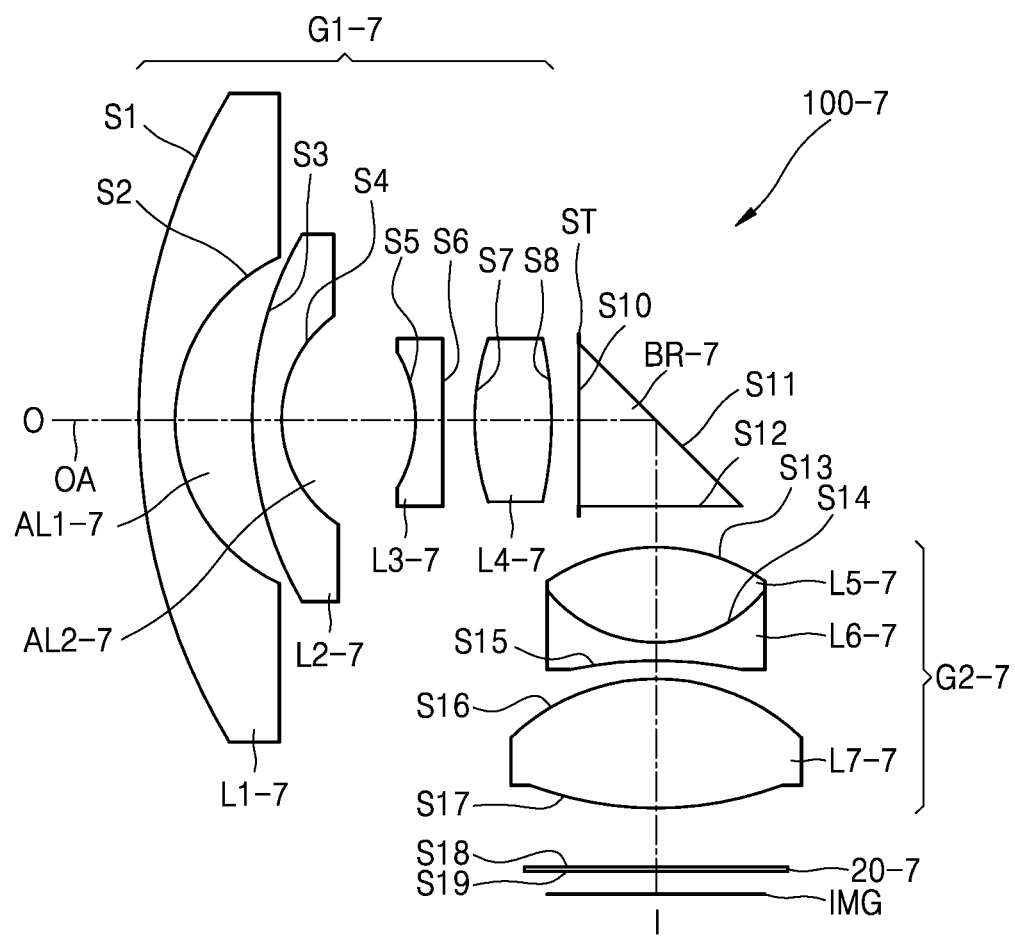
FIG. 14 illustrates an optical lens assembly according to a seventh embodiment.

FIG. 14 illustrates an optical lens assembly 100-7 according to a seventh embodiment.

According to the seventh embodiment, the optical lens assembly 100-7 may include a first lens group G1-7 and a second lens group G2-7 arranged from the object side O to the image side I. A bending unit BR-7 may be located between the first lens group G1-7 and the second lens group G2-7. The first lens group G1-7 may have, for example, positive refractive power. The second lens group G2-7 may have, for example, positive refractive power.

According to the seventh embodiment, the first lens group G1-7 may include a first lens L1-7, a second lens L2-7, a third lens L3-7, and a fourth lens L4-7 that are arranged from the object side O to the image side I. A first air lens AL1-7 may be provided between the first lens L1-7 and the second lens L2-7, and a second air lens AL2-7 may be provided between the second lens L2-7 and the third lens L3-7.

The first air lens AL1-7 may have negative refractive power and may have a convex surface S2 facing the object side O. The second air lens AL2-7 may have negative refractive power and may have two convex surfaces S4 and S5.

The first lens L1-7 may have negative refractive power. The first lens L1-7 may have, for example, a convex object side surface S1. The second lens L2-7 may have negative refractive power. The second lens L2-7 may have, for example, a convex object side surface S3. The third lens L3-7 may have negative refractive power. The third lens L3-7 may be, for example, a biconvex lens. The fourth lens L4-7 may have positive refractive power. The fourth lens L4-7 may include, for example, a convex image side surface S8. The fourth lens L4-7 having positive refractive power may be provided next to the second air lens AL2-7 on the image side I. The fourth lens L4-7 may be, for example, a biconvex lens. The fourth lens L4-7 may be an aspherical lens.

The second lens group G2-7 may include, for example, a fifth lens L5-7 having positive refractive power, a sixth lens L6-7 having negative refractive power, and a seventh lens L7-7 having positive refractive power. The seventh lens L7-7 located closest to the image side I in the second lens group G2-7 may include at least one aspherical surface and may have a convex surface facing the image side I. For example, the seventh lens L7-7 may be a biconvex lens.

According to the seventh embodiment, at least one optical device 20-7 may be provided between the seventh lens L7-7 and the image plane IMG.

Figure 16:
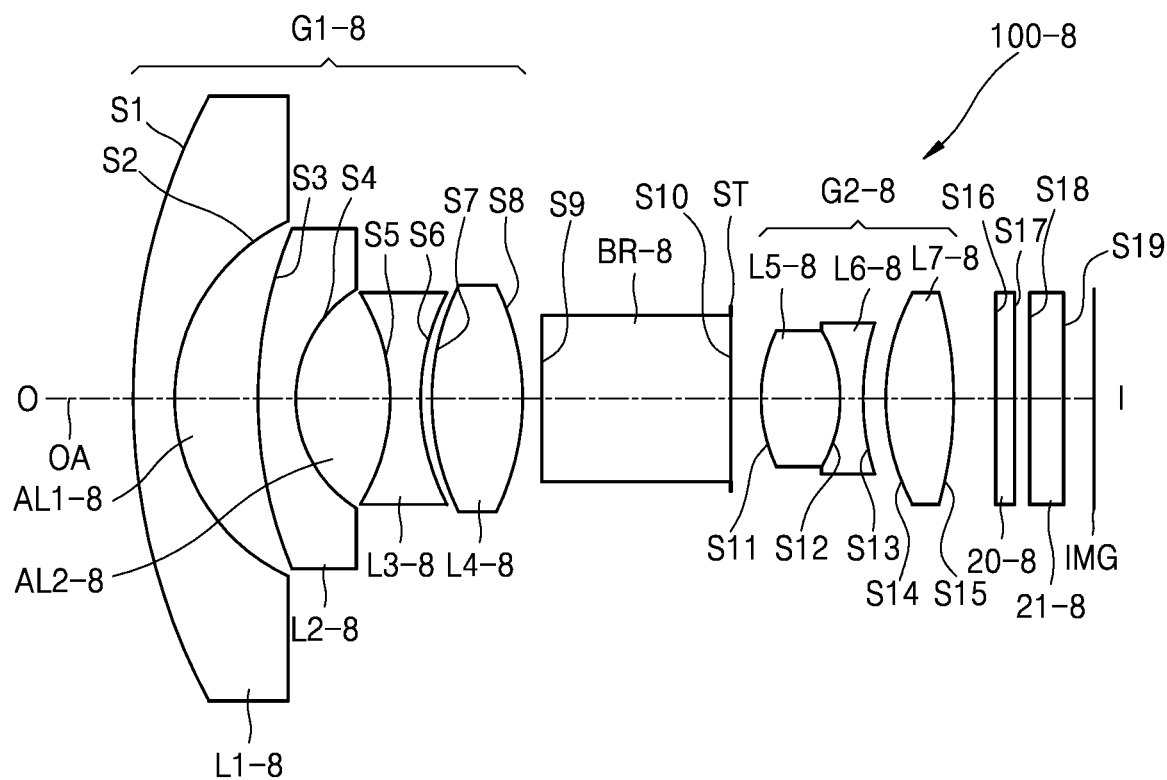
FIG. 16 illustrates an optical lens assembly according to an eighth embodiment.

FIG. 16 illustrates an optical lens assembly 100-8 according to an eighth embodiment.

According to the eighth embodiment, the optical lens assembly 100-8 may include a first lens group G1-8 and a second lens group G2-8 arranged from the object side O to the image side I. A bending unit BR-8 may be located between the first lens group G1-8 and the second lens group G2-8. The bending unit BR-8 may include a reflector or a prism. The first lens group G1-8 may have, for example, positive refractive power. The second lens group G2-8 may have, for example, positive refractive power. FIG. 16 illustrates when the optical path of the optical lens assembly 100-8 is straight.

According to the eighth embodiment, the first lens group G1-8 may include a first lens L1-8, a second lens L2-8, a third lens L3-8, and a fourth lens L4-8 that are arranged from the object side O to the image side I. A first air lens AL1-8 may be provided between the first lens L1-8 and the second lens L2-8, and a second air lens AL2-8 may be provided between the second lens L2-8 and the third lens L3-8.

The first air lens AL1-8 may have negative refractive power and may have a convex surface S2 facing the object side O. The second air lens AL2-8 may have negative refractive power and may have two convex surfaces S4 and S5.

The first lens L1-8 may have negative refractive power. The first lens L1-8 may have, for example, a convex object side surface S1. The second lens L2-8 may have negative refractive power. The second lens L2-8 may have, for example, a convex object side surface S3. The second lens L2-8 may be an aspherical lens. The third lens L3-8 may have negative refractive power. The third lens L3-8 may include, for example, a concave image side surface S6. The third lens L3-8 may be a biconcave lens. The fourth lens L4-8 having positive refractive power may be provided next to the second air lens AL2-8 on the image side I. The fourth lens L4-8 may be an aspherical lens. The fourth lens L4-8 may include, for example, a concave image side surface S8 facing the image side I.

The second lens group G2-8 may include, for example, a fifth lens L5-8 having positive refractive power, a sixth lens L6-8 having negative refractive power, and a seventh lens L7-8 having positive refractive power. The seventh lens L7-8 located closest to the image side I in the second lens group G2-8 may include at least one aspherical surface and may have a convex surface facing the image side I. For example, the seventh lens L7-8 may be a biconvex lens.

According to the eighth embodiment, one or more optical devices 20-8 and 21-8 may be provided between the seventh lens L7-8 and the image plane IMG.

Figure 18:
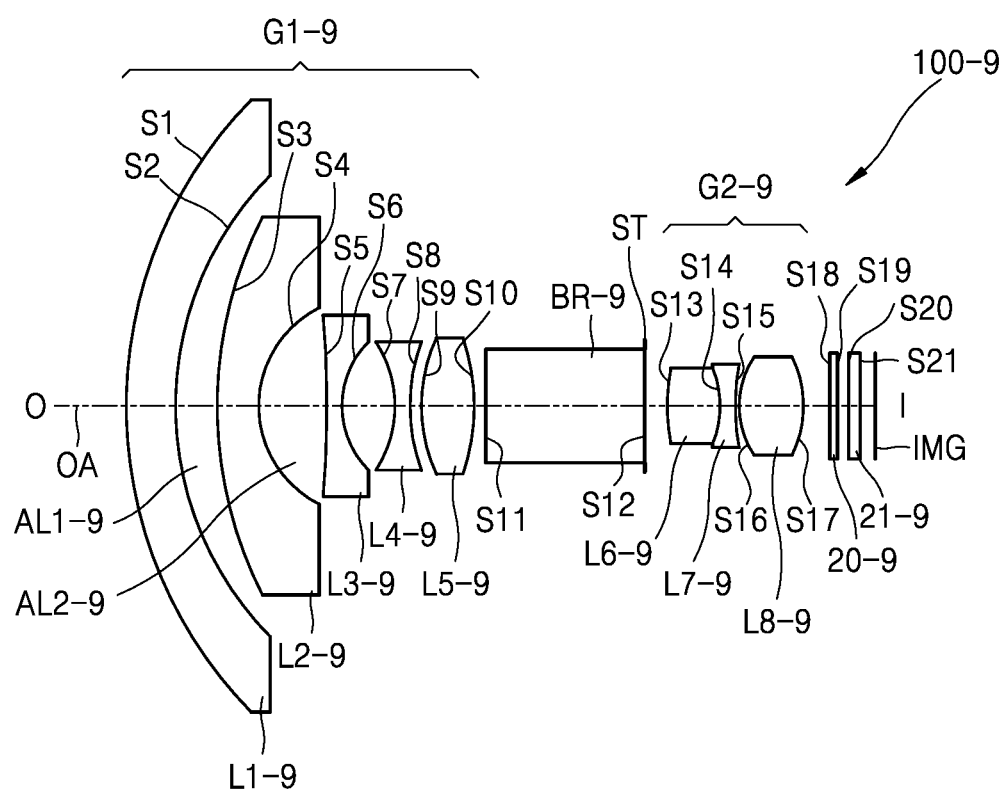
FIG. 18 illustrates an optical lens assembly according to a ninth embodiment.

FIG. 18 illustrates an optical lens assembly 100-9 according to a ninth embodiment.

According to the ninth embodiment, the optical lens assembly 100-9 may include a first lens group G1-9 and a second lens group G2-9 arranged from the object side O to the image side I. A bending unit BR-9 may be located between the first lens group G1-9 and the second lens group G2-9. The bending unit BR-9 may include, for example, a reflector or a prism. The first lens group G1-9 may have, for example, negative refractive power. The second lens group G2-9 may have, for example, positive refractive power.

According to the ninth embodiment, the first lens group G1-9 may include a first lens L1-9, a second lens L2-9, a third lens L3-9, a fourth lens L4-9, and a fifth lens L5-9 that are arranged from the object side O to the image side I. The first lens L1-9 may be a cover lens for protecting the optical lens assembly 100-9 from external impacts. A first air lens AL1-9 may be provided between the second lens L2-9 and the third lens L3-9, and a second air lens AL2-9 may be provided between the third lens L3-9 and the fourth lens L4-9.

The first air lens AL1-9 may have negative refractive power and may have a convex surface S4 facing the object side O. The second air lens AL2-9 may have negative refractive power and may have two convex surfaces S6 and S7.

The first lens L1-9, which is the cover lens, may have no refractive power or weak refractive power. The second lens L2-9 may have negative refractive power. The second lens L2-9 may have, for example, a convex object side surface S3. The third lens L3-9 may have negative refractive power. The third lens L3-9 may have, for example, a concave object side surface S5. The third lens L3-9 may be an aspherical lens. The fourth lens L4-9 may have negative refractive power. The fourth lens L4-9 may include, for example, a concave image side surface S8. The fourth lens L4-9 may be a biconcave lens. The fifth lens L5-9 having positive refractive power may be provided next to the second air lens AL2-9 on the image side I. The fifth lens L5-9 may be an aspherical lens. The fifth lens L5-9 may include, for example, a convex image side surface S10 facing the image side I.

The second lens group G2-9 may include, for example, a sixth lens L6-9 having positive refractive power, a seventh lens L7-9 having negative refractive power, and an eighth lens L8-9 having positive refractive power. The eighth lens L8-9 located closest to the image side I in the second lens group G2-9 may include at least one aspherical surface and may have a convex surface facing the image side I. For example, the eighth lens L8-9 may be a biconvex lens.

According to the ninth embodiment, one or more optical devices 20-9 and 21-9 may be provided between the eighth lens L8-9 and the image plane IMG.

In the optical lens assembly according to various embodiments, the first lens group may have positive or negative refractive power and the second lens group may have positive refractive power. The optical lens assembly may obtain super-wide-angle maximum viewing angles of, for example, 130° or more through power distribution of lenses of each lens group. In other embodiments, the optical lens assembly may have super-wide-angle maximum viewing angles of, for example, 130° to 240° and may exhibit small Petzval sums, spherical aberration control, and distortion control. In still other embodiments, the optical lens assembly may have viewing angles of 180° or more.

The optical lens assembly according to various embodiments may include a first air lens having negative refractive power and having a convex surface facing the object side and a second air lens having negative refractive power and having two convex surfaces. Accordingly, for peripheral light beams, the difference between the incidence angle and the emission angle at each lens surface may be small, and thus astigmatic field curvature, astigmatism, and peripheral coma may be corrected. Also, when the lens of the second lens group that is located closest to the image side is a positive lens and has a convex surface facing the image side I, the focal length, the chief ray angle (CRA), and exit pupil characteristics may be controlled while light beams are properly converged by the optical lens assembly. In another example, when the lens of the second lens group that is located closest to the image side is an aspherical lens, the astigmatic field curvature and the astigmatism may be corrected while reducing the CRA.

The optical lens assembly according to various embodiments may satisfy the following formula. The following formula will be described with reference to the optical lens assembly 100-1 of FIG. 1 according to the first embodiment. However, the following formula may also be similarly applied to other embodiments. In the relevant embodiments, the bending unit BR-1 may include a reflective surface RS for reflecting light.

$$(EffDR^2)/(F^*2Y)<3.0 \qquad (1)$$

where EffDR denotes the effective diameter of the reflective surface RS, F denotes the total focal length of the optical lens assembly 100-1, and Y denotes the maximum image height.

A circular light beam intersecting the reflective surface RS may form an ellipse on the reflective surface RS when the reflective surface RS is not perpendicular to the direction of the light beam. The effective diameter of the reflective surface RS may refer to the major or minor axis of the ellipse.

When the reflective surface RS satisfies Formula 1, the total length and the outer diameter of the first lens group G1-1 may be minimized and the size of the bending unit BR-1 may be reduced.

The optical lens assembly 100-1 according to various embodiments may also satisfy the following formula.

$$d1/d2<1.0 \qquad (2)$$

$$5<d1/F<10 \qquad (3)$$

where F denotes the total focal length of the optical lens assembly 100-1, d1 denotes the distance on the optical axis from an entrance pupil to the reflective surface RS, and d2 denotes the distance on the optical axis from the reflective surface RS to the image plane.

Formula 2 defines a size relationship between the portion of the optical lens assembly 100-1 in front of the bending unit BR-1 and the portion of the optical lens assembly 100-1 at the back of the bending unit BR-1. When a light ray is incident on the optical lens assembly 100-1 from the object side O, it may mean that the ray is incident on the entrance pupil in view of paraxial optics. Accordingly, the parallax effect of the object imaged by a plurality of cameras or the interpupillary distance (IPD) of a stereoscopic three-dimensional (3D) camera should be checked based on the entrance pupil. Formula 2 requires that the distance d1 from the entrance pupil to the reflective surface RS of the bending unit BR-1 is less than the distance d2 from the reflective surface RS to the image plane. Thus, the total length of the optical lens assembly 100-1 may be reduced. When the total length or the distance d1 is reduced, the optical lens assembly 100-1 may be made to be compact so that a designer has comparably more freedom to arrange the imaging apparatus in various configurations. Accordingly, when the electronic apparatus includes a plurality of optical lens assemblies that are disposed within limited space, adjustments in the placements of the optical lens assemblies can be more easily made so that the optical path difference between the plurality of optical lens assemblies may be more freely adjusted.

When the d1/F value is less than 5, it indicates that distance d1 is reduced. However, in this case, it may be difficult to correct aberration when the viewing angle is large, for example, 180° or more. Accordingly, the optical lens assembly sensitivity may be increased. When the d1/F value is greater than 10, sensitivity may be low and aberration correction may be facilitated. However, since it also means that the distance d1 is increased, adjustments in the placements of the optical lens assemblies are more difficult.

The optical lens assembly 100-1 according to various embodiments may also satisfy the following formula.

$$-80 < Fair1/F < -4 \quad (4)$$

$$-3.7 < Fair2/F < -1 \quad (5)$$

where F denotes the total focal length of the optical lens assembly 100-1, Fair1 denotes the focal length of the first air lens AL1-1, and Fair2 denotes the focal length of the second air lens AL2-1.

Formulas 4 and 5 are conditions for ensuring proper refractive power arrangement, aberration correction, and aberration balance for optical lens assemblies that have small total lengths, small outer diameters, small overall sizes, and large apertures. Formulas 4 and 5 also ensures that the viewing angle, peripheral magnification, CRA, and peripheral performance of the optical lens assembly are suitable for super-wide-angle lens systems that capture omnidirectional images.

A focal length of an air lens may be obtained as follows. When the refractive index of the lens located on the object side of the air lens is denoted by n1, the refractive index of air is denoted by n2, the refractive index of the lens located on the image side of the air lens is denoted by n3, the length of air gap along the optical axis is denoted by L, the curvature radius of the object side surface of the air lens is denoted by R1, and the curvature radius of the image side surface of the air lens is denoted by R2, the equation of the effective focal length E.F.L of the air lens is as follows.

$$E.F.L. = \frac{1}{\frac{n_2 - n_1}{n_3 R_1} + \frac{n_3 - n_2}{n_3 R_2} - \frac{(n_2 - n_1)(n_3 - n_2)}{n_2 n_3 R_1 R_2} D} \quad (A)$$

Since the refractive index of air is 1, 1 may be substituted for n2 in Equation (A):

$$E.F.L. = \frac{1}{\frac{1 - n_1}{n_3 R_1} + \frac{n_3 - 1}{n_3 R_2} - \frac{(1 - n_1)(n_3 - 1)}{n_3 R_1 R_2} D} \quad (B)$$

Differences between the incidence angle and the emission angle of peripheral light rays at each lens surface may be small due to the first air lens AL1-1 and the second air lens AL2-1 of the first lens group G1-1. Thus, astigmatic field curvature, astigmatism, and peripheral coma may be corrected. Also, when the lens of the second lens group G2-1 that is located closest to the image side is a positive lens having a convex shape facing the image side, the focal length, the CRA, and exit pupil characteristics may be controlled while properly converging light rays. For example, when the lens of the second lens group G2-1 that is located closest to the image side is a positive lens, and the first lens group G1-1 has positive refractive power, the effective diameter of the first lens on the object side O may be reduced, and the size of the reflective surface of the bending unit BR-1 may be reduced.

Formula 4 defines a relationship between the refractive power of the first air lens AL1-1 of the first lens group G1-1 and the total focal length of the optical lens assembly 100-1. When the refractive power of the first air lens AL1-1 is relative strong such that (Fair1/F) exceeds an upper limit of Formula 4, it may be difficult to correct astigmatic field curvature, astigmatism, and peripheral coma. In order to correct such aberrations, the first lens group G1-1 has to use an aspherical lens having a complex shape. When the (Fair1/F) value exceeds a lower limit of Formula 4, it may be difficult to reduce the total length of the optical lens assembly 100-1. When the upper limit of Formula 4 is less than −4.0, it may be easier to manufacture of the aspherical surface of the first lens group G1-1 and the eccentric sensitivity of the aspherical surface may be reduced. When Formula 4 is satisfied, the total length of the optical lens assembly 100-1 may be reduced and sensitivity may be reduced while high optical performance may be maintained, even in the periphery of the image plane. Astigmatic field curvature, astigmatism, and coma in the second air lens AL2-1 may also be corrected, and spherical aberration and sagittal coma due to large apertures may also be corrected. When the Fair2/F value exceeds an upper limit of Formula 5, it is difficult to correct aberrations, and when the Fair2/F value exceeds a lower limit, it is difficult to reduce the total length of the optical lens assembly 100-1.

When a positive lens (e.g., the fourth lens L4-1) is located next to the second air lens AL2-1 on the image side I, the Petzval sum may be small, uniform performance may be ensured in the periphery of the image plane, and the size of the bending unit BR-1 may also be reduced. In the first lens group G1-1, when lenses close to the object side O are made of crown glass and have negative refractive power and lenses close to the image side I are made of flint glass and have positive refractive power, magnification chromatic aberration may be suppressed. Magnification chromatic aberration may also be corrected when the second lens group G2-1 includes a positive crown lens and a negative flint lens. For example, when materials having refractive index Np1>1.8 is used for lenses having positive refractive power, the Petzval sum may be easily corrected. Material costs may be reduced when materials having refractive indices Np1>1.75 are used.

The optical lens assembly 100-1 according to various embodiments may also satisfy the following formula.

According to various embodiments, the first lens group G1-1 may include a double-sided aspherical lens having negative refractive power. In FIG. 1, the second lens L2-1 may be a double-sided aspherical lens having a negative refractive power.

$$0.8 < EffD2asp1/2Y < 1.6 \quad (6)$$

where EffD2asp1 denotes the effective diameter of the image side surface of the double-sided aspherical lens and Y denotes the maximum image height.

As shown in Formula 6, the outer diameter of the aspherical lens L2-1 may be specified so that distortion, astigmatic field curvature, and astigmatism are appropriately controlled by the aspherical lens L2-1 in the first lens group G1-1. That is, Formula 6 defines the size of the aspherical lens of the first lens group G1-1. When the EffD2asp1/2Y value is less than 0.8, the size of the aspherical lens is reduced but it is difficult to correct distortion and peripheral astigmatic field curvature. When the EffD2asp1/2Y value is greater than 1.6, the outer diameter of the aspherical lens and outer diameters of lenses of the first lens group G1-1 are increased, thereby making manufacturing of first lens group G1-1 difficult and increasing manufacturing costs.

The optical lens assembly 100-1 according to various embodiments may also satisfy the following formula.

When the bending unit BR-1 includes a prism and a d-Line refractive index of the prism is Np, the prism may satisfy the following formula.

$$Np > 1.75 \quad (7).$$

When Np satisfies Formula 7, the size of the prism is reduced and manufacturing costs may be reduced. To this end, in the optical lens assembly 100-1 according to various embodiments, the first lens group G1-1 may have a combination of lenses with strong negative refractive power and strong positive refractive power and the first lens group G1-1 itself on the whole may have positive refractive power. When Np satisfies Formula 7, the size of the prism may be reduced, which allows the outer diameter of the first lens group G1-1 to be also reduced. When the prism is compact, it may be more easily disposed within the optical lens assembly 100-1. For example, the optical lens assembly 100-1 may include a prism where Np>1.9.

In this case, when the optical path increase due to the prism is ΔL, the refractive index of the prism is Np, and the thickness of the prism on the optical axis is d, the optical path increase ΔL is as follows.

$$\Delta L = \left(1 - \frac{1}{Np}\right) * d. \quad (C)$$

When the refractive index of the prism is increased, the optical path increase ΔL also increases, which provides more options for the placement of the optical lens assembly. However, costs are increased. On the other hand, when a material having a high refractive index is used, astigmatism is easily corrected.

The optical lens assembly 100-1 according to various embodiments may also satisfy the following formula.

$$2.5 < F2/F < 5.0 \quad (8)$$

where F denotes the total focal length of the optical lens assembly 100-1 and F2 denotes the focal length of the second lens group G2-1.

When the F2/F value satisfies Formula 8, the refractive powers may be appropriately distributed among the components of the optical lens assembly 100-1. The focal lens, the optical total length, the F-number, and the CRA of the optical lens assembly 100-1 may also be within acceptable parameters, and various aberrations may be appropriately corrected. Accordingly, tolerances during manufacture may be maintained at an appropriate level. When (F2/F) is close to the lower limit of Formula 8, the refractive power of the second lens group G2-1 may be reduced, the total length of the optical lens assembly may have an appropriate value, and aberration control may be facilitated. An appropriate refractive power of the optical lens assembly 100-1 may be secured by using the upper limit in Formula 8. When the F2/F value exceeds the lower limit of Formula 8, the eccentric sensitivity in the second lens group G2-1 may be increased to an unacceptable value.

The bending unit BR-1, which may be a prism, may have a first surface S10 facing the first lens group G1-1 and a second surface S12 facing the second lens group G2-1. The areas of the first surface S10 and the second surface S12 may be different from each other. For example, in order to prevent interference between the prism and other components of the electronic apparatus, an edge of the prism may be cut as long as the effective diameter of the prism is not affected. For example, the second surface of the prism may have an area that is smaller than that of the first surface.

The optical lens assembly 100-1 according to various embodiments may also satisfy the following formula.

The second lens group G2-1 may include the seventh lens L7-1 that is located closest to the image side I and has a convex surface facing the image side I. The seventh lens L7-1 may also have positive refractive power, and may include an aspherical surface.

$$1.8 < Fp2/F < 3.7 \quad (9)$$

where F denotes the total focal length of the optical lens assembly 100-1 and Fp2 denotes the focal length of the seventh lens L7-1.

When the optical lens assembly 100-1 according to various embodiments satisfies Formula 9, where the seventh lens L7-1 is a positive lens having a convex shape facing the image side I, the focal length, the CRA, and exit pupil characteristics may be adjusted while properly converging the light rays passing through the optical lens assembly 100-1. When the Fp2/F value exceeds 3.7, the CRA is increased and the optical total length is increased. In contrast, when the Fp2/F value is lower than 1.8, the refractive power of the seventh lens L7-1 is increased, and it may be difficult to correct astigmatic field curvature. Likewise, sensitivity of the seventh lens L7-1 may also increase. For example, the optical lens assembly 100-1 according to various embodiments may satisfy 2<Fp2/F<3.5.

The optical lens assembly 100-1 according to various embodiments may also satisfy the following formula.

$$0.8 < (dY/d\theta)(\theta)/(dY/d\theta)(0) < 1.2$$

$$0 \le \theta \le (FOV/2) \quad (10)$$

where FOV denotes the maximum viewing angle, and dY/dθ(θ) denotes a first-order differential function for θ with respect to a function Y=f(θ) representing a relationship between the viewing angle θ and the image height Y.

Formula 10 defines a mapping function of the optical lens assembly 100-1 according to various embodiments. For example, Y=F×θ may be used in the case of linear scaled equidistance mapping, and Y=2F×tan(θ/2) may be used in the case of stereographic mapping. However, the present disclosure is not limited thereto, and various mapping methods may be used herein.

When the (dY/dθ)(θ)/(dY/dθ) value is less than 0.8, the magnification of an image periphery may be less than the magnification of an image center and thus it may be the peripheral resolution of the image may be insufficient. When the (dY/dθ)(θ)/(dY/dθ) value is greater than 1.2, the magnification of the image periphery may be greater than the magnification of an image center and thus the peripheral resolution may be sufficient but it may be difficult to control the eccentric sensitivity of aspherical surfaces of the optical lens assembly 100-1.

The optical lens assembly 100-1 according to various embodiments may also satisfy the following formula.

$$L_{FR}/F < 15 \quad (11)$$

$$CA_{1ST}/F < 20 \quad (12)$$

where F denotes the total focal length of the optical lens assembly 100-1, $L_{FR}$ denotes the distance between the object side surface of the first lens of the first lens group G1-1 that is located closest to the object side and the position where light is bent by the bending unit BR-1, and $CA_{1ST}$ denotes the effective diameter of the first lens of the first lens group G1-1 that is located closest to the object side based on a viewing angle of 180°.

When the $L_{FR}/F$ value satisfies Formula 11, the spaces between the plurality of lenses may be reduced and the distance from the first lens to the bending unit BR-1 may be reduced. When the $L_{FR}/F$ value exceeds 15, the spaces between the plurality of lenses are increased and it would be difficult to realize a high-performance system for capturing omnidirectional images due to parallax between two optical lens assemblies.

Formula 12 is a condition for reducing the size of the optical lens assembly 100-1. When the $CA_{1ST}/F$ value exceeds 20, the size of the first lens group G1-1 is increased such that the optical lens assembly 100-1 may not be sufficiently compact.

The optical lens assembly 100-1 according to various embodiments may also satisfy the following formula.

Referring to FIG. 18, the first lens group G1-9 may include a protective lens L1-9 located closest to the object side O.

$$2000 < f_{cover}^2/F \quad (13)$$

where $f_{cover}$ denotes the focal length of the protective lens L1-9 of the first lens group G1-9 and F denotes the focal length of the optical lens assembly.

The protective lens L1-9 prevents the lenses in the optical lens assembly 100-1 from being damaged by external forces. The protective layer L1-9 may have no refractive power or minimal refractive power in order to not affect the performance of the optical lens assembly 100-1. When the $f_{cover}^2/F$ value is less than 2000, the refractive power of the protective lens L1-9 may be too strong, which may alter the focal length of the optical lens assembly 100-1 and the aberration characteristics. Similarly, when the protective lens L1-9 has excessive refractive power, distortion may be increased, and the viewing angle of the optical lens assembly 100-1 may be different from the desired viewing angle.

The optical lens assembly 100-1 according to various embodiments may realize a super wide angle and may obtain an omnidirectional image in a range of 360°. For example, when a viewing angle is 190° or more, an image in a direction perpendicular to an optical axis may be acquired. The acquisition of the image in a direction perpendicular to the optical axis enables the acquisition of the omnidirectional image. For example, an image having the maximum spherical viewing angle of 4 pi radians may be acquired by using two optical lens assemblies according to one embodiment. Accordingly, it may be possible to implement an omnidirectional optical lens assembly that may capture not only a horizontal 360°-image but also an entire spherical image having the maximum spherical viewing angle of 4 pi radians.

In one exemplary embodiment, when the number of sides of a regular polyhedron is N, N optical lens assemblies according to various embodiments may be disposed on the vertices of the regular polyhedron. In this case, it may be possible to implement an omnidirectional optical system that may capture entire spherical images, where the spherical images are created by stitching together the plurality of images acquired by the N number of optical lens assemblies.

Also, for example, assuming there is a plane parallel to a virtual ground surface and assuming there is a regular polygon with M sides on the plane, it may be possible to implement an omnidirectional optical system that may capture entire spherical images by mounting M or 2M optical lens assemblies at the vertices of the regular polygon. The spherical images may be created by stitching the plurality of images acquired by the M or 2M number of optical lens assemblies.

In particular, according to the present disclosure, the optical path differences between N optical lens assemblies may be adjusted by allowing each optical lens assembly to include a bending unit for bending the optical paths between the first lens group and the second lens group.

Figure 20:
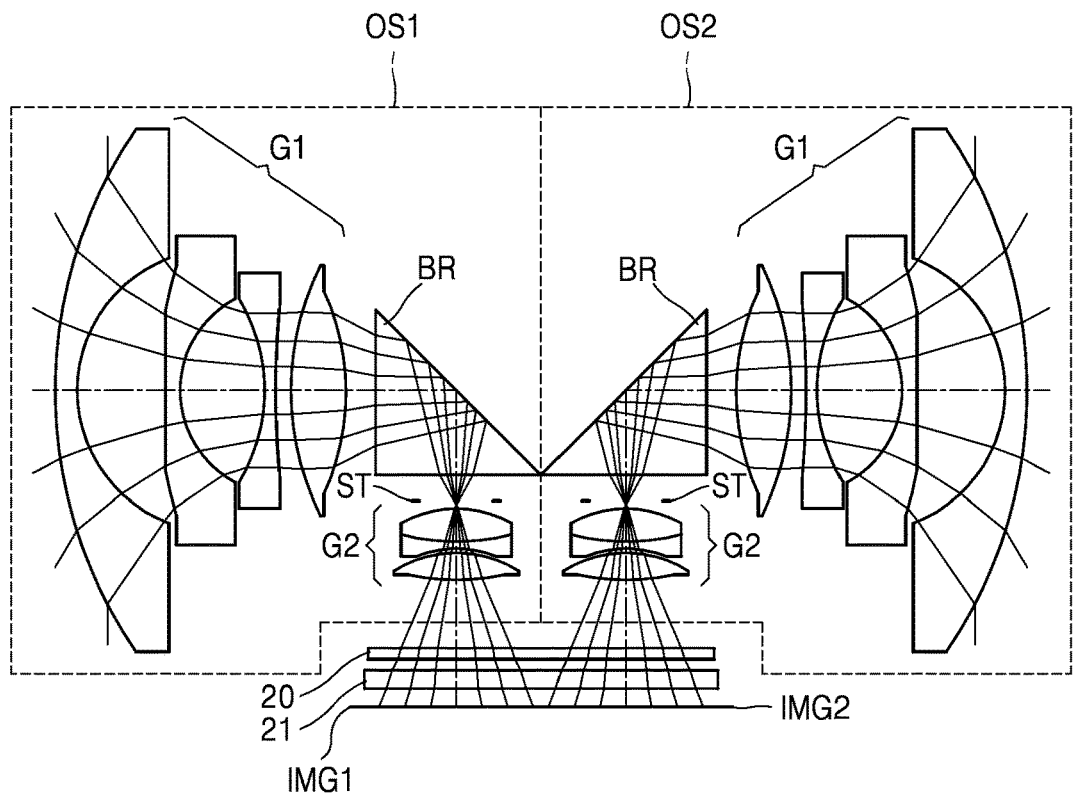
FIG. 20 illustrates an example where two optical lens assemblies are provided and image sensors are located in parallel according to one embodiment.

FIG. 20 illustrates an example where two optical lens assemblies are provided according to one embodiment. Each of a first optical lens assembly OS1 and a second optical lens assembly OS2 may include a first lens group G1, a bending unit BR, and a second lens group G2. The bending unit BR of the first optical lens assembly OS1 and the bending unit BR of the second optical lens assembly OS2 may be arranged to bend optical paths to the same direction, i.e. towards the image sensors IMG1 and IMG2. The first image sensor IMG1 detects an image of the first optical lens assembly OS1 and the second image sensor IMG2 detects an image of the second optical lens assembly OS2. The image sensors IMG1 and IMG2 may be arranged on one plane. The first image sensor IMG1 and the second image sensor IMG2 may be separately configured or integrated into one component. A first optical device 20 and a second optical device 21 may be provided between the second lens group G2 and the image sensor IMG.

In one embodiment, when the distance between entrance pupil and the bending units of the two optical lens assemblies is reduced, the minimum photographing distance at the boundary of each of the two optical lens assemblies may be correspondingly reduced. Thus, when the minimum photographing distance at the boundary of each optical lens assembly is Dmin, the half field of view of the optical lens assembly is w, the optical total length of the optical lens assembly is OAL, the maximum image height is Y, and the distance on the optical axis from the entrance pupil to a reflective surface of the bending unit is d1, the imaging apparatus of FIG. 20 has the minimum focus distance Dmin satisfying $$D\min > \frac{d1 + Y}{|\tan(w)|},$$

where as the distance d1 decreases, the minimum focus distance Dmin also decreases.

Figure 21:
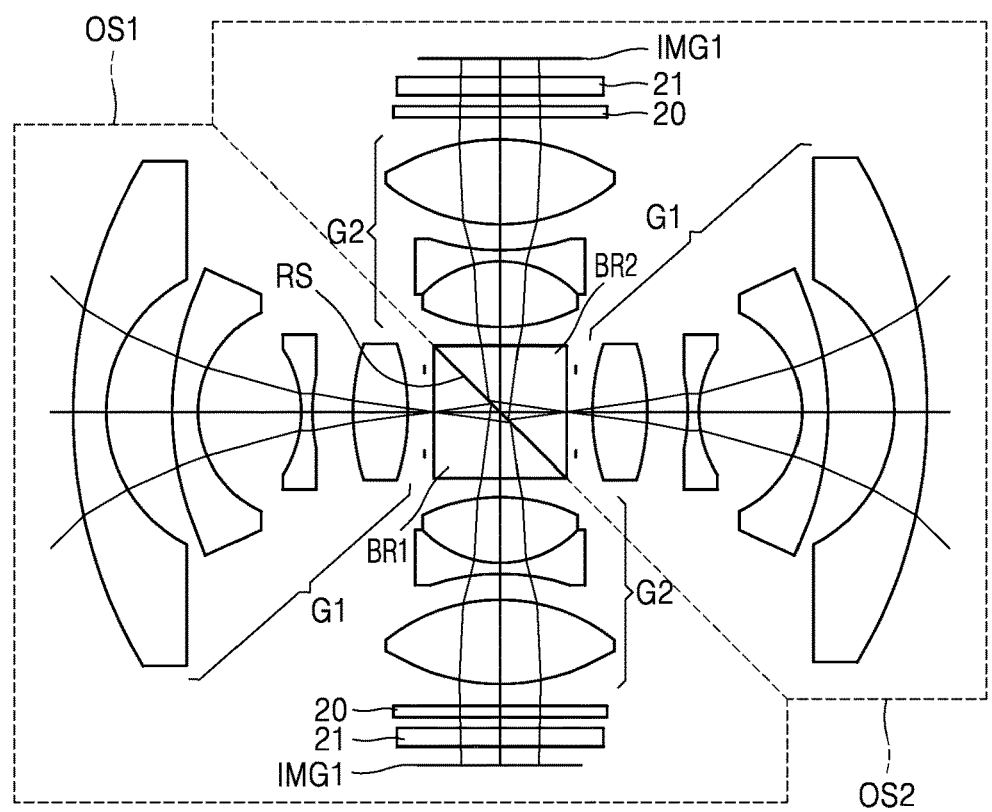
FIG. 21 illustrates an example where two optical lens assemblies are provided and image sensors face each other according to one embodiment.

FIG. 21 illustrates an example where the bending unit BR1 of the first optical lens assembly OS1 and the bending unit BR2 of the second optical lens assembly OS2 are arranged to bend optical paths in different directions. The second lens group G2 of each optical lens assembly may be located along the optical path bent by the bending unit BR. According to one embodiment, optical paths may be bent to opposite directions by the bending unit BR1 of the first optical lens assembly OS1 and the bending unit BR2 of the second optical lens assembly OS2. In this case, the reflective surfaces RS of the bending unit BR1 of the first optical lens assembly OS1 and the bending unit BR2 of the second optical lens assembly OS2 may face each other. When the bending units BR1 and BR2 are prisms, the two prisms may be joined together. The image sensor IMG1 of the first optical lens assembly OS1 and the image sensor IMG2 of the second optical lens assembly OS2 may be arranged at different locations or arranged to face each other. A plurality of optical lens assemblies may be designed to be arranged by using the bending units BR1 and BR2 so as to minimize the optical path difference between adjacent optical lens assemblies. Due to the compactness of the optical lens assemblies, heat generated by the corresponding imaging apparatus may be more easily dissipated.

Figure 22:
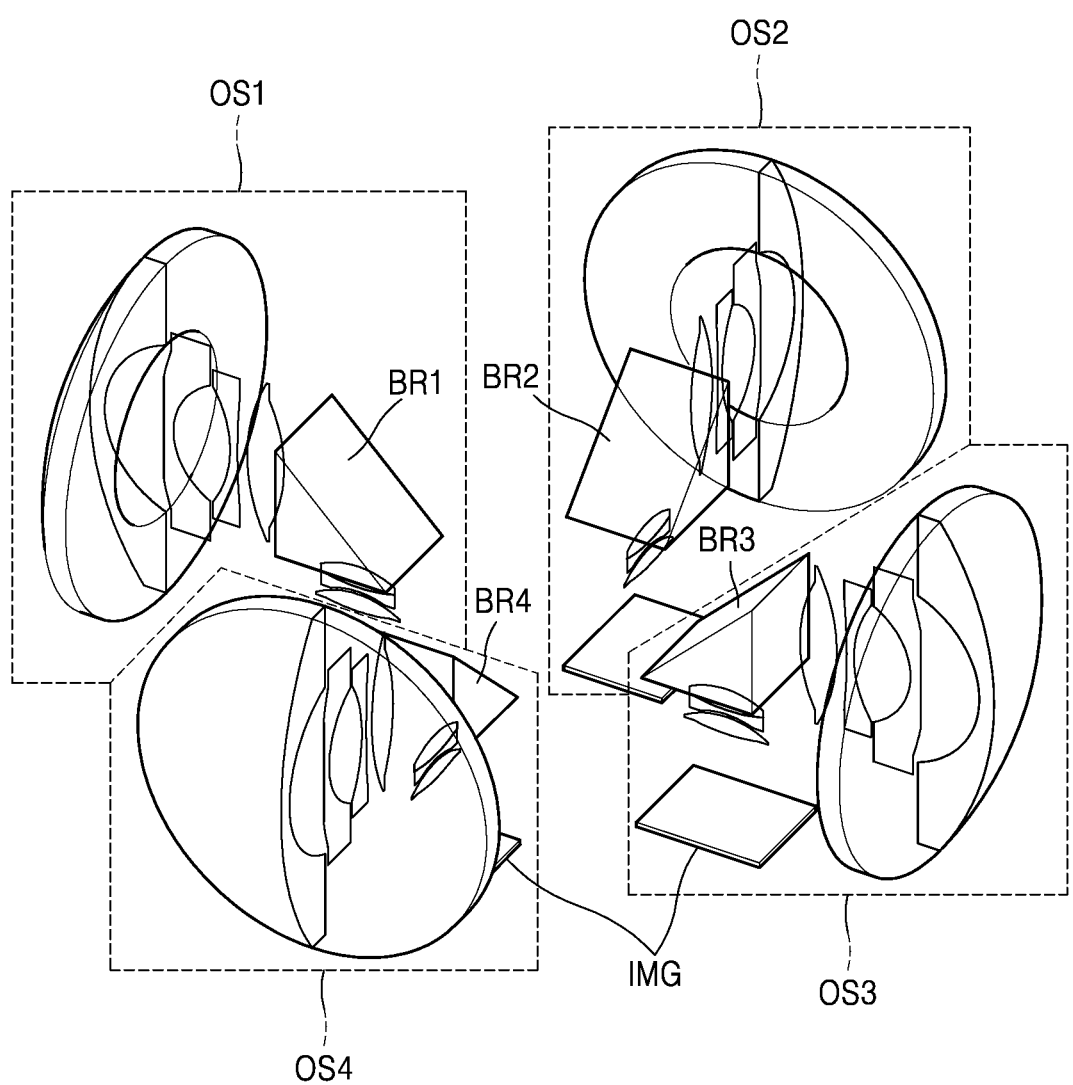
FIG. 22 illustrates an example where four optical lens assemblies are provided according to one embodiment.

FIG. 22 illustrates an example where first through fourth optical lens assemblies OS1, OS2, OS3, and OS4 are provided according to one embodiment. First through fourth bending units BR1, BR2, BR3, and BR4 of the first through fourth optical lens assemblies OS1, OS2, OS3, and OS4 may bend optical paths in parallel in the same direction. In this case, the image sensors IMG of the first through fourth optical lens assemblies OS1, OS2, OS3, and OS4 may be provided on the same plane. Alternatively, the first and third bending units BR1 and BR3 of the first and third optical lens assemblies OS1 and OS3 may bend optical paths in opposite directions, and the second and fourth bending units BR2 and BR4 of the second and fourth optical lens assemblies OS2 and OS4 may bend optical paths in opposite direction. In FIG. 22, only cross-sectional shapes of lenses are shown for convenience.

Figure 23:
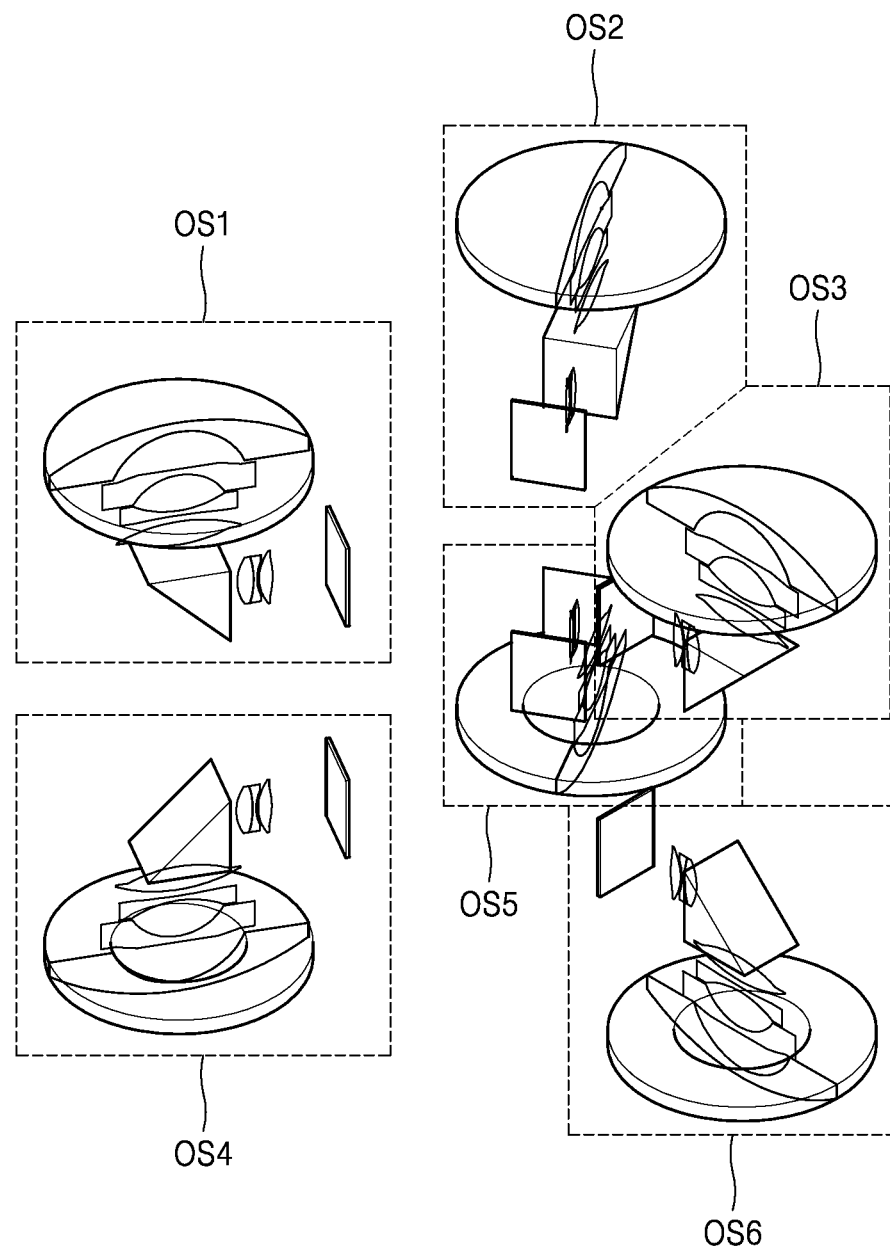
FIG. 23 illustrates an example where six optical lens assemblies are provided according to one embodiment.

FIG. 23 illustrates an example where first through sixth optical lens assemblies OS1, OS2, OS3, OS4, OS5, and OS6 are provided according to one embodiment. For example, the first through sixth optical lens assemblies OS1, OS2, OS3, OS4, OS5, and OS6 may be arranged at the vertices of a trigonal prism. The first and fourth optical lens assemblies OS1 and OS4 may bend optical path in parallel in a first direction, the second and fifth optical lens assemblies OS2 and OS5 may bend optical paths in parallel in a second direction, and the third and sixth optical lens assemblies OS3 and OS6 may bend optical paths in parallel in a third direction. The first through sixth optical lens assemblies OS1, OS2, OS3, OS4, OS5, and OS6 may be arranged in various other configurations. Also, the number of optical lens assemblies according to various embodiments may be any number, for example, 3, 5, 10, etc.

Figure 24:
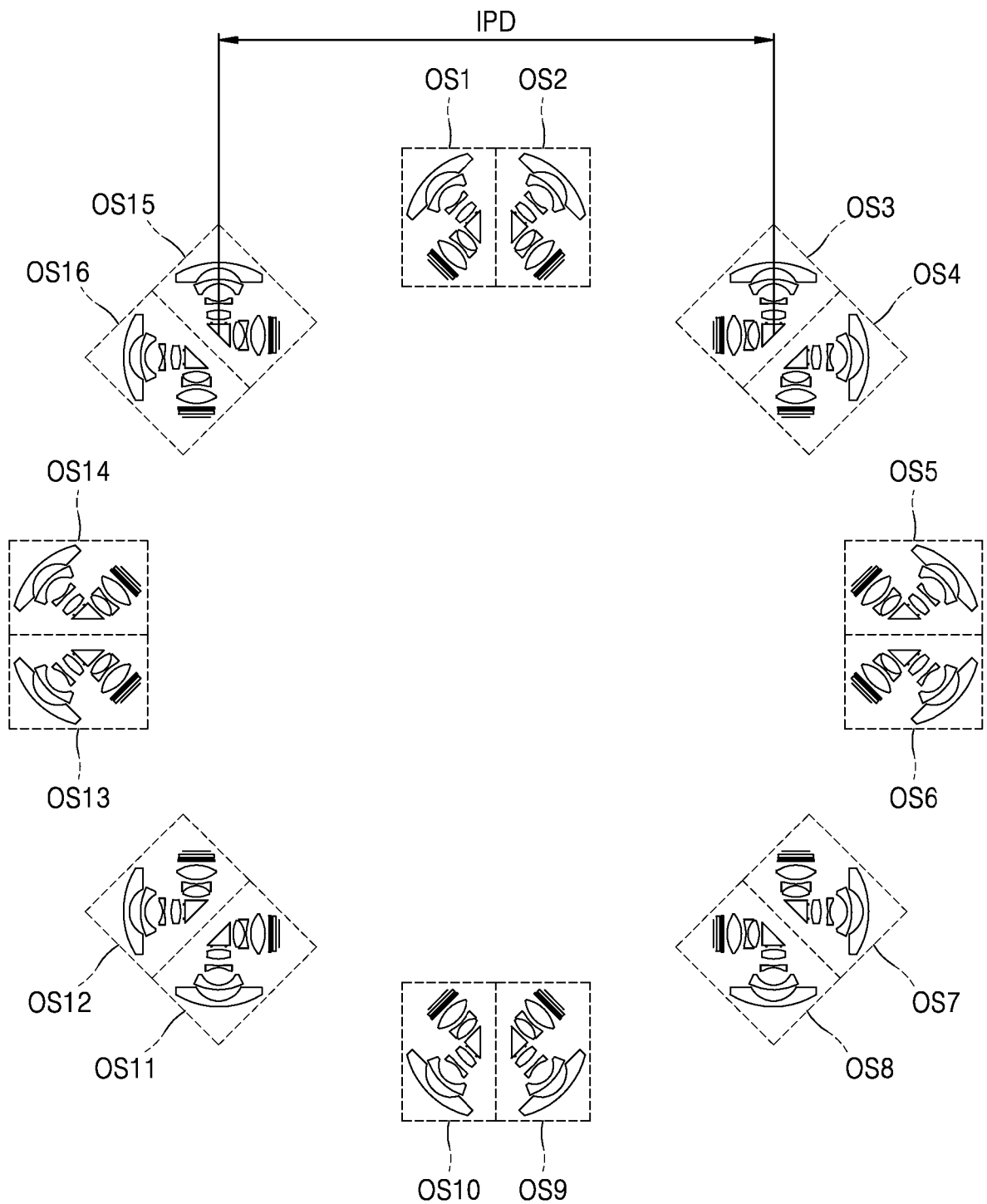
FIG. 24 illustrates an example where 16 optical lens assemblies are provided according to one embodiment.

FIG. 24 illustrates an example where 16 optical lens assemblies are provided according to one embodiment. FIG. 24 illustrates an example where first through sixteenth optical lens assemblies OS1, OS2, OS3, OS4, OS5, OS6, OS7, OS8, OS9, OS10, OS11, OS12, OS13, OS14, OS15, and OS16 are arranged two-dimensionally, i.e. on the same plane. Two adjacent optical lens assemblies form one set and eight sets are arranged at intervals of 45° on the plane. An optical path difference between adjacent optical lens assemblies may be adjusted by the bending units. Accordingly, the overall outer diameter of the corresponding imaging apparatus may be reduced, a sufficient IPD may be provided, the distance between image sensors may be constant, and heat generated by the imaging apparatus may be efficiently dissipated.

When an optical lens assembly does not include a bending unit, collisions occur due to the total length of the optical lens assembly. Since an image sensor is located at where the collisions occur, collisions of the circuit unit and heat generation tend to occur. However, since the optical lens assemblies according to various embodiments are arranged by using bending units as shown in FIG. 24, a relatively larger IPD may be obtained and various problems caused by interference of the image sensor may be avoided. Compared with optical lens assemblies without the bending unit but has the same IPD, the overall size of an imaging apparatus with bending units may be greatly reduced.

For example, when the radius of a circle that connects entrance pupils of the 16 optical lens assemblies without bending units is R and the total length of each optical lens assembly is OAL, the IPD satisfies IPD<$\sqrt{2}$*R−OAL. The reason why the IPD must be less than this quantity is that the space for dealing with heat and interference of a circuit unit has to be included. In contrast, the IPD of the optical lens assemblies of FIG. 24 according to various embodiments may satisfy IPD=$\sqrt{2}$*R−d1 (where d1 is the distance on the optical axis from an entrance pupil to a reflective surface of a bending unit), the IPD may be d2 (where d2 is the distance on the optical axis from the reflective surface of the bending unit to an image plane) or more by using the bending unit for bending an optical path, and thus 3D effects of the optical lens assemblies of FIG. 24 may be further increased.

Although there is an optical path of each optical lens assembly on a horizontal plane (ground surface) in FIG. 24, an optical path may be bent to a direction perpendicular to the horizontal plane. Also, when optical lens assemblies according to various embodiments are arranged on two horizontal planes, upper and lower images may be obtained by arranging the optical lens assemblies so that an optical lens assembly on one horizontal plane (e.g., an upper horizontal plane) is shifted by 10 to 20° from an optical lens assembly on the other horizontal plane (e.g., a lower horizontal plane).

Figure 25:
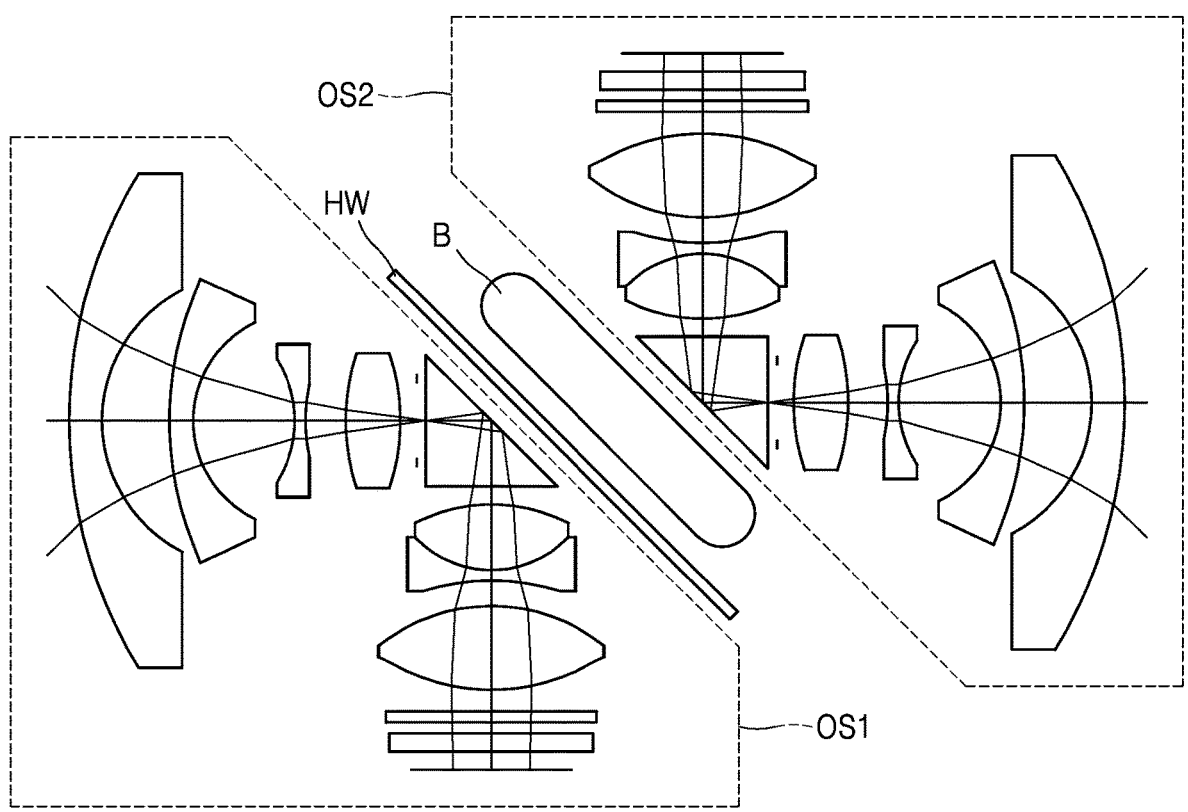
FIG. 25 illustrates an example where two optical lens assemblies are provided and a battery is located between the two optical lens assembly according to one embodiment.

Referring to FIG. 25, an electronic component may be provided between the first optical lens assembly OS1 and the second optical lens assembly OS2 according to various embodiments. The electronic component may be hardware HW such as a battery B or a printed circuit board (PCB). A reflective surface of the bending unit BR of the first optical lens assembly OS1 and a reflective surface of the bending unit BR of the second optical lens assembly OS2 may be parallel to each other and the electronic component may be located between the bending unit BR of the first optical lens assembly OS1 and the bending unit BR of the second optical lens assembly OS2. When the first and second optical lens assemblies OS1 and OS2 according to various embodiments are configured As shown in FIG. 25, parallax between two optical lens assemblies in opposite directions may be minimized, components that may generate heat may be distributed such that heat dissipation is optimized, and an overall size of an imaging apparatus may be reduced.

An aspherical surface used in any optical lens assembly according to various embodiments may be defined as follows.

When the optical axis direction is set to an x-axis and the direction perpendicular to the optical axis direction is set to a y-axis, the aspherical shape may be represented as the following formula when light rays travel in the positive-x direction. Herein, "x" denotes the distance in the optical axis direction from the vertex of a lens, "y" denotes the distance in the direction perpendicular to the optical axis, "K"

denotes a conic constant, "A, B, C, D, . . . " which are aspherical coefficients, and "c" denotes a reciprocal number (1/R) of a curvature radius at the vertex of the lens.

$$x = \frac{cy^2}{1 + \sqrt{1 - (K+1)c^2 y^2}} + Ay^4 + By^6 + Cy^8 + Dy^{10} + \ldots \quad (D)$$

According to the present disclosure, an optical lens assembly may be implemented in various embodiments according to various designs as follows.

In each embodiment, lens surface numbers S1, S2, S3, . . . , and Sn (where "n" is a natural number) are added sequentially from the object side O to the image side I. Also, "F" denotes the focal length of the optical lens assembly, "fno" denotes the F number, "2w" denotes the maximum viewing angle, "R" denotes the curvature radius, "Dn" denotes the thickness of the lens or the air gap between lenses, "Nd" denotes the refractive index, and "Vd" denotes the Abbe number. Also, "ST" denotes the iris diaphragm and "*" denotes that the corresponding surface is an aspherical surface.

First Embodiment

FIG. 1 illustrates an optical lens assembly according to a first embodiment. Table 1 shows, for example, design data of the first embodiment.

F:1.21, fno: 2.05, 2w: 195°

TABLE 1

| Lens surface | R (mm) | Dn (mm) | Nd | Vd | Effective diameter |
|---|---|---|---|---|---|
| 1 | 12.797 | 0.90 | 1.835 | 42.70 | 6.279 |
| 2 | 3.919 | 1.83 | | | 3.580 |
| 3* | 20.589 | 0.60 | 1.740 | 49.10 | 3.407 |
| 4* | 2.972 | 2.63 | | | 2.600 |
| 5 | −3.587 | 0.40 | 1.593 | 68.60 | 1.686 |
| 6 | 35.081 | 1.04 | | | 1.607 |
| 7* | 6.149 | 1.40 | 1.805 | 40.90 | 1.467 |
| 8* | −5.470 | 0.50 | | | 1.300 |
| ST | Infinity | 0.20 | | | 1.100 |
| 10 | Infinity | 1.75 | 1.834 | 37.30 | 1.138 |
| 11 | Infinity | 1.75 | 1.834 | 37.30 | 1.315 |
| 12 | Infinity | 0.50 | | | 1.492 |
| 13 | 4.415 | 1.74 | 1.722 | 54.80 | 1.650 |
| 14 | −3.000 | 0.30 | 1.881 | 22.30 | 1.694 |
| 15 | 5.362 | 0.67 | | | 1.811 |
| 16* | 3.686 | 2.20 | 1.621 | 58.00 | 2.655 |
| 17* | −3.550 | 0.61 | | | 2.696 |
| 18 | Infinity | 0.30 | 1.517 | 64.20 | 2.506 |
| 19 | Infinity | 0.3 | | | 2.478 |
| 20 | Infinity | 0.5 | 1.517 | 64.20 | 2.434 |
| 21 | Infinity | 0.53 | | | 2.387 |
| IMG | Infinity | | | | 2.312 |

Table 2 shows aspherical coefficients in the first embodiment.

Figure 2:
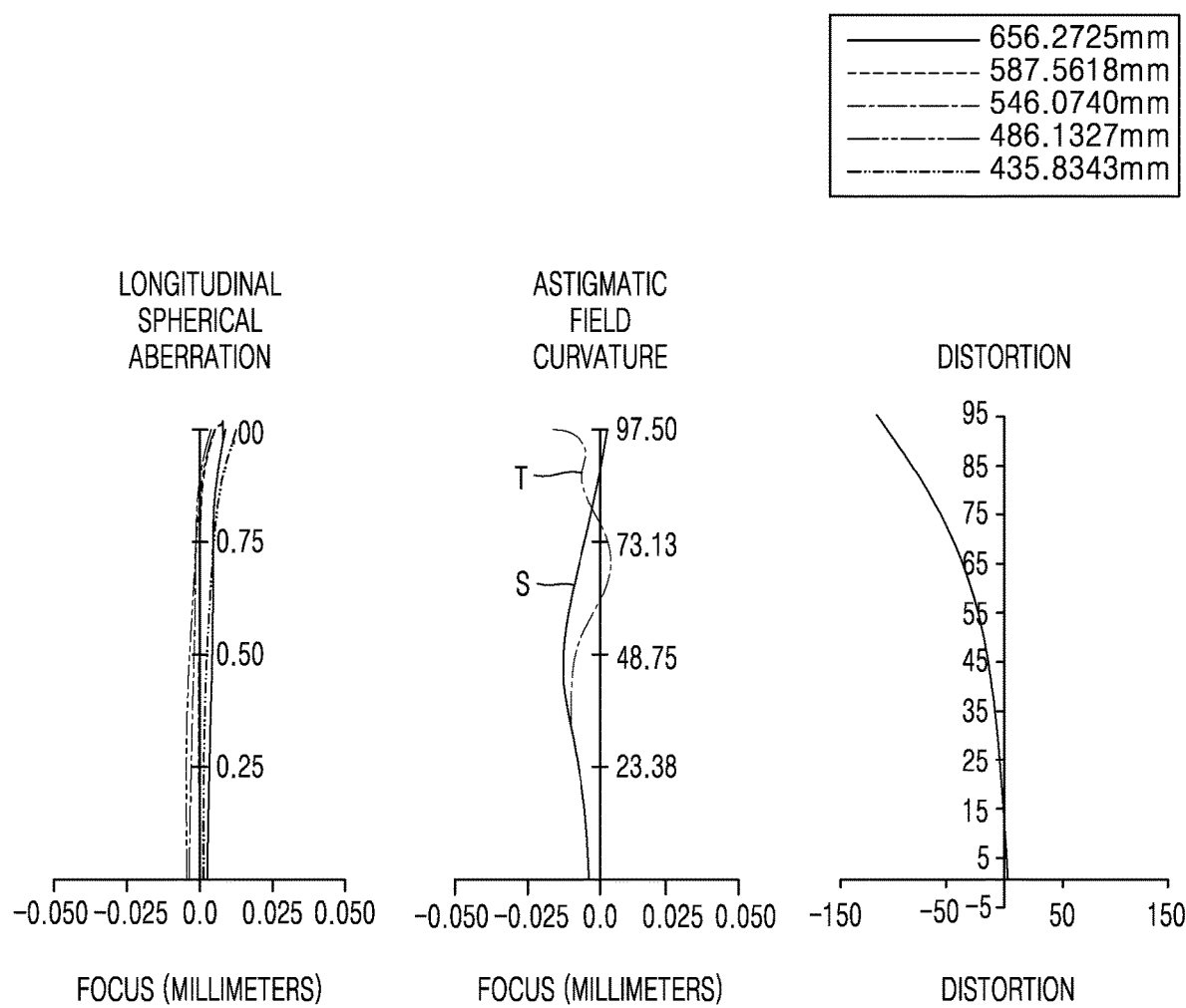
FIG. 2 is an aberration diagram of the optical lens assembly according to the first embodiment.

FIG. 2 illustrates the longitudinal spherical aberration, the astigmatic field curvature, and the distortion of the optical lens assembly according to the first embodiment. The longitudinal spherical aberration is shown with respect to light at the wavelengths of 656.2725 nanometers (nm), 587.5618 nm, 546.07400 nm, 486.1327 nm, and 435.8343 nm, respectively. The tangential field curvature T and the sagittal field curvature S are show in the astigmatic field curves. The astigmatic field curves are shown with respect to light at the wavelength of 587.5618 nm, and the distortion is shown with respect to light at the wavelength of 587.5618 nm.

Second Embodiment

FIG. 4 illustrates an optical lens assembly according to a second embodiment. Table 3 shows, for example, design data of the second embodiment.

F:0.72, fno: 2.06, 2w: 195°

TABLE 3

| Lens surface | R (mm) | Dn (mm) | Nd | Vd | Effective diameter |
|---|---|---|---|---|---|
| S1 | 6.770 | 0.37 | 1.835 | 42.70 | 3.521 |
| S2 | 2.148 | 1.27 | | | 2.029 |
| S3* | −14.453 | 0.24 | 1.740 | 49.10 | 1.977 |
| S4* | 1.904 | 1.25 | | | 1.379 |
| S5 | −2.613 | 0.18 | 1.593 | 68.60 | 1.370 |
| S6 | 21.686 | 0.16 | | | 1.426 |
| S7* | 3.047 | 0.84 | 1.805 | 40.90 | 1.508 |
| S8* | −3.469 | 0.42 | | | 1.488 |
| S9 | Infinity | 1.21 | 2.001 | 25.50 | 1.104 |
| S10 | Infinity | 1.21 | 2.001 | 25.50 | 0.897 |
| S11 | Infinity | 0.42 | | | 0.701 |
| ST | Infinity | 0.08 | | | 0.557 |
| S13 | 1.505 | 0.49 | 1.729 | 54.70 | 0.563 |
| S14 | −5.142 | 0.11 | 1.847 | 23.80 | 0.596 |
| S15 | 1.524 | 0.07 | | | 0.623 |
| S16* | 1.951 | 0.39 | 1.689 | 52.70 | 0.673 |
| S17* | −3.628 | 1.02 | | | 0.719 |
| S18 | Infinity | 0.16 | 1.517 | 64.20 | 1.038 |
| S19 | Infinity | 0.16 | | | 1.068 |
| S20 | Infinity | 0.26 | 1.517 | 64.20 | 1.114 |
| S21 | Infinity | 0.28 | | | 1.164 |
| IMG | Infinity | | | | 1.250 |

Table 4 shows aspherical coefficients in the second embodiment.

TABLE 2

| Lens surface | K | A | B | C | D | E |
|---|---|---|---|---|---|---|
| S3 | 0.000000 | 5.945770E−03 | −7.019339E−04 | 5.341085E−05 | −1.960371E−06 | 3.028031E−08 |
| S4 | −1.000000 | 7.913306E−03 | −4.419331E−04 | 1.000630E−04 | −2.060385E−05 | 3.270284E−06 |
| S7 | 0.000000 | −4.009920E−03 | 1.848761E−04 | −4.211000E−05 | | |
| S16 | 0.000000 | −5.856829E−03 | 1.595434E−04 | −2.576744E−05 | 8.636259E−07 | |
| S17 | 0.000000 | 1.344493E−02 | −6.731368E−04 | 5.416242E−06 | 3.418867E−06 | |

TABLE 4

| Lens surface | K | A | B | C | D | E |
|---|---|---|---|---|---|---|
| S3 | 0.000000 | 5.230175E−02 | −1.290260E−02 | 2.718709E−03 | −4.867408E−04 | 3.612638E−05 |
| S4 | 0.018550 | 2.876307E−02 | 5.488615E−02 | −6.310769E−02 | 4.486594E−02 | −1.120746E−02 |
| S7 | 0.000000 | −2.900078E−02 | 7.151029E−03 | −5.049141E−04 | | |
| S8 | 0.000000 | 6.977398E−04 | 1.542743E−03 | 4.644980E−04 | | |
| S16 | 0.000000 | −3.531898E−02 | 1.572334E−02 | 2.221693E−02 | | |
| S17 | 0.000000 | 3.143398E−02 | −1.590325E−03 | 6.424623E−02 | | |

Figure 5:
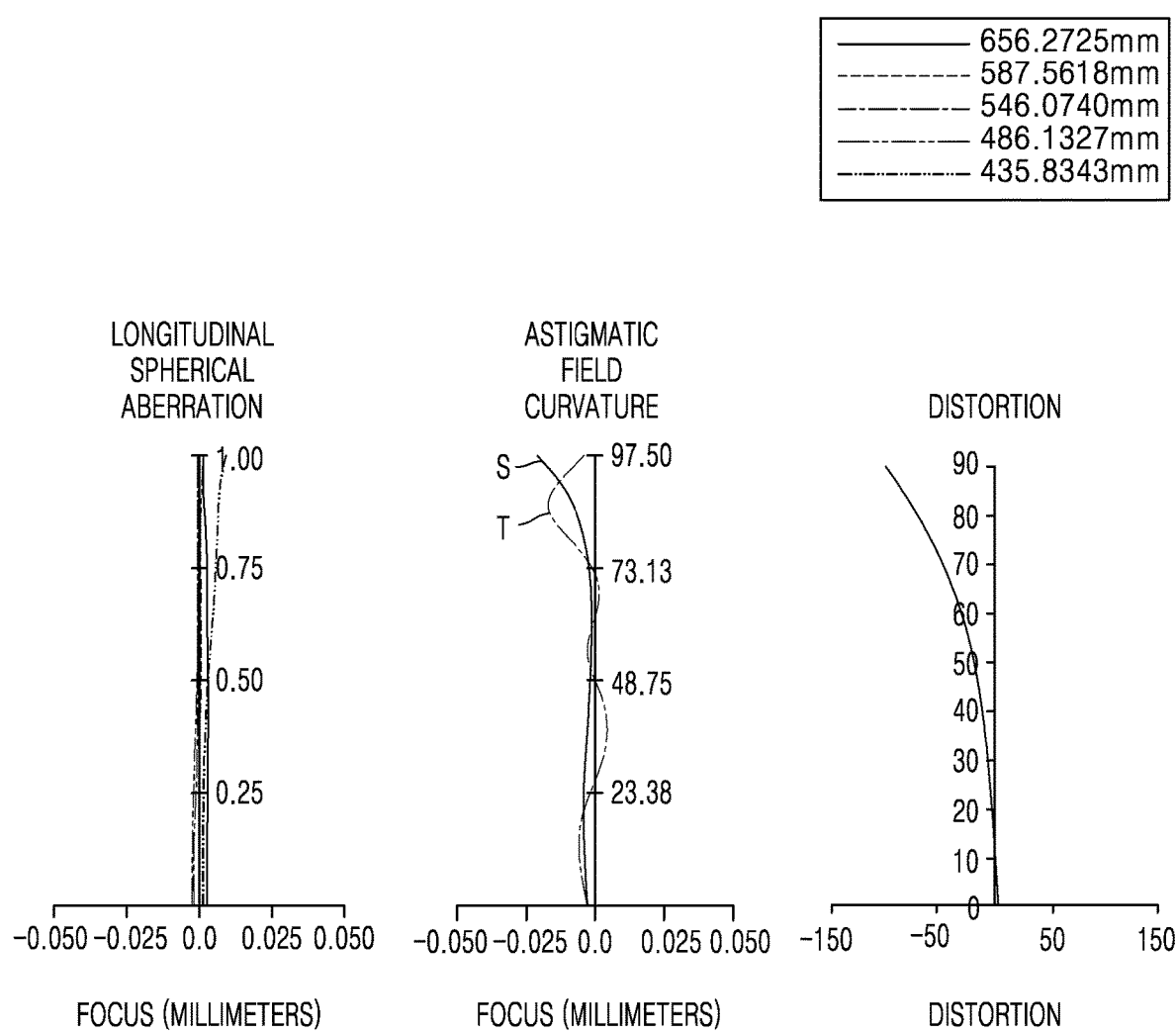
FIG. 5 illustrates an aberration diagram of the optical lens assembly according to the second embodiment.

FIG. 5 illustrates the longitudinal spherical aberration, the astigmatic field curvature, and the distortion of the optical lens assembly according to the second embodiment.

Third Embodiment

FIG. 6 illustrates an optical lens assembly according to a third embodiment. Table 5 shows, for example, design data of the third embodiment.

F:1.09, fno: 2.27, 2w: 200°

TABLE 5

| Lens surface | R (mm) | Dn (mm) | Nd | Vd | Effective diameter |
|---|---|---|---|---|---|
| S1 | 11.500 | 1.00 | 1.835 | 42.72 | 6.220 |
| S2 | 3.991 | 1.61 | | | 3.560 |
| S3* | 26.871 | 0.55 | 1.805 | 40.90 | 3.280 |
| S4* | 2.569 | 2.30 | | | 2.090 |
| S5 | −2.800 | 0.55 | 1.911 | 35.25 | 1.310 |
| S6 | infinity | 0.49 | | | 1.280 |
| S7* | 5.571 | 1.50 | 1.816 | 39.42 | 1.240 |
| S8* | −4.179 | 0.20 | | | 1.100 |
| ST | Infinity | 0.20 | | | 0.930 |
| S10 | Infinity | 1.60 | 2.001 | 29.13 | 0.970 |
| S11 | Infinity | 1.60 | 2.001 | 29.13 | 1.110 |
| S12 | Infinity | 1.00 | | | 1.260 |
| S13 | 4.800 | 1.40 | 1.497 | 81.61 | 1.880 |
| S14 | −11.999 | 0.10 | | | 1.980 |
| S15 | 5.270 | 2.00 | 1.697 | 56.64 | 2.030 |
| S16* | −2.800 | 0.01 | 1.514 | 42.83 | 1.930 |
| S17* | −2.800 | 0.40 | 1.908 | 21.51 | 1.930 |
| S18 | 4.718 | 0.15 | | | 1.940 |
| S19 | 3.391 | 2.2 | 1.587 | 61.30 | 2.080 |
| S20 | −3.574 | 0.396 | | | 2.200 |
| S21 | Infinity | 0.11 | 1.517 | 64.20 | 2.150 |
| S22 | Infinity | | | | 2.140 |
| IMG | Infinity | | | | 2.108 |

Table 6 shows aspherical coefficients in the third embodiment.

TABLE 6

| Lens surface | K | A | B | C | D | E |
|---|---|---|---|---|---|---|
| S3 | 0.000000 | 1.142927E−02 | −2.351101E−03 | 3.255237E−04 | −2.185343E−05 | 5.864670E−07 |
| S4 | −1.000000 | 9.164343E−03 | 4.565874E−03 | −3.133200E−03 | 8.462104E−04 | −6.586592E−05 |
| S7 | 0.000000 | −7.971247E−03 | 9.718798E−04 | −1.340611E−04 | 0.000000E+00 | |
| S8 | −1.000000 | −5.965819E−04 | 5.895404E−05 | 0.000000E+00 | 0.000000E+00 | |
| S19 | 0.000000 | −1.015751E−02 | 6.893529E−04 | −3.631576E−04 | 5.134137E−05 | |
| S20 | 0.000000 | 3.394659E−02 | −6.665382E−03 | 4.705983E−04 | 6.087475E−06 | |

Figure 7:
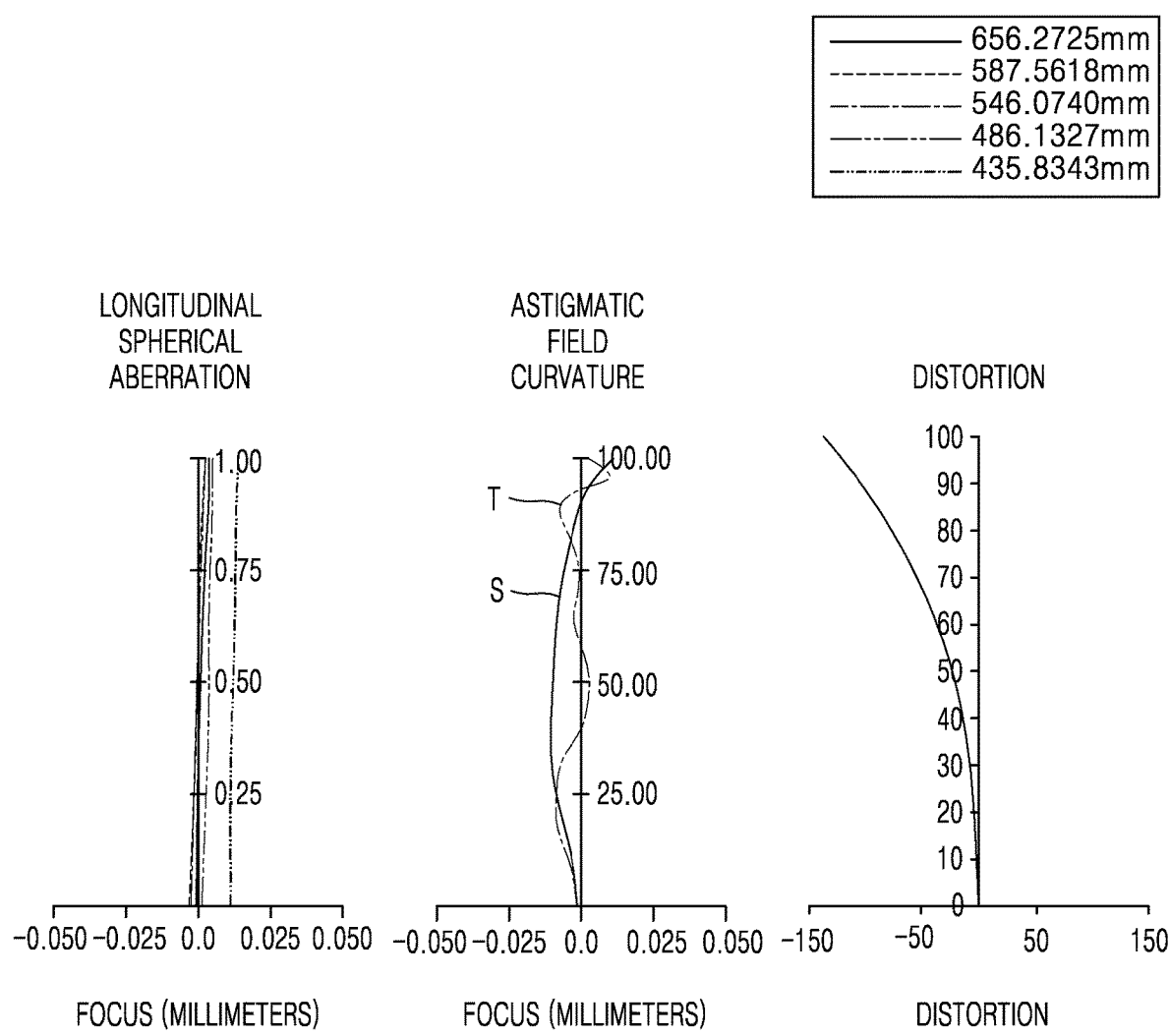
FIG. 7 illustrates an aberration diagram of the optical lens assembly according to the third embodiment.

FIG. 7 illustrates the longitudinal spherical aberration, the astigmatic field curvature, and the distortion of the optical lens assembly according to the third embodiment.

Fourth Embodiment

FIG. 8 illustrates an optical lens assembly according to a fourth embodiment. Table 7 shows, for example, design data of the fourth embodiment.

F:1.07, fno: 2.27, 2w: 200°

TABLE 7

| Lens surface | R (mm) | Dn (mm) | Nd | Vd | Effective diameter |
|---|---|---|---|---|---|
| S1 | 11.500 | 1.00 | 1.835 | 42.70 | 5.895 |
| S2 | 3.654 | 1.47 | | | 3.284 |
| S3* | 28.290 | 0.55 | 1.805 | 40.90 | 3.049 |
| S4* | 2.568 | 2.13 | | | 1.988 |
| S5 | −2.800 | 0.55 | 1.835 | 42.72 | 1.387 |
| S6 | −30.374 | 0.79 | | | 1.367 |
| S7* | 4.959 | 1.50 | 1.807 | 40.41 | 1.287 |
| S8* | −4.747 | 0.20 | | | 1.116 |
| ST | Infinity | 0.20 | | | 0.940 |
| S10 | Infinity | 1.60 | 2.001 | 29.13 | 0.969 |
| S11 | Infinity | 1.60 | 2.001 | 29.13 | 1.086 |
| S12 | Infinity | 0.90 | | | 1.240 |
| S13 | 3.604 | 2.10 | 1.663 | 58.36 | 1.811 |
| S14 | −2.950 | 0.40 | 1.923 | 20.88 | 1.780 |
| S15 | 5.230 | 0.10 | | | 1.884 |
| S16* | 3.103 | 2.30 | 1.611 | 58.94 | 2.168 |
| S17* | −2.903 | 1.06 | | | 2.258 |
| S18 | Infinity | 0.11 | 1.517 | 64.20 | 2.120 |
| S19 | Infinity | 0.50 | | | 2.114 |
| IMG | Infinity | | | | 2.074 |

Table 8 shows aspherical coefficients in the fourth embodiment.

TABLE 8

| Lens surface | K | A | B | C | D | E |
|---|---|---|---|---|---|---|
| S3 | 0.000000 | 2.290255E−02 | −6.077988E−03 | 9.379111E−04 | −7.083168E−05 | 2.125564E−06 |
| S4 | −1.000000 | 2.453983E−02 | 3.731752E−03 | −6.225077E−03 | 2.083246E−03 | −2.026211E−04 |
| S7 | 0.000000 | −6.598078E−03 | 6.245072E−04 | −2.142605E−04 | 0.000000E+00 | |
| S8 | −1.000000 | −1.036025E−05 | −1.867325E−04 | 0.000000E+00 | 0.000000E+00 | |
| S17 | 0.000000 | −1.192128E−02 | 5.283736E−04 | −4.801468E−05 | 1.293214E−07 | |
| S18 | 0.000000 | 2.442287E−02 | −2.141197E−03 | 2.094993E−04 | 2.893017E−07 | |

Figure 9:
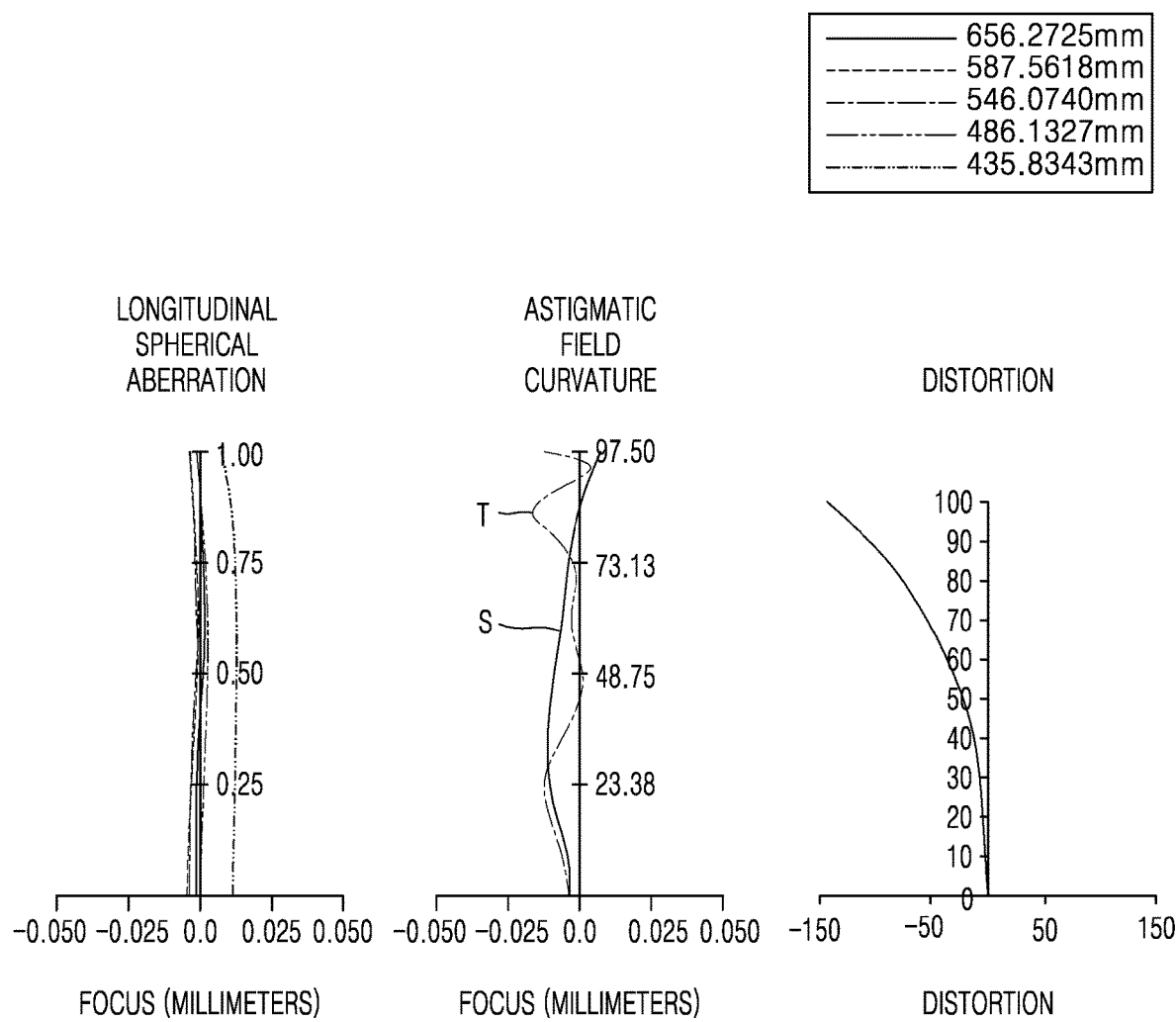
FIG. 9 illustrates an aberration diagram of the optical lens assembly according to the fourth embodiment.

FIG. 9 illustrates the longitudinal spherical aberration, the astigmatic field curvature, and the distortion of the optical lens assembly according to the fourth embodiment.

Fifth Embodiment

FIG. 10 illustrates an optical lens assembly according to a fifth embodiment. Table 9 shows, for example, design data of the fifth embodiment.

F:0.85, fno: 1.95, 2w: 180°

TABLE 9

| Lens surface | R (mm) | Dn (mm) | Nd | Vd | Effective diameter |
|---|---|---|---|---|---|
| S1 | 11.685 | 1.00 | 1.804 | 46.50 | 4.482 |
| S2 | 3.000 | 1.19 | | | 2.514 |
| S3* | 30.000 | 0.55 | 1.740 | 49.10 | 2.415 |
| S4* | 2.500 | 2.33 | | | 1.800 |
| S5 | −2.800 | 0.65 | 1.881 | 37.74 | 1.185 |
| S6 | −93.579 | 0.81 | | | 1.219 |
| S7* | 4.964 | 1.84 | 1.805 | 40.90 | 1.276 |
| S8* | −4.815 | 0.34 | | | 1.188 |
| ST | Infinity | 0.20 | | | 1.020 |
| S10 | Infinity | 1.60 | 2.001 | 29.13 | 1.037 |
| S11 | Infinity | 1.60 | 2.001 | 29.13 | 1.129 |
| S12 | Infinity | 0.80 | | | 1.240 |
| S13 | 3.354 | 2.10 | 1.657 | 59.01 | 1.570 |
| S14 | −2.736 | 0.03 | | | 1.493 |
| S15 | −2.628 | 0.40 | 1.915 | 21.12 | 1.477 |
| S16 | 5.419 | 0.16 | | | 1.539 |
| S17* | 2.623 | 2.30 | 1.687 | 52.80 | 1.763 |
| S18* | −3.947 | 0.76 | | | 1.683 |
| S19 | Infinity | 0.11 | 1.517 | 64.20 | 1.365 |
| S20 | Infinity | 0.50 | | | 1.343 |
| IMG | Infinity | | | | 1.200 |

Table 10 shows aspherical coefficients in the fifth embodiment.

TABLE 10

| Lens surface | K | A | B | C | D | E |
|---|---|---|---|---|---|---|
| S3 | 0.000000 | 1.693505E−02 | −5.618770E−03 | 1.102048E−03 | −1.097124E−04 | 4.200695E−06 |
| S4 | 1.000000 | 1.883581E−02 | 1.241509E−03 | −3.958115E−03 | 1.820494E−03 | −2.225921E−04 |
| S7 | 0.000000 | −7.627915E−03 | 5.479538E−04 | −2.609108E−04 | 0.000000E+00 | |
| S8 | −1.000000 | −1.037569E−03 | −3.243341E−04 | 0.000000E+00 | 0.000000E+00 | |
| S17 | 0.000000 | −1.164093E−02 | 1.534594E−04 | −6.081609E−05 | 2.241342E−06 | |
| S18 | 0.000000 | 2.066767E−02 | −5.400408E−03 | 1.003558E−03 | −6.124753E−05 | |

Figure 11:
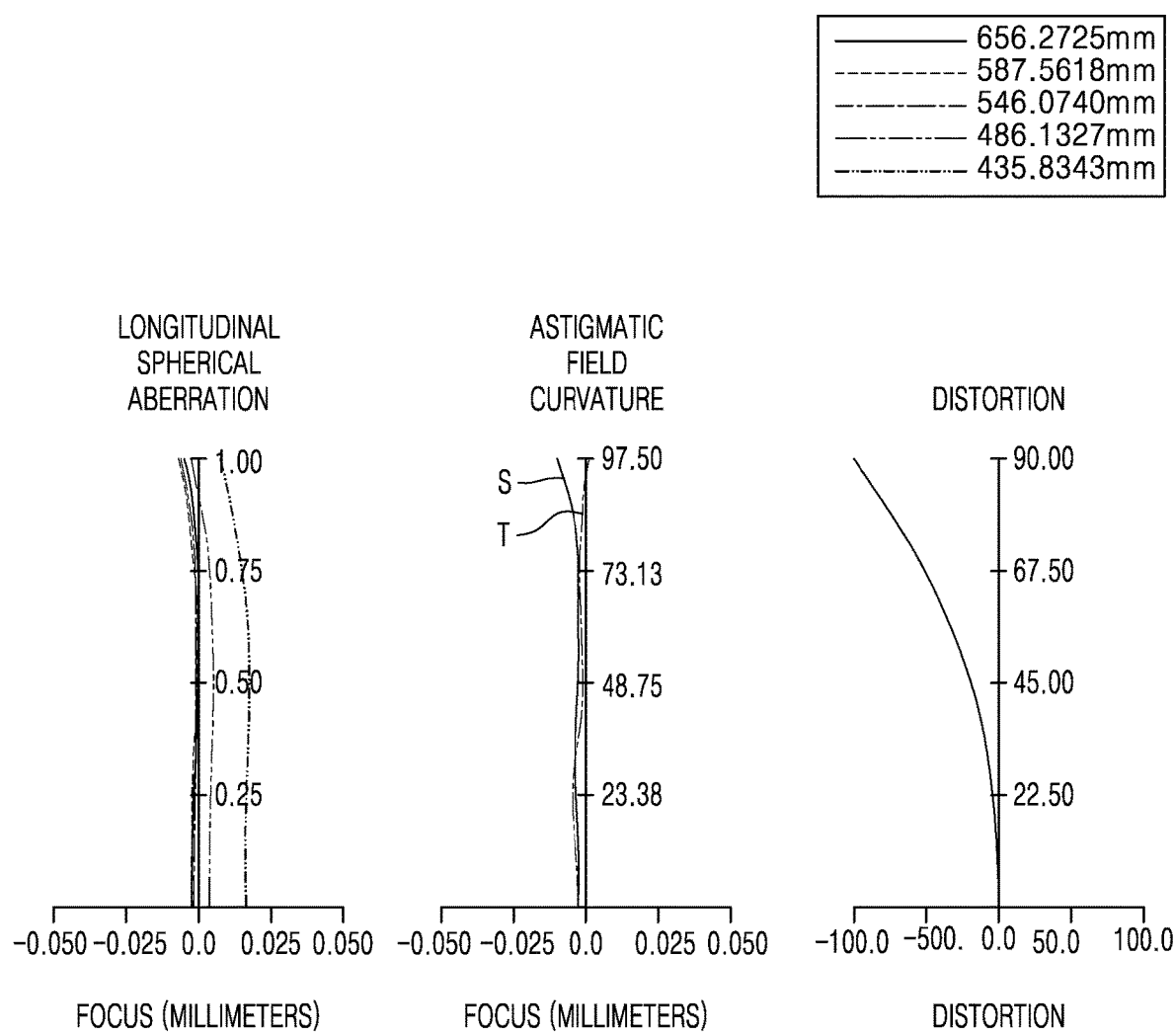
FIG. 11 illustrates an aberration diagram of the optical lens assembly according to the fifth embodiment.

FIG. 11 illustrates the longitudinal spherical aberration, the astigmatic field curvature, and the distortion of the optical lens assembly according to the fifth embodiment.

Sixth Embodiment

FIG. 12 illustrates an optical lens assembly according to a sixth embodiment. Table 11 shows, for example, design data of the sixth embodiment.

F:1.05, fno: 1.95, 2w: 200°

TABLE 11

| Lens surface | R (mm) | Dn (mm) | Nd | Vd | Effective diameter |
|---|---|---|---|---|---|
| S1 | 12.423 | 1.00 | 1.835 | 42.72 | 6.029 |
| S2 | 3.740 | 1.44 | | | 3.362 |
| S3* | 47.309 | 0.55 | 1.742 | 48.76 | 3.179 |
| S4* | 2.408 | 2.30 | | | 2.050 |
| S5 | −2.529 | 0.56 | 1.911 | 35.25 | 1.386 |
| S6 | −13.065 | 0.53 | | | 1.428 |
| S7* | 4.979 | 1.61 | 1.811 | 40.84 | 1.421 |
| S8* | −3.726 | 0.20 | | | 1.343 |
| ST | Infinity | 0.20 | | | 1.090 |
| S10 | Infinity | 1.60 | 2.001 | 29.13 | 1.111 |
| S11 | Infinity | 1.60 | 2.001 | 29.13 | 1.195 |
| S12 | Infinity | 0.80 | | | 1.320 |
| S13 | 3.567 | 2.10 | 1.688 | 56.19 | 1.816 |
| S14 | −2.500 | 0.40 | 1.923 | 20.88 | 1.769 |
| S15 | 4.517 | 0.10 | | | 1.890 |
| S16* | 3.314 | 2.21 | 1.689 | 52.68 | 2.084 |
| S17* | −2.875 | 0.62 | | | 2.335 |
| S18 | Infinity | 0.11 | 1.517 | 64.20 | 2.138 |
| S19 | Infinity | 0.50 | | | 2.128 |
| IMG | Infinity | | | | 2.057 |

Table 12 shows aspherical coefficients in the sixth embodiment.

TABLE 12

| Lens surface | K | A | B | C | D | E |
|---|---|---|---|---|---|---|
| S3 | 0.000000 | 2.820548E−02 | −7.670814E−03 | 1.123570E−03 | −7.984864E−05 | 2.263402E−06 |
| S4 | −1.000000 | 2.445374E−02 | 5.285422E−03 | −8.011873E−03 | 2.461205E−03 | −2.242118E−04 |
| S7 | 0.000000 | −1.197596E−02 | 2.653118E−04 | −4.126164E−04 | 0.000000E+00 | |
| S8 | −1.000000 | −2.150026E−03 | −6.848216E−04 | −7.530833E−05 | 0.000000E+00 | |
| S16 | 0.000000 | −1.173651E−02 | 5.364085E−04 | −1.922093E−04 | 7.836257E−06 | |
| S17 | 0.000000 | 3.623232E−02 | −6.876953E−03 | 7.066320E−04 | −2.960691E−05 | |

Figure 13:
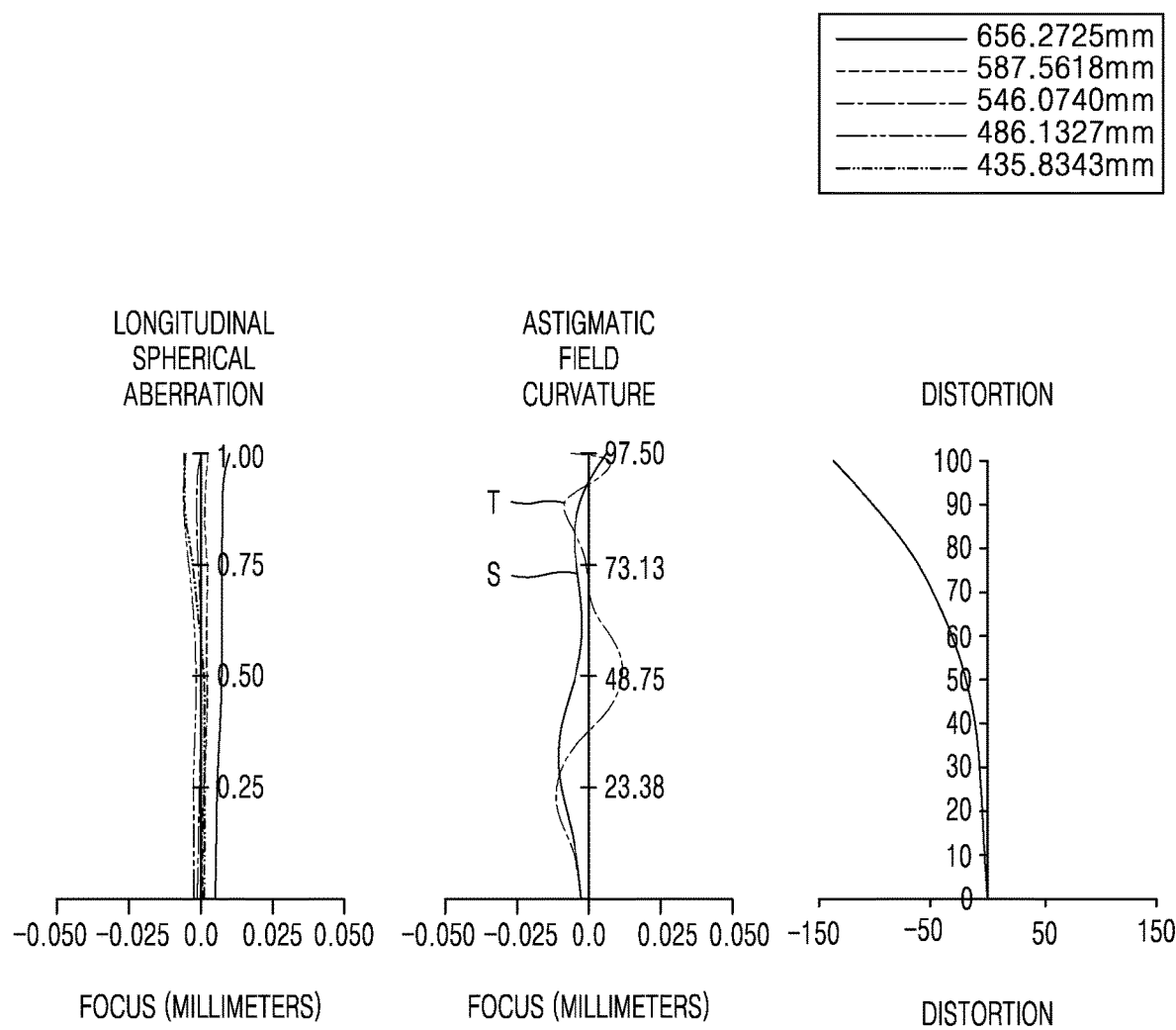
FIG. 13 illustrates an aberration diagram of the optical lens assembly according to the sixth embodiment.

FIG. 13 illustrates the longitudinal spherical aberration, the astigmatic field curvature, and the distortion of the optical lens assembly according to the sixth embodiment.

Seventh Embodiment

FIG. 14 illustrates an optical lens assembly according to a seventh embodiment. Table 13 shows, for example, design data of the seventh embodiment.

F:1.48, fno: 2.27, 2w: 195°

TABLE 13

| Lens surface | R (mm) | Dn (mm) | Nd | Vd | Effective diameter |
|---|---|---|---|---|---|
| S1 | 15.153 | 1.10 | 1.835 | 42.72 | 7.639 |
| S2 | 4.940 | 2.05 | | | 4.445 |
| S3* | 65.000 | 0.70 | 1.805 | 40.89 | 4.259 |
| S4* | 3.408 | 3.49 | | | 2.856 |
| S5 | −3.800 | 0.78 | 1.911 | 35.25 | 1.769 |
| S6 | −150.000 | 0.77 | | | 1.766 |
| S7* | 5.034 | 2.00 | 1.829 | 37.00 | 1.750 |
| S8* | −6.802 | 0.50 | | | 1.617 |
| S9 (ST) | Infinity | 0.00 | | | 1.365 |
| S10 | Infinity | 2.20 | 2.001 | 29.13 | 1.365 |
| S11 | Infinity | 2.20 | 2.001 | 29.13 | 1.412 |
| S12 | Infinity | 1.02 | | | 1.550 |
| S13 | 4.396 | 2.60 | 1.593 | 68.62 | 2.100 |
| S14 | −3.355 | 0.40 | 1.923 | 20.88 | 2.120 |
| S15 | 10.439 | 0.47 | | | 2.330 |
| S16* | 4.079 | 3.50 | 1.589 | 60.50 | 3.084 |
| S17* | −4.568 | 1.43 | | | 3.149 |
| S18 | Infinity | 0.11 | 1.517 | 64.20 | 2.843 |
| S19 | Infinity | 0.50 | | | 2.832 |
| IMG | Infinity | | | | 2.761 |

Table 14 shows aspherical coefficients in the seventh embodiment.

TABLE 14

| Lens surface | K | A | B | C | D | E | F |
|---|---|---|---|---|---|---|---|
| S3 | 0.0 | 7.963396E−03 | −1.168235E−03 | 1.085995E−04 | −5.621318E−06 | 1.529595E−07 | −1.709002E−09 |
| S4 | −1.0 | 5.317397E−03 | 6.788825E−04 | 4.540966E−04 | 8.457521E−05 | −5.702751E−06 | 1.147745E−07 |
| S7 | 0.0 | 3.713816E−03 | 2.643098E−04 | 2.274994E−05 | 6.084193E−07 | 0.000000E+00 | 0.000000E+00 |
| S8 | −1.0 | 7.845092E−04 | −4.693627E−05 | 2.942872E−05 | −3.069743E−06 | 0.000000E+00 | 0.000000E+00 |
| S16 | 0.0 | 3.668599E−03 | −3.763073E−04 | 1.060078E−04 | −1.594245E−05 | 1.142967E−06 | −3.067479E−08 |
| S17 | 0.0 | 1.387334E−02 | −1.991888E−03 | 2.061813E−04 | −1.188503E−05 | 1.605167E−07 | 1.330521E−08 |

Figure 15:
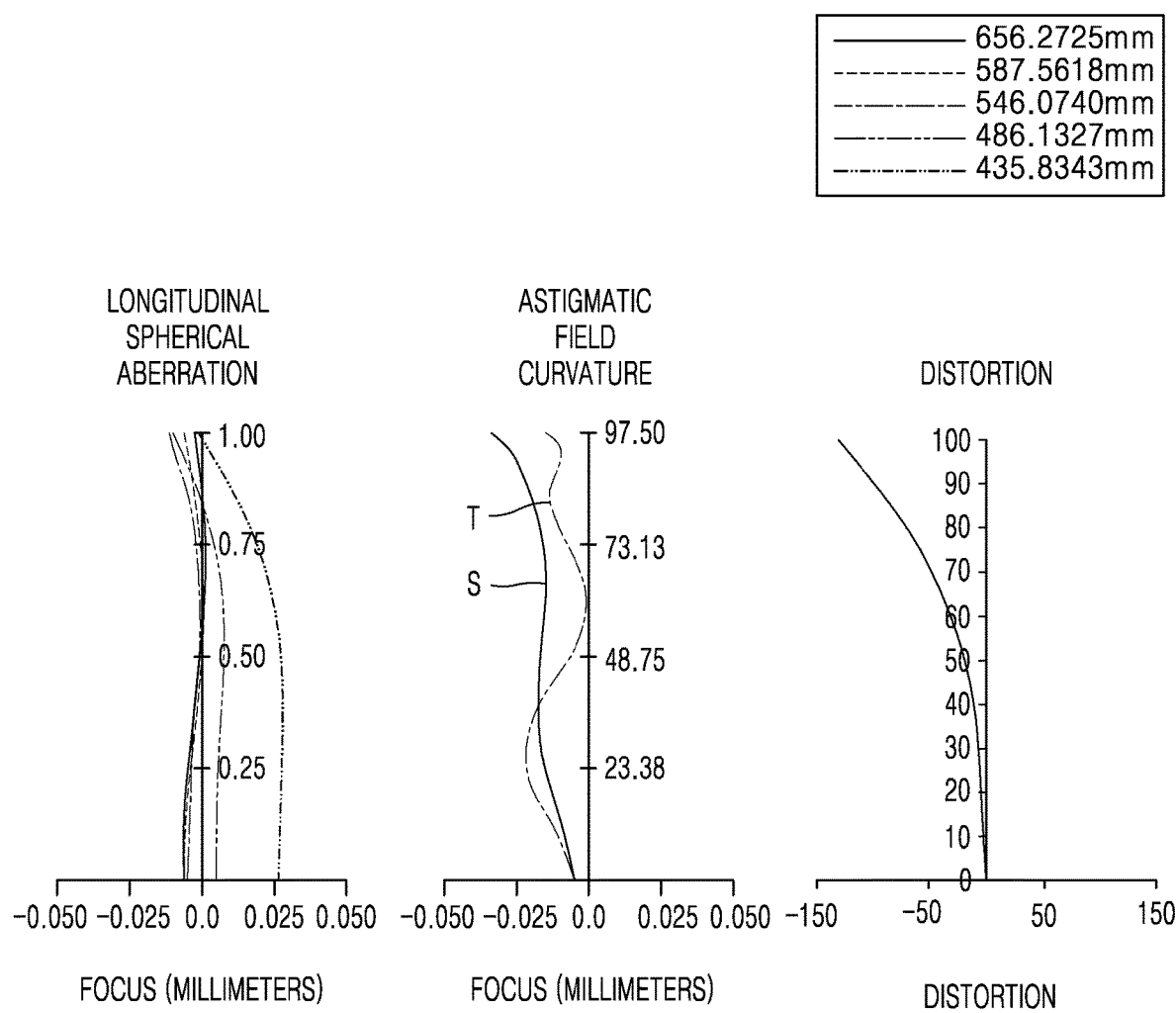
FIG. 15 illustrates an aberration diagram of the optical lens assembly according to the seventh embodiment.

FIG. 15 illustrates the longitudinal spherical aberration, the astigmatic field curvature, and the distortion of the optical lens assembly according to the seventh embodiment.

Eighth Embodiment

FIG. 16 illustrates an optical lens assembly according to an eighth embodiment. Table 15 shows design data of the eighth embodiment.

F: 1.00 mm, fno: 2.09, 2w: 195.00

TABLE 15

| Lens surface | R (mm) | Dn (mm) | Nd | Vd |
|---|---|---|---|---|
| S1 | 10.251 | 0.63 | 1.83945 | 42.7 |
| S2 | 3.110 | 1.41 | | |
| S3* | −14.889 | 0.56 | 1.74264 | 49.0 |
| S4* | 2.786 | 1.51 | | |
| S5 | −3.450 | 0.56 | 1.59489 | 68.6 |
| S6 | 3.804 | 0.14 | | |
| S7* | 2.870 | 1.48 | 1.80938 | 40.9 |
| S8* | −4.360 | 0.31 | | |
| S9 | Infinity | 3.06 | 2.00996 | 25.5 |
| ST | Infinity | 0.47 | | |
| S11 | 2.892 | 1.30 | 1.73234 | 54.7 |
| S12 | −2.077 | 0.32 | 1.85505 | 23.8 |
| S13 | 3.832 | 0.39 | | |
| S14* | 2.840 | 1.11 | 1.69258 | 52.7 |
| S15* | −4.590 | 0.66 | | |
| S16 | Infinity | 0.30 | 1.51872 | 64.2 |
| S17 | Infinity | 0.30 | | |
| S18 | Infinity | 0.50 | 1.51872 | 64.2 |
| S19 | Infinity | 0.50 | | |
| IMG | | | | |

Table 16 shows aspherical coefficients in the eighth embodiment.

TABLE 16

| Lens surface | K | A | B | C | D | E | F |
|---|---|---|---|---|---|---|---|
| S3 | 0.000000 | 3.311643e−002 | −4.404617e−003 | 2.743861e−004 | 1.087418e−005 | 6.709769e−007 | |
| S4 | 1.412822 | 2.016076e−002 | 8.959563e−003 | −3.382300e−003 | 1.086010e−004 | 7.209822e−005 | |
| S7 | 0.000000 | −1.500718e−002 | 1.272802e−003 | −6.101676e−004 | 0.000000e+000 | 0.000000e+000 | |
| S8 | 0.000000 | −1.500718e−002 | 2.620104e−004 | −3.374168e−004 | 0.000000e+000 | 0.000000e+000 | |
| S14 | 0.000000 | −1.459076e−002 | 1.810874e−003 | −5.876437e−004 | 0.000000e+000 | 0.000000e+000 | |
| S15 | 0.000000 | 1.018217e−002 | 7.496889e−004 | −5.196903e−004 | 0.000000e+000 | 0.000000e+000 | |

Figure 17:
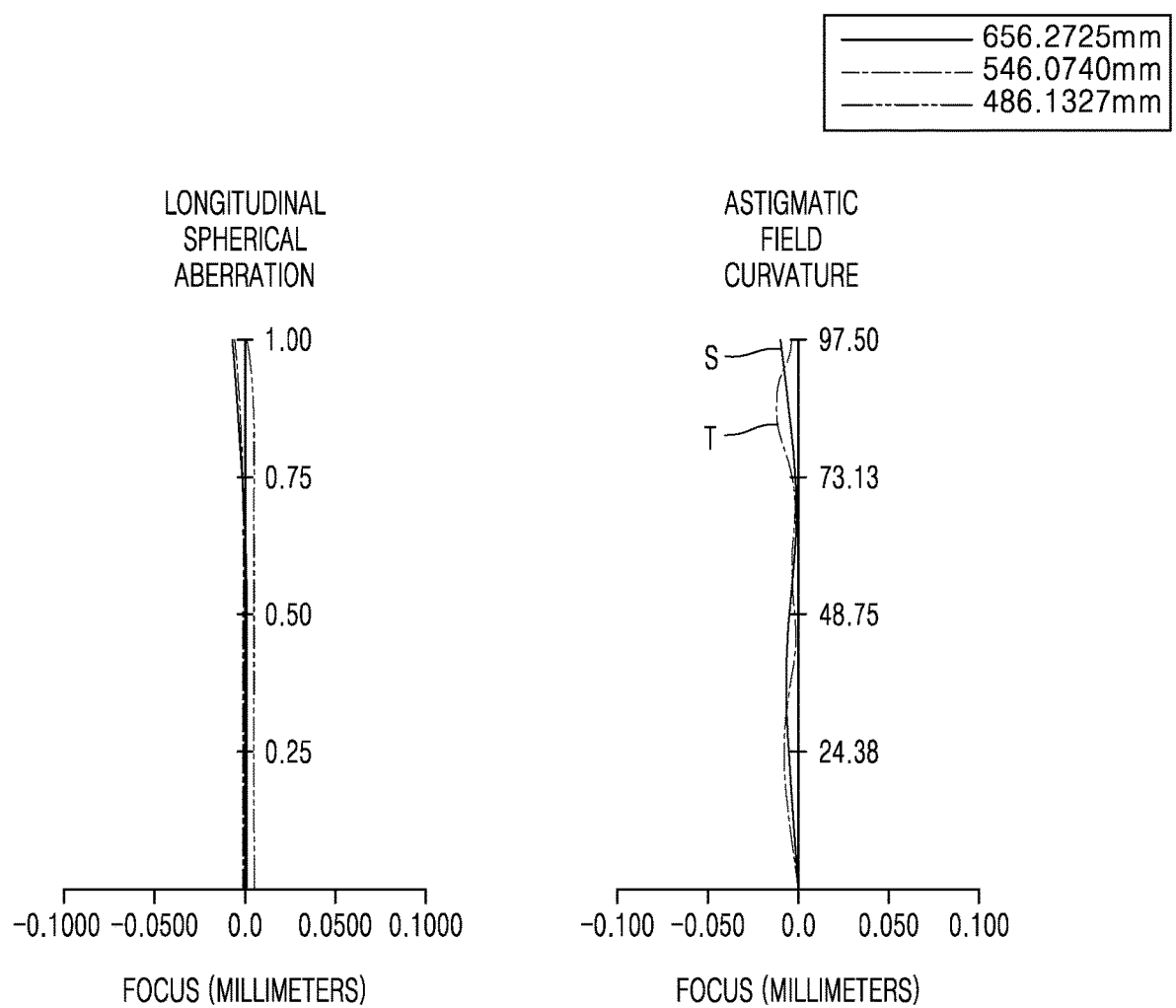
FIG. 17 illustrates an aberration diagram of the optical lens assembly according to the eighth embodiment.

FIG. 17 illustrates the longitudinal spherical aberration, the astigmatic field curvature, and the distortion of the optical lens assembly according to the eighth embodiment.

Ninth Embodiment

FIG. 18 illustrates an optical lens assembly according to a ninth embodiment. Table 17 shows design data of the ninth embodiment.

F: 1.00 mm, fno: 2.17, 2w: 195.00

TABLE 17

| Lens surface | R (mm) | Dn (mm) | Nd | Vd |
|---|---|---|---|---|
| S1 | 15.172 | 1.66 | 1.51680 | 64.2 |
| S2 | 11.448 | 1.38 | | |
| S3 | 13.525 | 1.46 | 1.83481 | 42.7 |
| S4 | 3.780 | 2.37 | | |
| S5* | −10.864 | 0.59 | 1.73905 | 49.0 |
| S6* | 3.060 | 1.72 | | |
| S7 | −3.724 | 0.55 | 1.49700 | 81.6 |
| S8 | 7.557 | 0.32 | | |
| S9* | 3.807 | 1.93 | 1.80470 | 40.9 |
| S10* | −6.872 | 0.28 | | |
| S11 | Infinity | 5.52 | 2.00069 | 25.5 |
| ST | Infinity | 0.76 | | |
| S13 | 4.840 | 1.82 | 1.72916 | 54.7 |
| S14 | −2.759 | 0.48 | 1.84666 | 23.8 |
| S15 | 6.591 | 0.19 | | |
| S16* | 3.668 | 2.23 | 1.68946 | 52.7 |
| S17* | −3.480 | 0.85 | | |
| S18 | Infinity | 0.30 | 1.51680 | 64.2 |
| S19 | Infinity | 0.30 | | |
| S20 | Infinity | 0.50 | 1.51680 | 64.2 |
| S21 | Infinity | 0.50 | | |
| IMG | | | | |

Table 18 shows aspherical coefficients in the ninth embodiment.

TABLE 18

| surface | K | A | B | C | D | E |
|---|---|---|---|---|---|---|
| S5 | 0.000000 | 1.267530e−002 | −2.694042e−003 | 3.435277e−004 | −2.269133e−005 | 6.097231e−007 |
| S6 | 0.508013 | −2.116811e−004 | 4.683411e−004 | −1.620635e−003 | 3.962316e−004 | −3.572389e−005 |
| S9 | 0.000000 | −5.921841e−003 | 3.272198e−004 | −9.159826e−005 | 8.775424e−006 | −4.019000e−007 |
| S10 | 0.000000 | 1.583485e−003 | 2.695170e−004 | −1.174697e−003 | 1.640111e−005 | −8.833155e−007 |
| S16 | 0.000000 | −1.087532e−002 | 2.683186e−003 | −6.346689e−004 | 7.804992e−005 | −5.080364e−006 |
| S17 | 0.000000 | 7.621780e−003 | 2.248384e−004 | 1.835027e−004 | −5.431645e−006 | −6.679681e−006 |

Figure 19:
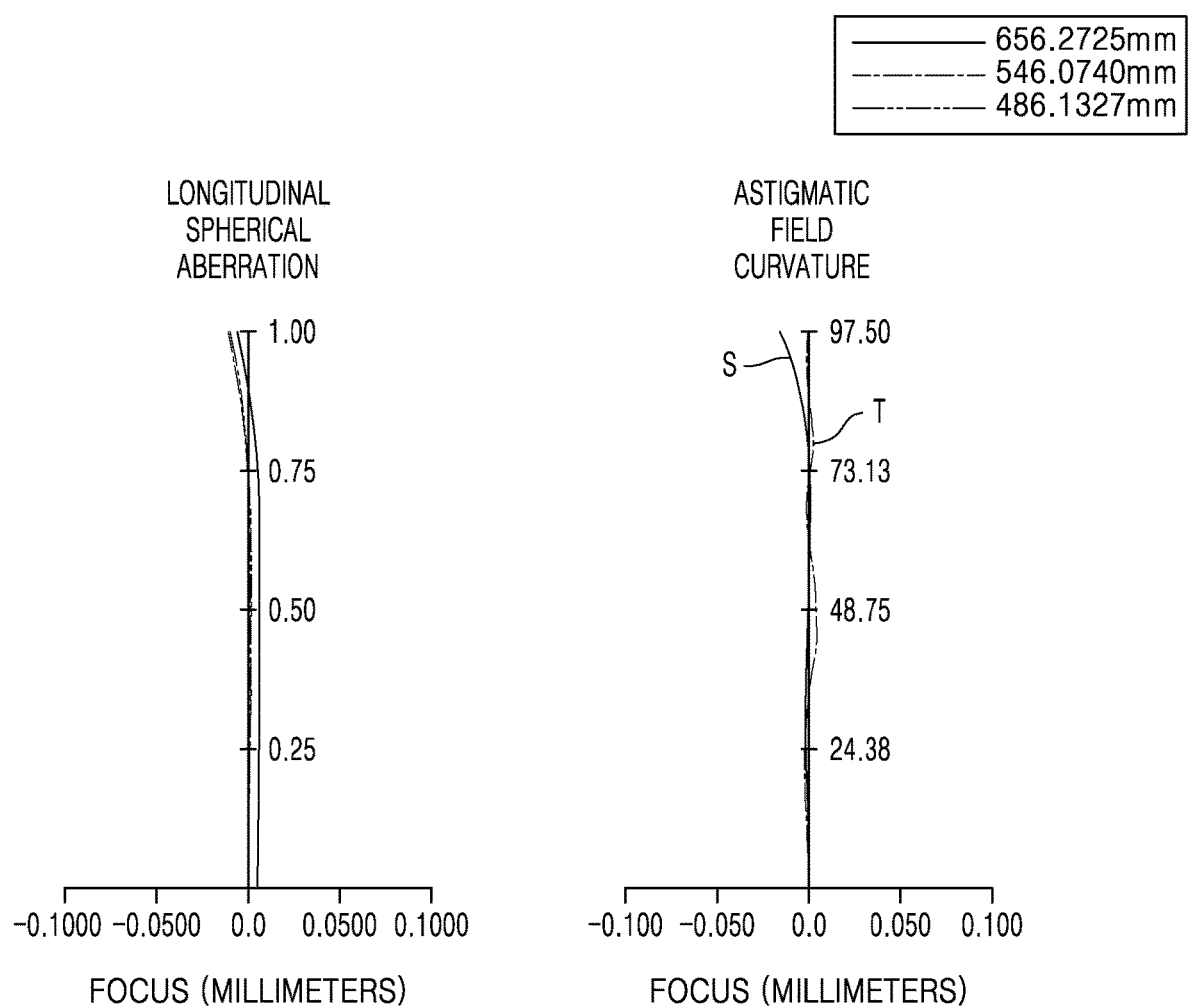
FIG. 19 illustrates an aberration diagram of the optical lens assembly according to the ninth embodiment.

FIG. 19 illustrates the longitudinal spherical aberration, the astigmatic field curvature, and the distortion of the optical lens assembly according to the ninth embodiment.

Table 19 shows that the optical lens assemblies according to various embodiments satisfy Formulas 1 through 12.

TABLE 19

| Formula | Embodiment | | | | | | | | |
|---|---|---|---|---|---|---|---|---|---|
| | EX1 | EX2 | EX3 | EX4 | EX5 | EX6 | EX7 | EX8 | EX9 |
| $(EffDR^2)/(F * 2Y)$ | 1.239 | 1.786 | 1.087 | 1.058 | 2.490 | 1.308 | 0.973 | 1.297 | 2.052 |
| d1/d2 | 0.833 | 0.856 | 0.685 | 0.764 | 0.882 | 0.826 | 0.785 | 0.942 | 0.792 |
| d1/F | 6.481 | 5.496 | 6.205 | 6.455 | 9.046 | 6.573 | 6.468 | 5.512 | 8.373 |
| Fair1/F | −8.798 | −5.159 | −9.785 | −8.795 | −8.631 | −8.078 | −7.958 | −5.102 | −5.273 |
| Fair2/F | −2.512 | −3.026 | −2.004 | −2.096 | −2.653 | −1.941 | −1.901 | −3.111 | −3.423 |
| EffD2asp1/2Y | 1.125 | 1.105 | 0.997 | 0.959 | 1.500 | 0.997 | 1.035 | 1.010 | 1.286 |
| Np | 1.834 | 2.001 | 2.001 | 2.001 | 2.001 | 2.001 | 2.001 | 2.001 | 2.001 |
| F2/F | 3.465 | 3.142 | 3.819 | 3.754 | 4.420 | 3.605 | 3.924 | 3.225 | 3.525 |
| Fp2/F | 2.719 | 2.610 | 3.073 | 2.665 | 3.120 | 2.453 | 2.890 | 2.673 | 2.921 |
| $L_{FR}/F$ | 9.307 | 8.225 | 9.193 | 9.308 | 12.305 | 9.422 | 9.159 | 8.108 | 11.843 |
| $CA_{1st}/F$ | 9.712 | 9.252 | 10.203 | 9.902 | 10.505 | 10.130 | 9.537 | 8.994 | 12.167 |

The optical lens assemblies according to various embodiments may be applied, for example, to electronic apparatuses including image sensors. The optical lens assemblies according to embodiments may be applied to various electronic apparatuses such as digital cameras, interchangeable lens cameras, video cameras, mobile phone cameras, and compact mobile device cameras.

Figure 26:
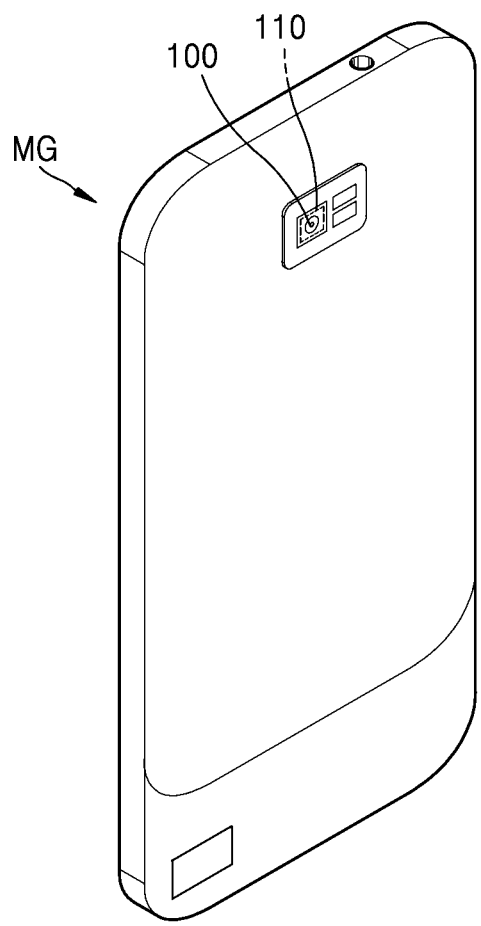
FIG. 26 illustrates an example of an electronic apparatus including an optical lens assembly according to one embodiment.

FIG. 26 illustrates an example of an electronic apparatus MG including an optical lens assembly according to an embodiment. Although the electronic apparatus MG is a mobile phone in FIG. 26, the present disclosure is not limited thereto. The electronic apparatus MG may include at least one optical lens assembly 100 and an image sensor 110 that receives an image formed by the at least one optical lens assembly 100 and converts the received image into an electrical image signal. The optical lens assemblies described with reference to FIGS. 1 to 19 may be used as the optical lens assembly 100. A high-performance imaging apparatus may be implemented by applying the optical lens assembly according to various embodiments to an imaging apparatus such as a compact digital camera or a mobile phone.

The image sensor 110 may include infrared detection pixels. The infrared detection pixels may enable infrared imaging when visible light imaging is difficult indoors or at night. A color filter included in the image sensor 110 may transmit not only visible light at the red, green, and blue wavelengths, but also at infrared wavelengths. But under other circumstances, infrared light may cause noise in the images. Thus, Infrared rays may be blocked by a separate filter or coating. However, in some embodiments, an infrared blocking film may be arranged at a small-beam position between a first lens group and a second lens group, and the infrared blocking film may be moved by an actuator. Accordingly, if necessary, the infrared blocking film may be moved from the optical path. In the case of using an image sensor including infrared detection pixels, when imaging with visible light, infrared rays may be blocked by the infrared blocking film. Alternatively, if there is no infrared blocking film, infrared noise may be removed by a processor. Also, in the case of infrared imaging, the infrared blocking film may be moved away from the optical path so that the infrared detection pixels may be used to acquire an infrared image.

Figure 27:
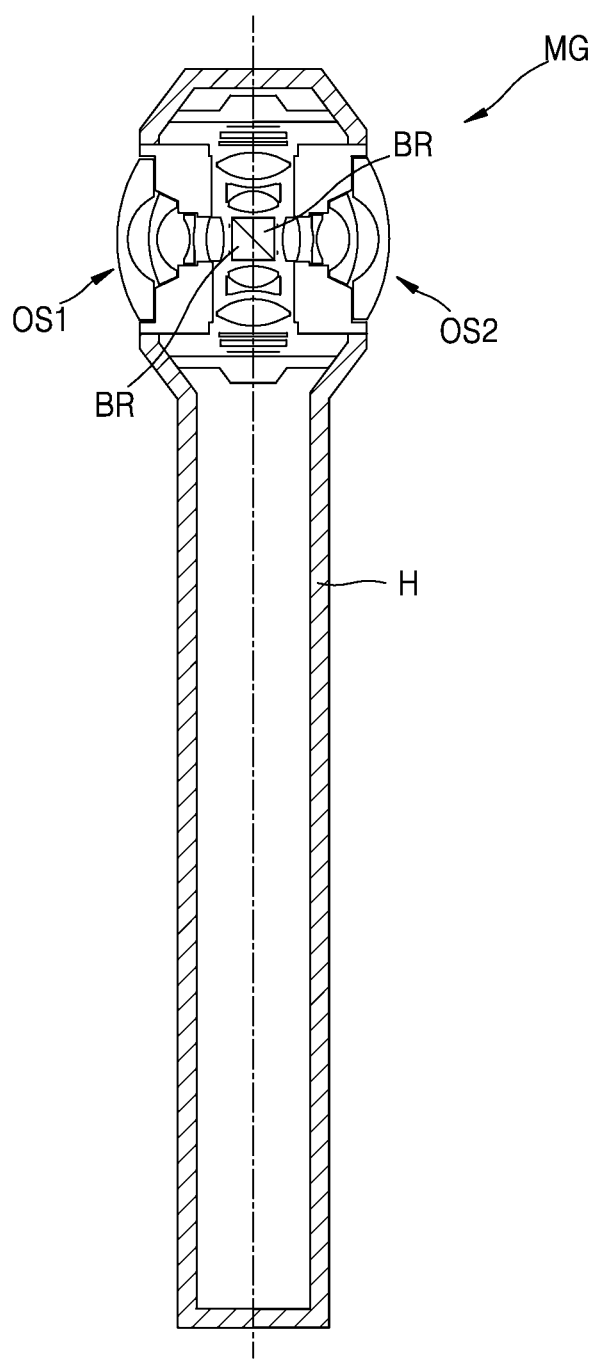
FIG. 27 illustrates another example of the electronic apparatus including two optical lens assemblies according to one embodiment.

FIG. 27 illustrates another example of the electronic apparatus MG including an optical lens assembly according to an embodiment. The electronic apparatus MG may include a plurality of optical lens assemblies according to various embodiments. For example, a first optical lens assembly OS1 and a second optical lens assembly OS2 may respectively include bending units over a main body H and may be arranged by bending optical paths. The first optical lens assembly OS1 and the second optical lens assembly OS2 may be arranged by using any one of the methods of FIGS. 20 and 21.

For example, in the first optical lens assembly OS1 and the second optical lens assembly OS2, optical paths may be respectively bent to opposite directions by the bending units and image sensors IMG may be arranged on different planes. Accordingly, an omnidirectional image may be captured. The arrangement method is not limited thereto, and two optical lens assemblies or three or more optical lens assemblies may be arranged in various ways. The optical lens assemblies according to various embodiments may be applied, for example, to mobile devices, virtual reality devices, augmented reality devices, and surround view input devices of vehicles.

Figure 28:
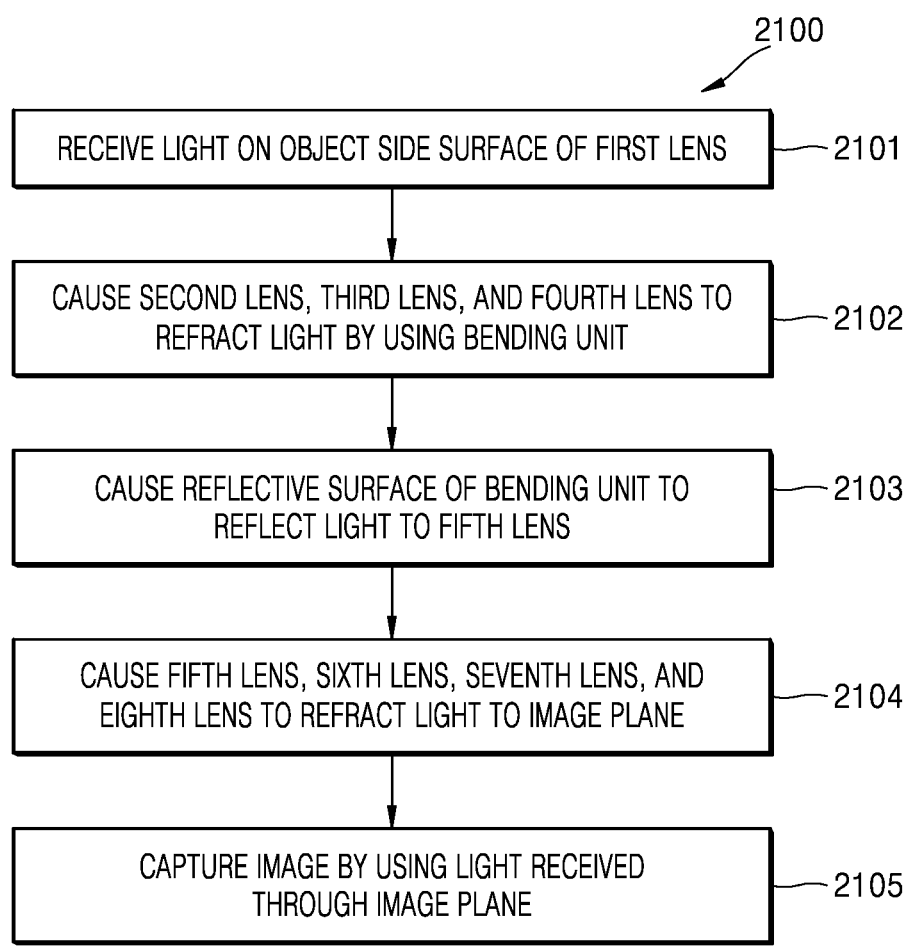
FIG. 28 is a high-level flowchart of a method of capturing an image by using an optical lens assembly in an electronic apparatus according to one embodiment.

FIG. 28 is a high-level flowchart 2100 of a method of capturing an image by using the optical lens assembly 100-1, 100-2, 100-3, 100-4, 100-5, 100-6, 100-7, 100-8, or 100-9 of FIG. 1, 4, 6, 8, 10, 12, 14, 16, or 18 in an electronic apparatus according to various embodiments.

According to an embodiment, in operation 2101, for example, the optical lens assembly 100-1, 100-2, 100-3, 100-4, 100-5, 100-6, 100-7, 100-8, or 100-9 may receive light on an object side surface of a first lens included in the optical lens assembly.

In operation 2102, for example, a second lens, a third lens, and a fourth lens may refract light by using a bending unit.

In operation 2103, for example, a reflective surface of the bending unit included in the optical lens assembly may reflect light to a fifth lens.

In operation 2104, for example, the fifth lens, a sixth lens, a seventh lens, and an eighth lens in the optical lens assembly may refract light to an image plane IMG.

In operation 2105, for example, an electronic apparatus (e.g., an electronic apparatus 201 of FIG. 30 or an electronic apparatus 301 of FIG. 31) including the optical lens assembly may capture an image by using the light received through the image plane IMG. For example, the image may be captured by using an image sensor (not shown) that is a part of a camera module (e.g., a camera module 225 of FIG. 30 or a camera module 391 of FIG. 31) included in the electronic apparatus.

Figure 29:
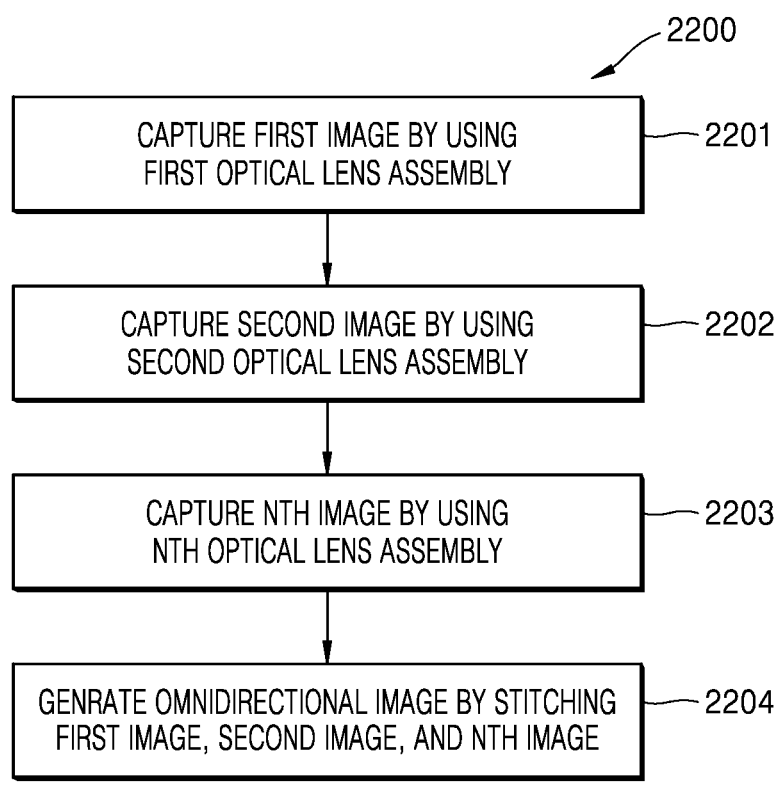
FIG. 29 is a high-level flowchart of a method of capturing an image by using two optical lens assemblies in an electronic apparatus according to one embodiment.

FIG. 29 is a high-level flowchart 2200 of a method of capturing an image by using a plurality of optical lens assemblies in an electronic apparatus according to various embodiments.

According to an embodiment, in operation 2201, for example, a first image is captured by using a first optical lens assembly.

In operation 2202, for example, a second image is captured by using a second optical lens assembly. The first optical lens assembly and the second optical lens assembly may capture images in different directions.

In operation 2203, for example, an Nth image is captured by using an Nth optical lens assembly (N is a natural number equal to or greater than 3). The Nth optical lens assembly may capture an image in a different direction.

In operation 2204, for example, an omnidirectional image may be generated by stitching the first image, the second image, and the Nth image.

Figure 30:
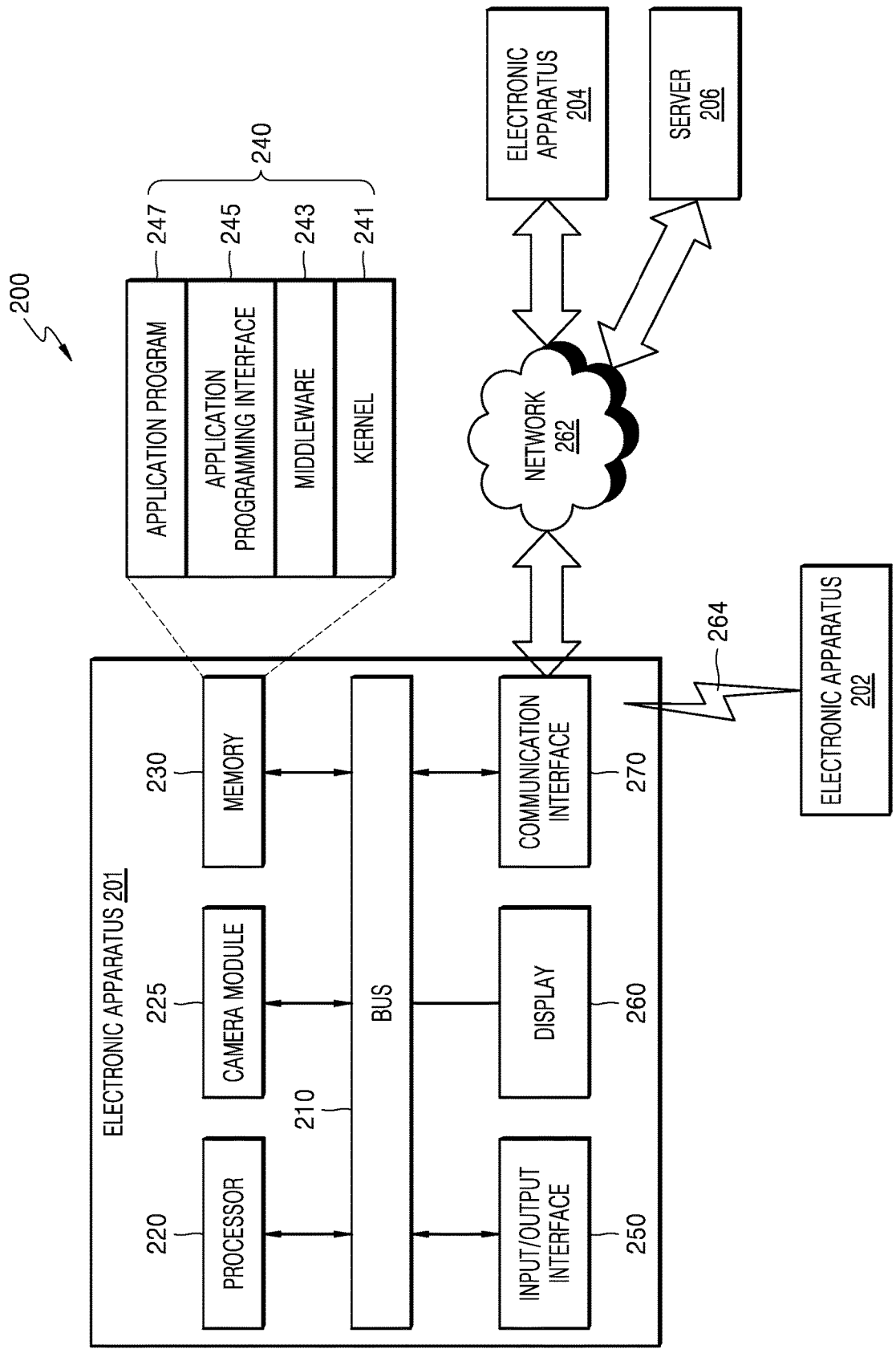
FIG. 30 illustrates a network environment system according to one embodiment.

The electronic apparatus 201 in a network environment 200 according to one embodiment will be described with reference to FIG. 30. Referring to FIG. 30, the electronic apparatus 201 may include a bus 210, a processor 220, the camera module 225, a memory 230, an input/output (I/O) interface 250, a display 260, and a communication interface 270. In some embodiments, the electronic apparatus 201 may not include at least one of the above components or may further include other components.

The bus 210 may include, for example, a circuit for connecting the above components (210 to 270) and transmitting communication information (e.g., control messages and/or data) between the above components.

The processor 220 may include at least one of a CPU, an AP, and a communication processor (CP). For example, the processor 220 may execute control of one or more other components of the electronic apparatus 201 and/or data processing or operations related to communication.

For example, the camera module 225 may be configured to capture a still image and a moving image (video). According to an embodiment, the camera module 225 may include one or more image sensors (e.g., a front sensor or a rear sensor), a lens, an image signal processor (ISP), or a flash (e.g., a light-emitting diode (LED) or a xenon lamp). For example, the optical lens assemblies according to various embodiments may be applied to the camera module 225.

The memory 230 may include a volatile memory and/or a nonvolatile memory. For example, the memory 230 may store data or commands related to one or more other components of the electronic apparatus 201. According to an embodiment, the memory 230 may store software and/or a program 240. The program 240 may include, for example, a kernel 241, middleware 243, an application programming interface (API) 245, and/or an application program (or "application") 247. At least a part of the kernel 241, the middleware 243, and the API 245 may be referred to as an operating system (OS).

For example, the kernel 241 may control or manage system resources (e.g., the bus 210, the processor 220, or the memory 230) used to execute operations or functions implemented in other programs (e.g., the middleware 243, the API 245, or the application program 247). Also, the kernel 241 may provide an interface for controlling or managing the system resources when the middleware 243, the API 245, or the application program 247 accesses each component of the electronic apparatus 201.

For example, the middleware 243 may perform a relay function so that the API 245 or the application program 247 may exchange data with the kernel 241.

Also, the middleware 243 may process one or more operation requests received from the application program 247 according to the priority thereof. For example, the middleware 243 may give the application program 247 the priority to use the system resource (e.g., the bus 210, the processor 220, or the memory 230) of the electronic apparatus 201. For example, the middleware 243 may perform scheduling or load balancing on the one or more operation requests by processing the one or more operation requests according to the priority given to the application program 247.

For example, the API 245 may be an interface for the application 247 to control a function provided by the kernel 241 or the middleware 243, and may include at least one interface or function (e.g., instructions) for file control, window control, image processing, or character control.

For example, the I/O interface 250 may function as an interface for transmitting a command or data input from a user or another external device to one or more other components of the electronic apparatus 201. Also, the I/O interface 250 may output a command or data received from one or more other components of the electronic apparatus 201 to the user or another external device.

The display 260 may include, for example, a liquid crystal display (LCD), an LED display, an organic light-emitting diode (OLED) display, a microelectromechanical system (MEMS) display, or an electronic paper display. For example, the display 260 may display various types of content (e.g., texts, images, videos, icons, or symbols) to the user. For example, the display 260 may include a touch-screen and may receive a touch, gesture, proximity, or hovering input by using an electronic pen or a portion of the body of the user. For example, the communication interface 270 may set communication between the electronic apparatus 201 and an external device (e.g., a first external electronic apparatus 202, a second external electronic apparatus 204, or a server 206). For example, by wireless communication or wired communication, the communication interface 270 may be connected to a network 262 to communicate with the external device (e.g., the second external electronic apparatus 204 or the server 206).

The wireless communication may use, for example, at least one of Long-Term Evolution (LTE), LTE Advanced (LTE-A), Code Division Multiple Access (CDMA), Wideband CDMA (WCDMA), Universal Mobile Telecommunications System (UMTS), Wireless Broadband (WiBro), and Global System for Mobile communication (GSM) as a cellular communication protocol. Also, the wireless communication may include, for example, short-range communication 264. The short-range communication 264 may include, for example, at least one of Wireless Fidelity (WiFi), Bluetooth, Near-Field Communication (NFC) and Global Navigation Satellite System (GNSS). The GNSS may include, for example, at least one of Global Positioning System (GPS), Global Navigation Satellite System (GLONASS), BeiDou Navigation Satellite System (hereinafter, referred to as "BeiDou"), and Galileo (or the European global satellite-based navigation system) according to regions or bandwidths. Hereinafter, the acronym "GPS" may be interchangeably used with the acronym "GNSS". The wired communication may include, for example, at least one of universal serial bus (USB), high definition multimedia interface (HDMI), recommended standard-232 (RS-232), and plain old telephone service (POTS). The network 262 may include, for example, at least one of a telecommunications network, a computer network (e.g., Local Area Network (LAN) or Wide Area Network (WAN)), the Internet, and a telephone network.

Each of the first and second external electronic apparatuses 202 and 204 may be similar to or different in type from the electronic apparatus 201. According to an embodiment, the server 206 may include a group of one or more servers. According to various embodiments, all or some of operations executed in the electronic apparatus 201 may be executed in one or more other electronic apparatuses (e.g., the external electronic apparatus 202 or 204 or the server 206). According to an embodiment, when the electronic apparatus 201 needs to perform a function or a service automatically or at the request, the electronic apparatus 201 may request other devices (e.g., the external electronic apparatus 202 or 204 or the server 206) for at least some functions related thereto in addition to or instead of directly executing the function or the service. The other electronic apparatuses (e.g., the external electronic apparatus 202 or 204 or the server 206) may execute the requested function or the additional function and transmit the execution results to the electronic apparatus 201. The electronic apparatus 201 may provide the requested function or service by processing the received execution results additionally or without change. To this end, for example, cloud computing, distributed computing, or client-server computing technology may be used.

Figure 31:
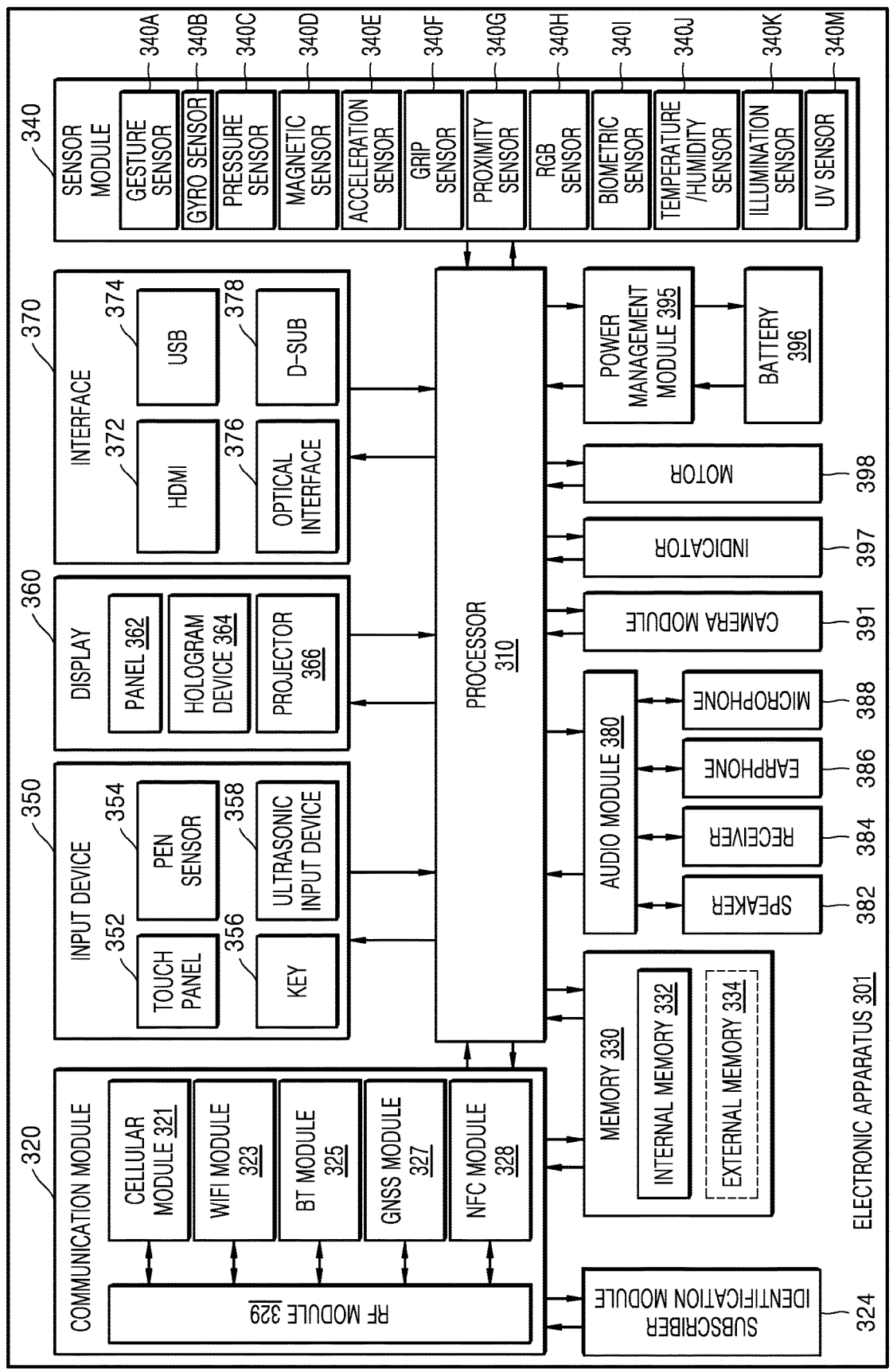
FIG. 31 is a block diagram of an electronic apparatus according to one embodiment.

FIG. 31 is a block diagram of an electronic apparatus 301 according to one embodiment. Referring to FIG. 31, the electronic apparatus 301 may include, for example, all or some of the electronic apparatus 201 illustrated in FIG. 30. The electronic apparatus 301 may include at least one processor (e.g., an AP) 310, a communication module 320, a subscriber identification module (SIM) 324, a memory 330, a sensor module 340, an input device 350, a display 360, an interface 370, an audio module 380, the camera module 391, a power management module 395, a battery 396, an indicator 397, and a motor 398.

For example, by driving an OS or an application program, the processor 310 may control a plurality of hardware or software components connected to the processor 310 and perform various data processing and operations. The processor 310 may be implemented, for example, as a system-on-chip (SoC). According to an embodiment, the processor 310 may further include a graphics processing unit (GPU) and/or an ISP. The processor 310 may include at least some (e.g., a cellular module 321) of the components illustrated in FIG. 31. The processor 310 may load a command or data received from at least one of other components (e.g., a nonvolatile memory) into a volatile memory and process the loaded data, and the processor 310 may store various data in the nonvolatile memory.

The communication module 320 may have an identical or similar configuration to the communication interface 270 of FIG. 30. The communication module 320 may include, for example, the cellular module 321, a WiFi module 323, a Bluetooth (BT) module 325, a GNSS module 327 (e.g., a GPS module, a GLONASS module, a BeiDou module, or a Galileo module), an NFC module 328, and a radio frequency (RF) module 329.

The cellular module 321 may provide, for example, a voice call service, a video call service, a text message service, or an Internet service through a communication network. According to an embodiment, the cellular module 321 may identify and authenticate the electronic apparatus 301 in the communication network by using the subscriber identification module (e.g., a SIM card) 324. According to an embodiment, the cellular module 321 may perform at least some of functions that may be provided by the processor 310. According to an embodiment, the cellular module 321 may include a CP.

Each of the WiFi module 323, the BT module 325, the GNSS module 327, and the NFC module 328 may include, for example, a processor for processing data transmitted/received through the corresponding module. According to some embodiments, at least some (e.g., two or more) of the cellular module 321, the WiFi module 323, the BT module 325, the GNSS module 327, and the NFC module 328 may be included in an integrated chip (IC) or an IC package.

The RF module 329 may transmit/receive, for example, a communication signal (e.g., an RF signal). The RF module 329 may include, for example, a transceiver, a power amplifier module (PAM), a frequency filter, a low-noise amplifier (LNA), or an antenna. According to other embodiments, at least one of the cellular module 321, the WiFi module 323, the BT module 325, the GNSS module 327, and the NFC module 328 may transmit/receive an RF signal through a separate RF module.

For example, the subscriber identification module 324 may include an embedded SIM and/or a card including an SIM, and may include unique identification information (e.g., integrated circuit card identifier (ICCID)) or subscriber information (e.g., international mobile subscriber identity (IMSI)).

The memory 330 may include, for example, an internal memory 332 or an external memory 334. The internal memory 332 may include, for example, at least one of volatile memories (e.g., dynamic random-access memories (DRAMs), static RAMs (SRAMs), or synchronous DRAMs (SDRAMs)) and nonvolatile memories (e.g., one-time programmable read-only memories (OTPROMs), programmable ROMs (PROMs), erasable and programmable ROMs (EPROMs), electrically erasable and programmable ROMs (EEPROMs), mask ROMs, flash ROMs, flash memories (e.g., NAND flash memories or NOR flash memories), hard disk drives (HDDs), or solid state drives (SSDs)).

The external memory 334 may further include, for example, a flash drive such as compact flash (CF), secure digital (SD), micro secure digital (micro-SD), mini secure digital (mini-SD), extreme digital (xD), multimedia card (MMC), or memory stick. The external memory 334 may be operatively and/or physically connected to the electronic apparatus 301 through various interfaces.

For example, the sensor module 340 may measure a physical quantity or detect an operation state of the electronic apparatus 301 and convert the measured or detected information into an electrical signal. The sensor module 340 may include, for example, at least one of a gesture sensor 340A, a gyro sensor 340B, a pressure sensor 340C, a magnetic sensor 340D, an acceleration sensor 340E, a grip sensor 340F, a proximity sensor 340G, a color sensor 340H (e.g., a red/green/blue (RGB) sensor), a biometric sensor 340I, a temperature/humidity sensor 340J, an illumination sensor 340K, and an ultraviolet (UV) sensor 340M. Additionally or alternatively, the sensor module 340 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 340 may further include a control circuit configured to control at least one sensor included therein. In some embodiments, the electronic apparatus 301 may further include a processor, which is configured separately or as a portion of the processor 310 to control the sensor module 340, to control the sensor module 340 while the processor 310 is in a sleep state.

The input device 350 may include, for example, a touch panel 352, a (digital) pen sensor 354, a key 356, or an ultrasonic input device 358. The touch panel 352 may include, for example, at least one of a capacitive touch panel, a resistive touch panel, an infrared touch panel, and an ultrasonic touch panel. Also, the touch panel 352 may further include a control circuit. The touch panel 352 may further include a tactile layer configured to provide a tactile response to the user.

For example, the (digital) pen sensor 354 may be a portion of the touch panel 352 or may include a separate recognition sheet. The key 356 may include, for example, a physical button, an optical key, or a keypad. The ultrasonic input device 358 may detect an ultrasonic wave generated by an input tool through a microphone 388 and detect data corresponding to the detected ultrasonic wave.

The display 360 may include a panel 362, a hologram device 364, or a projector 366. The panel 362 may include an identical or similar configuration to the display 260 of FIG. 30. For example, the panel 362 may be implemented to be flexible, transparent, or wearable. The panel 362 and the touch panel 352 may be configured as one module. According to an embodiment, the panel 362 may include a pressure sensor (or a force sensor) that may measure a pressure strength of a user touch. The pressure sensor may be implemented integrally with the touch panel 352, or may be implemented as one or more sensors separately from the touch panel 352. The hologram device 364 may display a stereoscopic image in the air by using light interference. The projector 366 may display an image by projecting light onto a screen. For example, the screen may be located inside or outside the electronic apparatus 301. According to an embodiment, the display 360 may further include a control circuit for controlling the panel 362, the hologram device 364, or the projector 366.

The interface 370 may include, for example, a high-definition multimedia interface (HDMI) 372, a universal serial bus (USB) 374, an optical interface 376, or a D-sub-miniature (D-SUB) 378. For example, the interface 370 may be included in the communication interface 270 illustrated in FIG. 30. Additionally or alternatively, the interface 370 may include, for example, a mobile high-definition link (MHL) interface, a secure digital (SD) card/multimedia card (MMC) interface, or an infrared data association (IrDA) standard interface.

For example, the audio module 380 may perform bidirectional conversion between a sound and an electrical signal. For example, at least some components of the audio module 380 may be included in the I/O interface 250 illustrated in FIG. 30. For example, the audio module 380 may process sound information that is input or output through a speaker 382, a receiver 384, earphones 386, or the microphone 388.

For example, the camera module 391 may be configured to capture a still image and a moving image (video). According to an embodiment, the camera module 391 may include one or more image sensors (e.g., a front sensor or a rear sensor), a lens, an ISP, or a flash (e.g., an LED or a xenon lamp). For example, the optical lens assemblies according to various embodiments may be applied to the camera module 391.

For example, the power management module 395 may manage the power of the electronic apparatus 301. The electronic apparatus 301 may be, but is not limited to, an electronic apparatus that is powered by a battery. According to an embodiment, the power management module 395 may include a power management integrated circuit (PMIC), a charger integrated circuit (IC), or a battery or fuel gauge. The PMIC may have a wired and/or wireless charge mode. For example, the wireless charge mode may include a magnetic resonance mode, a magnetic induction mode, or an electromagnetic wave mode and may further include an additional wireless charge circuit such as a coil loop, a resonant circuit, or a rectifier. For example, the battery gauge may be configured to measure a residual capacity, a charged voltage, a current, or a temperature of the battery 396. The battery 396 may include, for example, a rechargeable battery and/or a solar battery.

The indicator 397 may indicate a particular state of the electronic apparatus 301 or a portion thereof (e.g., the processor 310), such as a booting state, a message state, or a charge state. For example, the motor 398 may be configured to convert an electrical signal into a mechanical vibration and generate a vibration or a haptic effect. Although not shown in FIG. 31, the electronic apparatus 301 may include a processing device (e.g., a GPU) for supporting a mobile TV. For example, the processing device for supporting a mobile TV may process media data according to the standards such as digital multimedia broadcasting (DMB), digital video broadcasting (DVB), or MediaFLO™.

An optical lens assembly according to one embodiment may include: a first lens group having a positive refractive power; a second lens group having a positive refractive power; and a bending unit located between the first lens group and the second lens group and configured to bend an optical path, wherein the first lens group, the second lens group, and the bending unit are sequentially arranged from an object side to an image side, and the optical lens assembly has a maximum viewing angle of 130° or more.

For example, the bending unit may include a reflective surface and may satisfy the following formula for the reflective surface:

$$(EffDR^2)/(F^*2Y)<3.0$$

where EffDR denotes an effective diameter of the reflective surface, F denotes a total focal length of the optical lens assembly, and Y denotes a maximum image height.

For example, the bending unit may include a reflective surface and may satisfy the following formula for the reflective surface:

$$d1/d2<1.0$$

$$5<d1/F<10$$

where F denotes a total focal length of the optical lens assembly, d1 denotes a distance on an optical axis from an entrance pupil to the reflective surface, and d2 denotes a distance on the optical axis from the reflective surface to an image plane.

For example, the first lens group may include a first air lens having a negative refractive power and having a convex surface facing the object side and a second air lens having a negative refractive power and having two convex surfaces, and may also include a lens having a positive refractive power and located next to the first air lens on the object side.

For example, the optical lens assembly may satisfy the following formula:

$$-80<Fair1/F<-4$$

$$-3.7<Fair2/F<-1$$

where F denotes a total focal length of the optical lens assembly, Fair1 denotes a focal length of the first air lens, and Fair2 denotes a focal length of the second air lens.

For example, the first lens group may include a double-sided aspherical lens having a negative refractive power and may satisfy the following formula:

$$0.8<EffD2asp1/2Y<1.6$$

where EffD2asp1 denotes an effective diameter of an image side surface of the double-sided aspherical lens and Y denotes a maximum image height.

For example, the bending unit may include a prism.

For example, when a d-Line refractive index of the prism is Np, the prism may satisfy the following formula:

$$Np>1.75.$$

For example, the optical lens assembly may satisfy the following formula:

$$2.5<F2/F<5.0$$

where F denotes a total focal length of the optical lens assembly and F2 denotes a focal length of the second lens group.

For example, the second lens group may include a lens located closest to the image side, having a convex surface facing the image side, and the lens having a positive refractive power, wherein the lens includes an aspherical surface and satisfies the following formula:

$$1.8<Fp2/F<3.7$$

where F denotes a total focal length of the optical lens assembly and Fp2 denotes a focal length of the lens of the second lens group that is located closest to the image side.

For example, the optical lens assembly may satisfy the following formula:

$$0.8<(dY/d\theta)(\theta)/(dY/d\theta)(0)<1.2$$

$$0\leq\theta\leq(FOV/2)$$

where FOV denotes a maximum viewing angle, $dY/d\theta(\theta)$ denotes a first-order differential function for a viewing angle $\theta$ with respect to a function $Y=f(\theta)$ representing a relationship between the viewing angle $\theta$ and an image height Y.

For example, a plurality of the optical lens assemblies may be provided to capture an omnidirectional image.

For example, the first lens group may include a first lens having a negative refractive power, a second lens having a negative refractive power, a third lens having a negative refractive power, and a fourth lens having a positive refractive power.

For example, the second lens group may include a fifth lens having a positive refractive power, a sixth lens having a negative refractive power, and a seventh lens having a positive refractive power.

For example, an iris diaphragm may be provided between the first lens group and the bending unit.

An optical lens assembly according to various embodiments may include: a first lens group having a positive refractive power or a negative refractive power; a second lens group having a positive refractive power; and a bending unit located between the first lens group and the second lens group and configured to bend an optical axis, wherein the first lens group, the second lens group, and the bending unit are sequentially arranged from an object side to an image side, and the first lens group includes a plurality of lenses having negative refractive powers sequentially arranged from the object side to the image side and at least one lens having a positive refractive power.

For example, the optical lens assembly may have a viewing angle of 180° or more.

For example, at least one lens from among the plurality of lenses having the negative refractive powers may be a biconcave lens.

An optical lens assembly according to various embodiments may include: a first lens group having a positive refractive power or a negative refractive power; a second lens group having a positive refractive power; and a bending unit located between the first lens group and the second lens group and configured to bend an optical axis, wherein the first lens group, the second lens group, and the bending unit are arranged from an object side to an image side, and the optical lens assembly satisfies the following formula:

$$L_{FR}/F<15$$

$$CA_{1ST}/F<20$$

where F denotes a total focal length of the optical lens assembly, $L_{FR}$ denotes a distance between an object side surface of a lens of the first lens group that is located closest to the object side and a position where light is bent by the bending unit, and $CA_{1ST}$ denotes an effective diameter of the lens of the first lens group that is located closest to the object side based on a viewing angle of 180°.

For example, the first lens group may include at least one positive lens.

For example, all lenses included in the first lens group and the second lens group may be glass lenses.

For example, the at least one optical lens assembly may include a first optical lens assembly and a second optical lens assembly, and the first optical lens assembly and the second optical lens assembly may be arranged to form images in the same direction.

For example, the at least one optical lens assembly may include a first optical lens assembly and a second optical lens assembly, and the first optical lens assembly and the second optical lens assembly may be arranged to form images in opposite directions.

For example, the first optical lens assembly may include a first bending unit, the second optical lens assembly may include a second bending unit, the first bending unit and the second bending unit may be arranged so that a reflective surface of the first bending unit and a reflective surface of the second bending unit face each other, and an electrical circuit may be provided between the first bending unit and the second bending unit.

For example, the at least one optical lens assembly may include a plurality of optical lens assemblies, and the plurality of optical lens assemblies may be arranged to capture an omnidirectional image.

For example, bending units included in the plurality of optical lens assemblies may be configured to adjust an optical path difference between the plurality of optical lens assemblies.

For example, the first lens group may further include a protective lens located closest to the object side and may satisfy the following formula:

$$2000<f_{cover}^2/F$$

where $f_{cover}$ denotes a focal length of the protective lens of the first lens group and F denotes a focal length of the optical lens assembly.

Each of the elements described herein may be configured by one or more components, and the names of the elements may vary according to the type of the electronic apparatus. According to various embodiments, the electronic apparatus may be configured to include at least one of the elements described herein, and some elements may be omitted or additional elements may be further included. Also, according to various embodiments, some of the elements of the electronic apparatus may be combined into one entity to perform the same functions as the previous elements prior to the combination thereof.

The term "module" used herein may refer to, for example, a unit including hardware, software, firmware, or any combination thereof. For example, the term "module" may be interchangeably used with terms such as "unit," "logic,", "logical block," "component," or "circuit". The "module" may be a standalone unit or part of an integrated component. The "module" may be implemented mechanically or electronically. For example, the "module" may include at least one of an application-specific integrated circuit (ASIC) chip, a field-programmable gate array (FPGA), and a programmable-logic device for performing some operations, which are known or to be developed.

For example, at least a portion of the apparatus (e.g., modules or functions thereof) or method (e.g., operations) according to various embodiments may be implemented in the form of a program module by instructions stored in computer-readable storage media. When the instructions are executed by a processor (e.g., the processor 220 of FIG. 30, the one or more processors may perform a function corresponding to the instructions. The computer-readable storage media may include, for example, the memory 230.

The computer-readable storage media may include, for example, hard disks, floppy disks, magnetic media (e.g., magnetic tapes), optical media (e.g., compact disk read-only memory (CD-ROM), digital versatile disk (DVD), magneto-optical media (e.g., floptical disks), or hardware devices (e.g., read-only memory (ROM), random-access memory (RAM), or flash memories). Also, the program commands may include machine language code that may be generated by a compiler, and high-level language code that may be executed by a computer by using an interpreter. The hardware device may be configured to operate as one or more software modules in order to perform the operation of various embodiments, and vice versa. The program module or the module according to various embodiments may include at least one of the above elements, some of the above elements may be omitted, or additional other elements may be further included therein. The operations performed by the module, the program module, or other elements according to various embodiments may be executed in a sequential, parallel, repeated, or heuristic manner. Also, some operations may be executed in different order or omitted, or other operations may be additionally executed. The embodiments described herein should be considered in a descriptive sense only and not for purposes of limitation. Therefore, the scope of the present disclosure should be interpreted as including all modifications or various other embodiments based on the technical concept of the present disclosure. The above embodiments are merely examples, and one of ordinary skill in the art may derive various modifications and other equivalent embodiments therefrom. Thus, the spirit and scope of the present disclosure should be defined by the following claims.

What is claimed is:

1. An optical lens assembly comprising:
a first lens group having a positive refractive power;
a second lens group having a positive refractive power; and
a bending unit located between the first lens group and the second lens group and configured to bend an optical path,
wherein the first lens group, the second lens group, and the bending unit are sequentially arranged from an object side to an image side of an optical axis, the object side facing an object for image capture and the image side facing an image plane of an image sensor,
wherein the optical lens assembly has a maximum viewing angle of 130° or more, and
wherein the bending unit comprises a reflective surface and satisfies the following formula for the reflective surface:

$$(EffDR^2)/(F*2Y) < 3.0$$

wherein EffDR denotes an effective diameter of the reflective surface, F denotes a total focal length of the optical lens assembly, and Y denotes a maximum image height.

2. An optical lens assembly comprising:
a first lens group having a positive refractive power;
a second lens group having a positive refractive power; and
a bending unit located between the first lens group and the second lens group and configured to bend an optical path,
wherein the first lens group, the second lens group, and the bending unit are sequentially arranged from an object side to an image side of an optical axis, the object side facing an object for image capture and the image side facing an image plane of an image sensor,
wherein the optical lens assembly has a maximum viewing angle of 130° or more, and
wherein the bending unit comprises a reflective surface and satisfies the following formula for the reflective surface:

$$d1/d2 < 1.0$$

$$5 < d1/F < 10$$

wherein F denotes a total focal length of the optical lens assembly, d1 denotes a distance on the optical axis from an entrance pupil to the reflective surface, and d2 denotes a distance on the optical axis from the reflective surface to the image plane.

3. The optical lens assembly of claim 1, wherein the first lens group comprises a first air lens having a negative refractive power and having a convex surface facing the object side and a second air lens having a negative refractive power and having two convex surfaces, and also comprises a lens having a positive refractive power and located next to the first air lens on the object side.

4. The optical lens assembly of claim 3, wherein the optical lens assembly satisfies the following formula:

$$-80 < Fair1/F < -4$$

$$-3.7 < Fair2/F < -1$$

wherein F denotes a total focal length of the optical lens assembly, Fair1 denotes a focal length of the first air lens, and Fair2 denotes a focal length of the second air lens.

5. The optical lens assembly of claim 3, wherein the first lens group comprises a double-sided aspherical lens having a negative refractive power and satisfies the following formula:

$$0.8 < EffD2asp1/2Y < 1.6$$

wherein EffD2asp1 denotes an effective diameter of an image side surface of the double-sided aspherical lens and Y denotes a maximum image height.

6. The optical lens assembly of claim 1, wherein the bending unit comprises a prism.

7. The optical lens assembly of claim 6, wherein the prism satisfies the following formula:

$Np > 1.75$, wherein Np is a d-Line refractive index of the prism.

8. The optical lens assembly of claim 1, wherein the optical lens assembly satisfies the following formula:

$2.5 < F2/F < 5.0$ wherein F denotes a total focal length of the optical lens assembly and F2 denotes a focal length of the second lens group.

9. The optical lens assembly of claim 8, wherein the second lens group comprises a lens located closest to the image side, the lens having a convex surface facing the image side, and having a positive refractive power, wherein the lens comprises an aspherical surface and satisfies the following formula:

$1.8 < Fp2/F < 3.7$ wherein F denotes a total focal length of the optical lens assembly and Fp2 denotes a focal length of the lens of the second lens group that is located closest to the image side.

10. The optical lens assembly of claim 1, wherein the optical lens assembly satisfies the following formula:

$0.8 < (dY/d\theta)(\theta)/(dY/d\theta)(0) < 1.2$ $0 \leq \theta \leq (FOV/2)$ wherein FOV denotes a maximum viewing angle, dY/dθ (θ) denotes a first-order differential function for a viewing angle θ with respect to a function Y=f(θ) representing a relationship between the viewing angle θ and an image height Y.

11. An electronic apparatus comprising:

at least one optical lens assembly; and at least one image sensor configured to receive light formed by the at least one optical lens assembly, wherein the at least one optical lens assembly comprises:

a first lens group having a positive refractive power;

a second lens group having a positive refractive power; and a bending unit located between the first lens group and the second lens group and configured to bend an optical path, wherein the first lens group, the second lens group, and the bending unit are sequentially arranged from an object side to an image side of an optical axis, the object side facing an object for image capture and the image side facing an image plane of the at least one image sensor, and the at least one optical lens assembly has a maximum viewing angle of 130° or more, and wherein the bending unit comprises a reflective surface and satisfies the following formula for the reflective surface:

$(EffDR^2)/(F*2Y) < 3.0$ wherein EffDR denotes an effective diameter of the reflective surface, F denotes a total focal length of the at least one optical lens assembly, and Y denotes a maximum image height.

* * * * *